(12) United States Patent
Neil

(10) Patent No.: US 11,287,618 B2
(45) Date of Patent: Mar. 29, 2022

(54) ANAMORPHIC OBJECTIVE LENS SYSTEM AND METHOD FOR FORMING ANAMORPHIC OBJECTIVE LENS ASSEMBLIES HAVING DIFFERENT FOCAL LENGTHS

(71) Applicant: Iain A. Neil, Canobbio (CH)

(72) Inventor: Iain A. Neil, Canobbio (CH)

( * ) Notice: Subject to any disclaimer, the term of this patent is extended or adjusted under 35 U.S.C. 154(b) by 221 days.

(21) Appl. No.: 16/789,074

(22) Filed: Feb. 12, 2020

(65) Prior Publication Data

US 2020/0264412 A1 Aug. 20, 2020

Related U.S. Application Data

(60) Provisional application No. 62/805,375, filed on Feb. 14, 2019.

(51) Int. Cl.
| | | |
|---|---|---|
| *G02B 13/12* | (2006.01) | |
| *G03B 17/14* | (2021.01) | |
| *H04N 5/225* | (2006.01) | |
| *G02B 15/14* | (2006.01) | |

(52) U.S. Cl.
CPC ........... *G02B 13/12* (2013.01); *G02B 15/142* (2019.08); *G03B 17/14* (2013.01); *H04N 5/2252* (2013.01); *H04N 5/2253* (2013.01); *H04N 5/2254* (2013.01)

(58) Field of Classification Search
CPC ...... G02B 13/12; G02B 15/08; G02B 15/142; G03B 17/14; H04N 5/2252; H04N 5/2253; H04N 5/2254
See application file for complete search history.

(56) References Cited

U.S. PATENT DOCUMENTS

| | | | |
|---|---|---|---|
| 2,890,622 A | 6/1959 | Wallin | |
| 4,017,160 A | 4/1977 | Betensky | |
| 7,085,066 B2 * | 8/2006 | Neil | ............ G02B 13/08 |
| | | | 359/668 |
| 7,920,783 B2 | 4/2011 | Neil | |
| 8,174,773 B2 | 5/2012 | Pretorius | |
| 8,858,099 B2 * | 10/2014 | Dodoc | ............ G02B 13/08 |
| | | | 396/439 |
| 8,879,901 B2 | 11/2014 | Caldwell et al. | |
| 9,063,321 B2 | 6/2015 | Valles Navarro et al. | |
| 9,341,827 B2 | 5/2016 | Neil | |
| 10,078,201 B2 | 9/2018 | Neil | |

(Continued)

*Primary Examiner* — Amy R Hsu
(74) *Attorney, Agent, or Firm* — Downs Rachlin Martin PLLC

(57) ABSTRACT

The anamorphic objective lens systems (100LS) and methods for forming a set of anamorphic objective lens assemblies (100(*i*)) having different focal lengths (FLY) and that utilize a front anamorphic section (20) and a set of two or more non-anamorphic sections (50(*i*)). The non-anamorphic sections are optically matched to the front anamorphic section and their front ends (52) are configured to be easily attached to and detached from the back end (24) of the front anamorphic section to create the anamorphic objective lens assemblies having the different focal lengths. Because the anamorphic objective lens system uses only a single front anamorphic section and multiple non-anamorphic attachments, the cost of having multiple anamorphic objective lens assemblies is substantially reduced as compared to using individual anamorphic objective lenses for each of the desired focal lengths.

20 Claims, 39 Drawing Sheets

(56) References Cited

U.S. PATENT DOCUMENTS

| | | | |
|---|---|---|---|
| 10,126,533 B1 * | 11/2018 | Caldwell | G02B 13/12 |
| 10,139,604 B2 | 11/2018 | Noethen | |
| 2005/0225876 A1 * | 10/2005 | Nurishi | G02B 15/02 |
| | | | 359/716 |
| 2007/0052833 A1 * | 3/2007 | Matsui | H04N 5/2254 |
| | | | 348/335 |
| 2013/0010371 A1 * | 1/2013 | Otani | G02B 13/16 |
| | | | 359/668 |
| 2013/0027676 A1 * | 1/2013 | Otani | G03B 21/142 |
| | | | 353/97 |

* cited by examiner

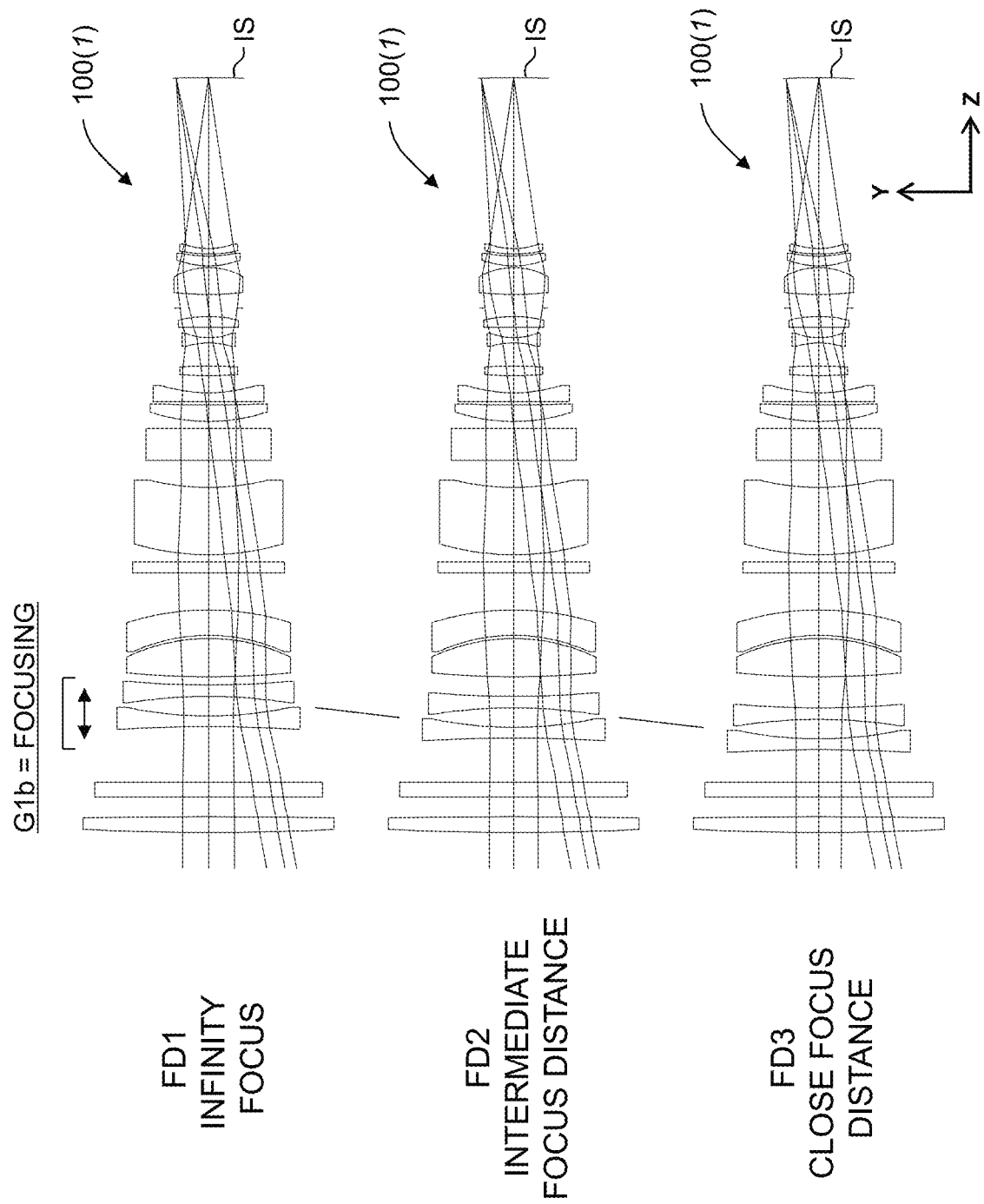

FLY2 = 65.0 mm

FLX2 ≈ 32.5 mm

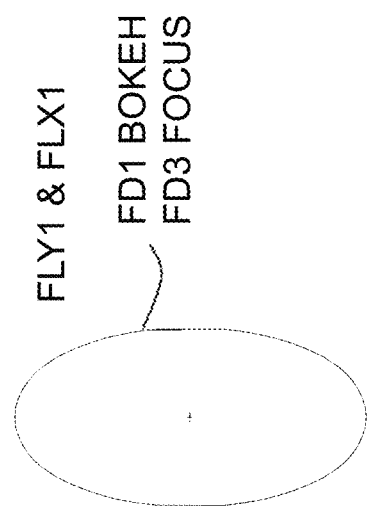
FIG. 13A
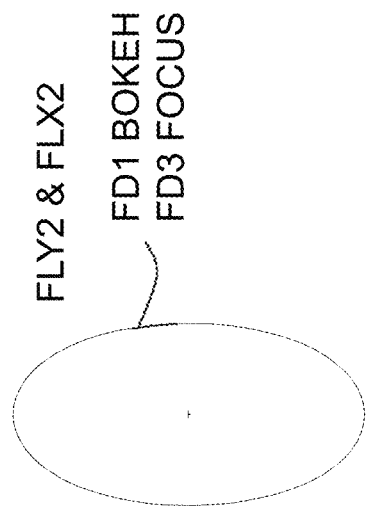
FIG. 13B
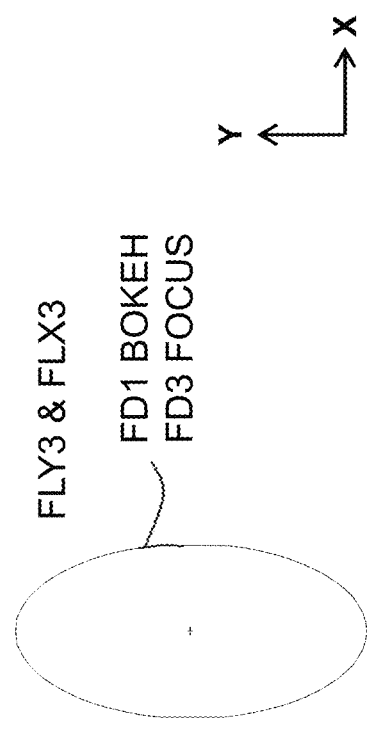
FIG. 13C
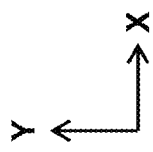

ANAMORPHIC OBJECTIVE LENS SYSTEM AND METHOD FOR FORMING ANAMORPHIC OBJECTIVE LENS ASSEMBLIES HAVING DIFFERENT FOCAL LENGTHS

CROSS-REFERENCE TO RELATED APPLICATIONS

This Applications claims priority from U.S. Provisional Patent Application Ser. No. 62/805,375, filed on Feb. 14, 2019, and which is incorporated by reference herein.

FIELD

The disclosure relates to anamorphic objective lenses, and in particular to an anamorphic objective lens system and method for forming anamorphic objective lens assemblies having different focal lengths.

BACKGROUND ART

The field of photography generally involves recording images of different scenes using a camera that has either film or a digital image sensor as the light-recording medium. Common applications include still photography, videography and cinematography or motion picture photography where images are captured. To achieve desired artistic effects using close-up shots, wide-angle shots, defocused shots, etc., the photographic camera is adapted to accommodate a variety of objective lenses having respective focal lengths.

For example, for wide-angle shots, the photographic camera may be fitted with an objective lens having a relatively wide field of view (e.g., 50 degrees or more). Likewise, for close-up ("telephoto") shots, the photographic camera may be fitted with an objective lens having a relatively narrow field of view (e.g., 30 degrees or less). Other objective lenses having medium focal lengths between the wide-angle and telephoto limits are used to round out the set of objective lenses used in capturing images. In a given application, the photographer may require two or more different objective lenses to provide the necessary artistic rendering for the various scenes to be captured.

The advent of high-resolution electronic (digital) sensors over the last ten years or so has caused a mass migration from film (analog) image capture to electronic (digital) image capture. This has substantially affected the look of images captured by the photographic camera, which tend to be less aesthetically pleasing and look more clinical with digital sensors than with analog film.

The look of the image is important to photographers for promoting their skills and to develop business with potential clients. The look of the image is also important to clients to distinguish their images from the competition. By controlling the look of the image with the kind of objective lens used enables the photographer to more readily keep control of the process, further enhancing the value of the photographer's skills.

One way to alter the look of images captured with a digital sensor is to employ anamorphic objective lenses. Anamorphic objective lenses are known for their different imaging characteristics as compared to spherical objective lenses. For example, the letter box image format produced by the squeeze ratio of anamorphic objective lenses differentiates the look of the image captured by digital sensors as compared to using spherical lenses. In particular, the anamorphic squeeze of anamorphic objective lenses produces a distinctive oval bokeh shape of out-of-focus objects and produces a depth of field that varies differently over the entire image, making the look of the image captured with digital sensors more akin to images captured with film. Together these effects produce an overall different look as compared to images captured with photographic cameras having digital sensors.

Cinematographic anamorphic objective lenses have been in common use since around the 1950's but have suffered from being expensive as compared to similar field of view and full aperture value spherical objective lenses by factors of about 2× to 3×, and in some cases substantially more. A large part of the higher cost can be attributed to the use of cylindrical lens elements, which normally have a higher manufacturing cost than spherical lens elements. Another cost aspect of anamorphic objective lenses is the preference for a predominantly front anamorphic optical construction to enhance the anamorphic look produced. In this case, all or most of the anamorphic lens elements (i.e. those with cylindrical or asymmetric surfaces) are located between the object space and the optical stop or iris. This optical arrangement improves many anamorphic characteristics of image quality including the bokeh shape. However, this optical arrangement also tends to make the cylindrical or asymmetrical lens elements large in diameter and more costly than other lens elements after the stop or iris nearer to the image space.

Furthermore, close focusing of a front anamorphic objective lens may have the characteristic that the image quality degrades significantly going from an infinity object distance to a close focus distance. This deficiency can be lessened by adding anamorphic complexity, such as at least one additional cylindrical surface to at least one lens element in front of the axially stationary anamorphic optics. This can also be done either within axially movable focusing optics or both axially movable and axially stationary optics. However, this optical arrangement also tends to make the cylindrical or asymmetrical lens elements large in diameter and more costly than other lens elements in the rest of the objective lens system.

Another consideration is the size and weight of front anamorphic lenses. Since digital cameras have become substantially smaller in both size and weight, these same features are preferred for anamorphic objective lenses to permit practical hand-held use of the camera and lens combination.

Presently, expensive and sometimes large and heavy front anamorphic objective lenses are commercially available and are commonly used in the cinematographic industry. In still photography and videography applications there are fewer but still expensive front anamorphic lenses available than in cinematography. Many of these front anamorphic lenses also tend to be large and heavy, sometimes have complicated focusing systems and produce noticeably lower image quality for objects at far distances and especially close distances.

Consequently, even though present-day front anamorphic or partially front anamorphic objective lenses provide multiple fields of view with suitable imaging characteristics, their cost, size and weight and operational complexity can be relatively high as compared to spherical objective lenses with similar fields of view and full aperture values. This problem of cost becomes particularly acute in applications where multiple anamorphic objective lenses having different focal lengths are needed.

SUMMARY

This disclosure is directed to an anamorphic objective lens system and a method for forming a set of anamorphic objective lens assemblies each having a different focal length. The anamorphic objective lens system and method utilizes a front anamorphic section (anamorphic lens subassembly) and a set of two or more rear (back) non-anamorphic sections (non-anamorphic lens sub-assemblies) each having no anamorphic lens elements (e.g., only spherical lens elements) and configured to be attached one at a time to the front anamorphic section to create different anamorphic objective lens assemblies. A set of two or more non-anamorphic sections and a single front anamorphic section allows for a set of two or more anamorphic objective lens assemblies to be formed each having a different focal length. The attachment of a given one of the non-anamorphic sections to the back end of the front anamorphic section can be performed without the need of a tool and solely by using lens mounts similar to if not identical to standard quick attached and quick release lens mounts, to provide a complete set of anamorphic objective lens assemblies.

Because the anamorphic objective lens system uses only a single front anamorphic section for use with two or more non-anamorphic attachments, the cost of multiple anamorphic objective lens assemblies is substantially reduced. This cost reduction is related to various design aspects, including the need for fewer cylindrical lens elements, hence less manufacturing effort and cost and the use of only a single focusing optics and mechanics located in the single front anamorphic section. This further simplifies the design and manufacture of the non-anamorphic sections. Because the non-anamorphic sections are specifically designed to operate with the front anamorphic section (i.e., are optically matched thereto), aberration control and image performance is optimized. In an example embodiment, the axial lens length is preserved, i.e., all of the anamorphic objective lens assemblies have the same or substantially the same axial length, e.g., to within an axial length tolerance that maintains a single calibrated focus scale without the need for adjustment when swapping the non-anamorphic sections.

In an example, the axial lens length LA does not vary between different anamorphic objective lens assemblies by a select length tolerance, e.g., about ±0.05 mm. In some cases, this length tolerance can be halved or doubled or more than halved or doubled, depending on the resolution to be attained and the acceptable error at the focus scale of the focus dial (see FIG. 15), which depends on the thickness of the focus mark line and focus index mark line which can vary, and how much they need to overlap for acceptance, etc. In most cases, the acceptable error at the focus scale will be greater than the above value, but a conservative approach sets the lens length tolerance at ±0.05 mm value to ensure optimal performance between different anamorphic objective lens assemblies.

In practice, the different non-anamorphic sections 50(i) in a given set 40 of such sections can vary slightly in their length LB due to manufacturing errors. In cases where the variation is relatively large and places the overall lens length LA outside of the select tolerance, the given non-anamorphic section 50(i) can be moved towards or away from the front anamorphic section by small increments, e.g., by shimming or machining metal, without substantially altering the aberration balance and imaging performance.

Additional benefits include reduced size and weight, closer focusing, higher performance imaging at close focus and more consistent image performance over the entire focus range. This is achieved in part by relegating the optical and mechanical complexity to the front anamorphic section while keeping the optical and mechanical design of the multiple non-anamorphic sections relatively simple.

The non-anamorphic sections are designed to optically match the front anamorphic section to optimize imaging performance for the given imaging application, i.e., so that the resulting anamorphic objective lens assembly has high-performance imaging regardless of which non-anamorphic section is used with the front anamorphic section. Consequently, one simply cannot take an off-the-shelf non-anamorphic (e.g., spherical) objective lens, attach it to the front anamorphic section and expect to have suitable imaging performance for the given application. This is because an off-the-shelf non-anamorphic objective lens is unlikely to have an entrance pupil location that suitably matches the exit pupil location of the front anamorphic section. This entrance-exit pupil location mismatch leads to vignetting or even a hard vignette of light that deforms the image especially at the corner of the image diagonal (i.e. no image produced at all). In addition, the cost of an off-the-shelf non-anamorphic objective lens that one might consider for swapping would almost certainly be substantially more expensive than the non-anamorphic sections disclosed herein since the off-the-shelf spherical objective lens will almost certainly have focusing optics and mechanics. Moreover, using an off-the-shelf non-anamorphic objective lens for swapping will generate residual aberrations in the resulting anamorphic objective lens assembly since the combined lenses were not specifically designed to operate with each other in tandem. And in the case where axil length preservation is desirable; it is highly unlikely that a set of off-the-shelf non-anamorphic objective lenses will result in anamorphic objective lens assemblies having the same axial length when they are swapped with one another.

The non-anamorphic sections are designed to optically match the front anamorphic section to reduce the diameter as well as size, weight and cost of the front-most lens elements, including anamorphic lens elements with cylindrical or asymmetric surfaces. The non-anamorphic sections are configured to define an anamorphic objective lens system that can have multiple focal lengths, from a relatively short focal length having a relatively wide field of view to a relatively long focal length having a relatively narrow field of view.

To further reduce the diameter as well as size, weight and cost of the front-most lens elements of the front anamorphic section and to protect the relatively expensive large-diameter cylindrical or asymmetrical lens elements of the front anamorphic section, in an example one or more non-anamorphic lens elements collectively having (i.e., having overall) zero or positive power is/are located between the object space and the most object-space-wise anamorphic lens element. The one or more non-anamorphic lens elements can either comprise or consist of one or more spherical lens elements, and even further in the example can comprise a single spherical lens element. In an example, the spherical lens element can be bi-convex.

In another example, the one or more of the non-anamorphic lens elements can comprise a glass plate (e.g., a single glass plate), which has zero optical power. It is known in the art that the use of a glass plate at or near the front end of an object lens gives rise to undesirable ghosting (also referred to in the art as "narcissistic ghosting") so that the use of a glass plate may reduce the imaging performance of the anamorphic object lens assemblies disclosed herein absent features incorporated into the design directed to reduce or eliminate such ghosting.

The optics in the single front anamorphic section is relatively complex in order to provide the aforementioned advantageous characteristics of the multiple anamorphic objective lens assemblies formed using the multiple non-anamorphic sections, such as the oval bokeh, an anamorphic depth of field, a close focusing capability, a reduced size and weight, and reduced overall cost. The cost and complexity of the single front anamorphic section is counterbalanced by the substantial reduction in cost and complexity of the multiple non-anamorphic sections so that the overall cost of multiple anamorphic objective lens assemblies is far less than the overall cost of the same number of conventional anamorphic objective lenses, and the fact that only one front anamorphic section is required to provide multiple focal lengths. This cost benefit is explained in greater detail below.

Although the examples provided herein show embodiments having three different non-anamorphic sections with corresponding different fields of view, in general two or more anamorphic sections can be employed, each designed to provide the anamorphic objective lens assembly with a different focal length and different field of view. In principle, there is no limit to the number of non-anamorphic sections that can be utilized and the actual number utilized will be dictated by the given application as will be understood by one skilled in the art.

It is known in the art that objective lenses can be of fixed focal length or of variable focal length, with the latter being referred to as a zoom lens. The examples provided herein set forth embodiments wherein each of the non-anamorphic sections in the set of non-anamorphic sections has a fixed focal length. In other examples, at least one of the non-anamorphic sections can comprise a zoom lens, i.e., a zoom non-anamorphic section. The at least one zoom non-anamorphic section can have for example at least two axially moveable lens elements having optical power that can either alone or together and through optimization provide a zoom function that defines at least two different focal lengths. This allows for the non-anamorphic lens assembly that employs the zoom non-anamorphic section to have at least two different focal lengths without having to swap for a different non-anamorphic section. In an example, the set of non-anamorphic sections can include one or more zoom non-anamorphic sections, consist entirely of zoom non-anamorphic sections, can consist of fixed focal length non-anamorphic sections, or comprise a combination of zoom non-anamorphic sections and fixed focal length non-anamorphic sections.

The anamorphic objective lens system described herein has a wide variety of applications, including in the consumer market (e.g., still and video), and in cinematography. In addition, the single front anamorphic section can be designed to provide different squeeze ratio values.

In some cases, it may be acceptable to change the focus scale to accommodate non-anamorphic sections having different lengths. This may be accomplished by changing the focus scale and replacing it with a different focus scale. An alternative is to have multiple focus scales on the same mechanical part and making one scale visible through a window aperture but not another and then by physically moving the part changing the visible scale.

Further refinements to the anamorphic objective lens systems and methods disclosed herein can include: (i) having substantially constant or precisely constant axial lens length for the different anamorphic objective lens assemblies formed by swapping non-anamorphic sections. This allows for a focus scale on the front anamorphic section to maintain its calibration for the different focal lengths produced. This means the focus scale does not have to be changed or altered when swapping the non-anamorphic sections; (ii) employing a combination of X and Y cylindrical lens elements to consistently maximize the image quality, including minimizing the peripheral distortion over the focus range for all focal lengths; (iii) employing an X cylinder surface in the front anamorphic section either in the axially movable focusing lens sub-group or in a stationary lens sub-group forward of the movable focusing lens sub-group; (iv) swapping non-anamorphic sections with other non-anamorphic sections from a set of non-anamorphic sections to provide one or more of different focal length, field angle, full aperture value and image size; (v) including in the set of non-anamorphic sections at least one variable focal length (VFL) non-anamorphic section which is commonly referred to as a zoom lens, wherein the VFL anamorphic section comprises at least two axially moveable lens elements having optical power which can either alone or together and through optimization provide a zoom function to define at least two focal lengths for the anamorphic lens system. In this example refinement (v), the objective lens system can provide at least two focal lengths by using a single VFL non-anamorphic section. The at least one VFL non-anamorphic section can be used in combination with non-VFL (i.e., non-zooming) non-anamorphic sections to provide a set of anamorphic lens assemblies having three or more focal lengths (including a longest and a shortest focal length) consistent with the non-anamorphic section examples provided herein.

Additional embodiments of the disclosure include the following.

(1) An anamorphic objective lens system having orthogonal vertical and horizontal directions and, comprising along an optical axis and in order from an object space to an image space: a front anamorphic section having a back end and an anamorphic lens group with axially stationary first and third lens sub-groups that are respectively most object-space-wise and most image-space-wise, and a second lens sub-group between said first and third lens sub-groups that is axially movable for focusing, wherein the front anamorphic lens group comprises at least two anamorphic lens elements; and a set of two or more non-anamorphic sections each having a front end and a non-anamorphic lens group that is axially stationary and optically matched to the anamorphic lens group of the front anamorphic section, wherein the front end is configured to be removably connected to the back end of the front anamorphic section to define one of a set of two or more anamorphic objective lens assemblies having different vertical focal lengths.

(2) The anamorphic objective lens system according to (1), wherein the front anamorphic section comprises a focus scale having a calibration, and wherein the two or more anamorphic objective lens assemblies have respective first and second axial lengths that are the same to within an axial length tolerance that maintains the calibration of the focus scale.

(3) The anamorphic objective lens system according to (1) or (2), wherein: the third lens sub-group defines a backmost lens surface of the front anamorphic section, wherein the backmost lens surface has a clear aperture diameter CA; and wherein a first one of two or more anamorphic objective lens assemblies has a first image-space F-number and a shortest-focal-length clear aperture $CA=CA_S$ and a second one of the two or more anamorphic objective lens assemblies has a second image-space F-number and a longest-focal-length clear aperture $CA=CA_L$, and wherein $CA_S \leq CA_L$ when the first and second image-space F-numbers are the same.

(4) The anamorphic objective lens system according to (1), (2) or (3), wherein $CA_S < CA_L$.

(5) The anamorphic objective lens system according to any of (1) through (4), wherein a first one of two or more anamorphic objective lens assemblies has a first vertical focal length that is a shortest vertical focal length FLY1, a second one of two or more anamorphic objective lens assemblies has a second vertical focal length that is a longest vertical focal length FLY2, and wherein the shortest and longest vertical focal lengths FLY1 and FLY2 define a vertical focal length ratio RYFL=1.25<FLY2/FLY1<100.

(6) The anamorphic objective lens system according to any of (1) through (5), wherein the back end of the front anamorphic section and the front ends of the two or more non-anamorphic sections comprise respective lens mounting fixtures configured to operably engage and disengage.

(7) The anamorphic objective lens system according to any of (1) through (6), wherein the non-anamorphic lens group comprises lens elements and wherein all of said lens elements are spherical lens elements.

(8) The anamorphic objective lens system according to any of (1) through (7), wherein the at least two anamorphic lens elements in the anamorphic lens group comprises at least one cylindrical lens element.

(9) The anamorphic objective lens system according to any of (1) through (8), wherein the at least two anamorphic lens elements consist of: in the first lens sub-group, a single cylindrical lens element having optical power in a first (X) direction; in the second lens sub-group, a single cylindrical lens element having optical power in a second (Y) direction orthogonal to the first direction; in the third lens sub-group, four cylindrical lens elements, with two of the front-most of the four cylindrical lens elements having optical power in the second (Y) direction and the remaining two rear-most cylindrical lens elements having optical power in the first (X) direction.

(10) The anamorphic objective lens system according to any of (1) through (9), wherein each of the non-anamorphic lens groups of the non-anamorphic sections comprises an aperture stop that defines an F-number for each of the anamorphic objective lens assemblies.

(11) The anamorphic objective lens system according to any of (1) through (10), wherein the front anamorphic section comprises a focus dial having focus scale that remains calibrated when different ones of the two or more non-anamorphic sections are operably attached to the front anamorphic section one at a time.

(12) The anamorphic objective lens system according to any of (1) through (11), wherein one of the at least two anamorphic lens elements comprises a most object-space-wise anamorphic lens element, and wherein the first lens group comprises, between the object space and the most object-space-wise anamorphic lens element, one or more non-anamorphic lens elements collectively having either zero optical power or positive optical power.

(13) The anamorphic objective lens system according to any of (1) through (12) wherein the at least one non-anamorphic lens element comprises at least one spherical lens element.

(14) A camera system, comprising: the anamorphic objective lens system according to any of (1) through (13), wherein the front anamorphic section comprises a first lens barrel and the first and second non-anamorphic sections each comprises respective second lens barrels each having a back end; a camera housing having an interior and a front end that supports a lens mounting fixture to which the back ends of the second lens barrels are operably attachable and detachable one at a time; an image sensor operably disposed within the camera housing interior and at an image surface in the image space of the anamorphic objective lens system when the lens barrel is attached to the camera housing; and camera electronics electrically connected to the image sensor.

(15) A camera system, comprising: the set of anamorphic objective lens assemblies of the anamorphic objective lens system according to any of (1) through (13); a camera housing having an interior and a front end that supports a lens mounting fixture to which each of the anamorphic objective lens assemblies in the set of anamorphic objective lens assemblies are operably attachable and detachable one at a time; an image sensor operably disposed within the camera housing interior and disposed at an image surface common to each of the anamorphic objective lens assemblies in the set of anamorphic objective lens assemblies; and camera electronics electrically connected to the image sensor.

(16) A method of performing anamorphic imaging for an imaging application at different vertical focal lengths using a camera, comprising: providing a front anamorphic section having a back end and comprising an anamorphic lens group that includes an axially movable lens sub-group; attaching to the back end of the front anamorphic section a first non-anamorphic section comprising a first non-anamorphic lens group that is optically matched to the anamorphic lens group and having only stationary first non-anamorphic lens elements and a first aperture stop to form a first anamorphic objective lens assembly having a first vertical focal length FLY1 and a first axial lens length; performing a first imaging process with the first anamorphic objective lens assembly to form a first suitable image for the imaging application; removing the first non-anamorphic section from the back end of the front anamorphic section and attaching to the back end a second non-anamorphic section comprising a second non-anamorphic lens group having only stationary second non-anamorphic lens elements and a second aperture stop to form a second anamorphic objective lens assembly having a second vertical focal length FLY2 and a second axial length; and performing a second imaging process with the second anamorphic objective lens assembly to form a second suitable image for the imaging application.

(17) The method according to (16), wherein: performing the first imaging process includes operably attaching the first anamorphic objective lens to a camera having an image sensor and capturing a first image with the image sensor; and performing the second imaging process includes removing the first anamorphic objective lens from the camera and operably attaching the second anamorphic objective lens to the camera and capturing a second image with the image sensor.

(18) The method according to (16) or (17), wherein: providing the set of two or more non-anamorphic sections compromises providing at least three non-anamorphic sections respectively having a shortest focal length, a longest focal length and a medium focal length between the shortest and longest focal lengths; the shortest focal length non-anamorphic section forms the vertical focal length FLY1 of the first anamorphic objective lens assembly as a shortest vertical focal length and the longest focal length non-anamorphic section forms the second vertical focal length FLY2 of the first anamorphic objective lens assembly as the longest vertical focal length, so that FLY2>FLY1; and first (shortest) and second (longest) vertical focal lengths FLY1 and FLY2 define a ratio RYFL=FLY2/FLY1, wherein 1.25<RYFL<100.

(19) The method according to any of (16) through (18), wherein: the axially movable second lens sub-group for focusing has at least one non-rotationally symmetric surface; the focusing is carried out using a focus scale having a calibration on the front anamorphic section; and the first and second anamorphic objective lens assemblies respectively have first and second axial lengths that are the same to within an axial length tolerance that maintains the calibration of the focus scale.

(20) An anamorphic objective lens system, comprising along an optical axis and in order from an object space to an image space: a front anamorphic section having a back end and comprising an anamorphic lens group comprising at least two non-rotationally symmetric surfaces and comprising a most object-space-wise axially stationary first lens sub-group and a, most image-space-wise axially stationary third lens sub-group and a second lens sub-group between said first and third lens sub-groups, wherein the second lens sub-groups is axially movable for focusing, and wherein the third lens sub-group defines a backmost optical surface closest to the back end of said front anamorphic section, wherein one of the at least two non-rotationally symmetric surfaces resides in one of the first and second lens sub-groups and the other of the two non-rotationally symmetric surfaces resides in the third lens sub-group; and multiple rear non-anamorphic sections each removably attachable to the back end of the front anamorphic section to form multiple anamorphic objective lens assemblies that define a set of anamorphic object lens assemblies, with each of the multiple rear non-anamorphic sections comprising a vertical direction and multiple non-anamorphic lens groups that are axially stationary and non-anamorphic, wherein the non-anamorphic lens groups are optically matched to the front anamorphic section to define for each of the anamorphic objective lens assemblies different vertical focal lengths comprising a shortest vertical focal length that defines a first image-space F-number and a first clear aperture diameter $CA_S$ for said backmost optical surface and a longest vertical focal length that defines a second image-space F-number and a second clear aperture diameter $CA_L$ for said last optical surface, and wherein $CA_S \leq CA_L$ when the first and second image-space F-numbers are the same.

Another embodiment of the disclosure includes a camera system, comprising: an anamorphic objective lens assembly as disclosed herein as formed using the anamorphic objective lens system as disclosed herein; a lens barrel having a back end, the lens barrel operably supporting the anamorphic objective lens assembly; a camera housing having an interior and a front end that supports a lens mounting fixture to which the back end of the lens barrel attaches; an image sensor operably disposed within the camera housing interior and at the image surface of the anamorphic objective lens assembly when the lens barrel is attached to the camera housing; and camera electronics electrically connected to the image sensor. This embodiment allows for the camera to use a variety of different anamorphic objective lens assemblies having different focal lengths.

Another embodiment of the disclosure includes a camera system, comprising: an anamorphic objective lens system having a front anamorphic section and multiple non-anamorphic sections each configured to be attached to a back end of the front anamorphic section to define an anamorphic objective lens assembly having a select focal length, with each non-anamorphic section defining a different focal length for the anamorphic objective lens assembly; a camera housing having an interior and a front end that supports a lens mounting fixture to which one of the anamorphic objective lens assembly in the set of anamorphic objective lens assemblies operably attaches; an image sensor operably disposed within the camera housing interior and disposed at an image surface common to each of the anamorphic objective lens assemblies in the set of anamorphic objective lens assembly; camera electronics electrically connected to the image sensor.

BRIEF DESCRIPTION OF THE DRAWINGS AND TABLES

FIG. 1A is a schematic diagram of the anamorphic objective lens system as disclosed herein as formed by a front anamorphic section having an anamorphic lens group (G1) and a non-anamorphic section having an anamorphic lens group (G2), wherein the non-anamorphic section attached to the front anamorphic section is selected from a set of non-anamorphic sections to define anamorphic objective lens assemblies having different focal lengths, with the different non-anamorphic sections defining the different focal lengths.

Figure 2A:
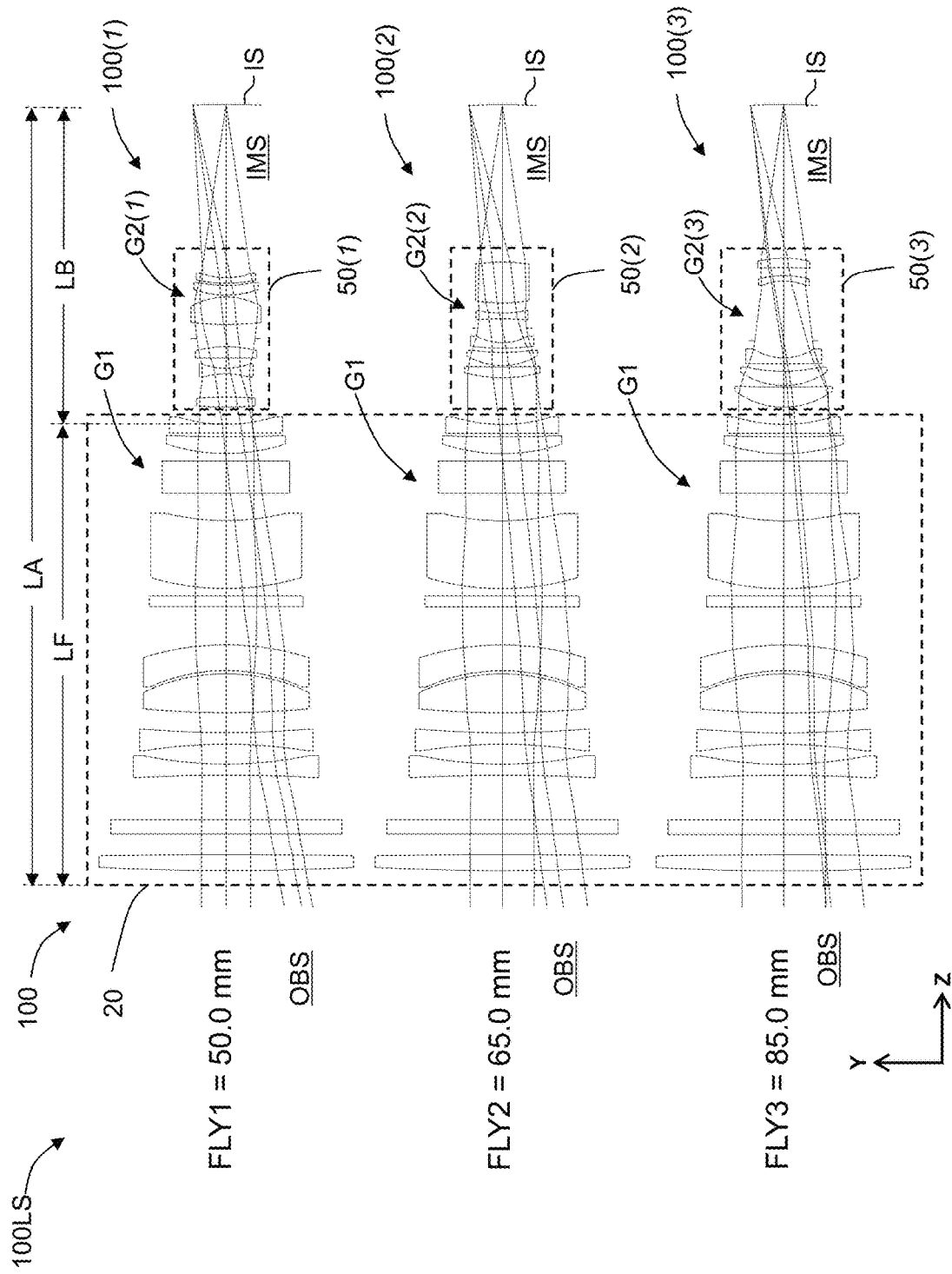
FIGS. 2A and 2B are side (Y-Z plane) and plane (X-Z) detailed views, respectively, of three different anamorphic objective lens assemblies having different X and Y focal lengths as defined by using three different non-anamorphic lens groups, noting that the focal lengths are paraxial, with the Y-direction focal length being exact and the X-direction focal length being approximate.
Figure 2B:
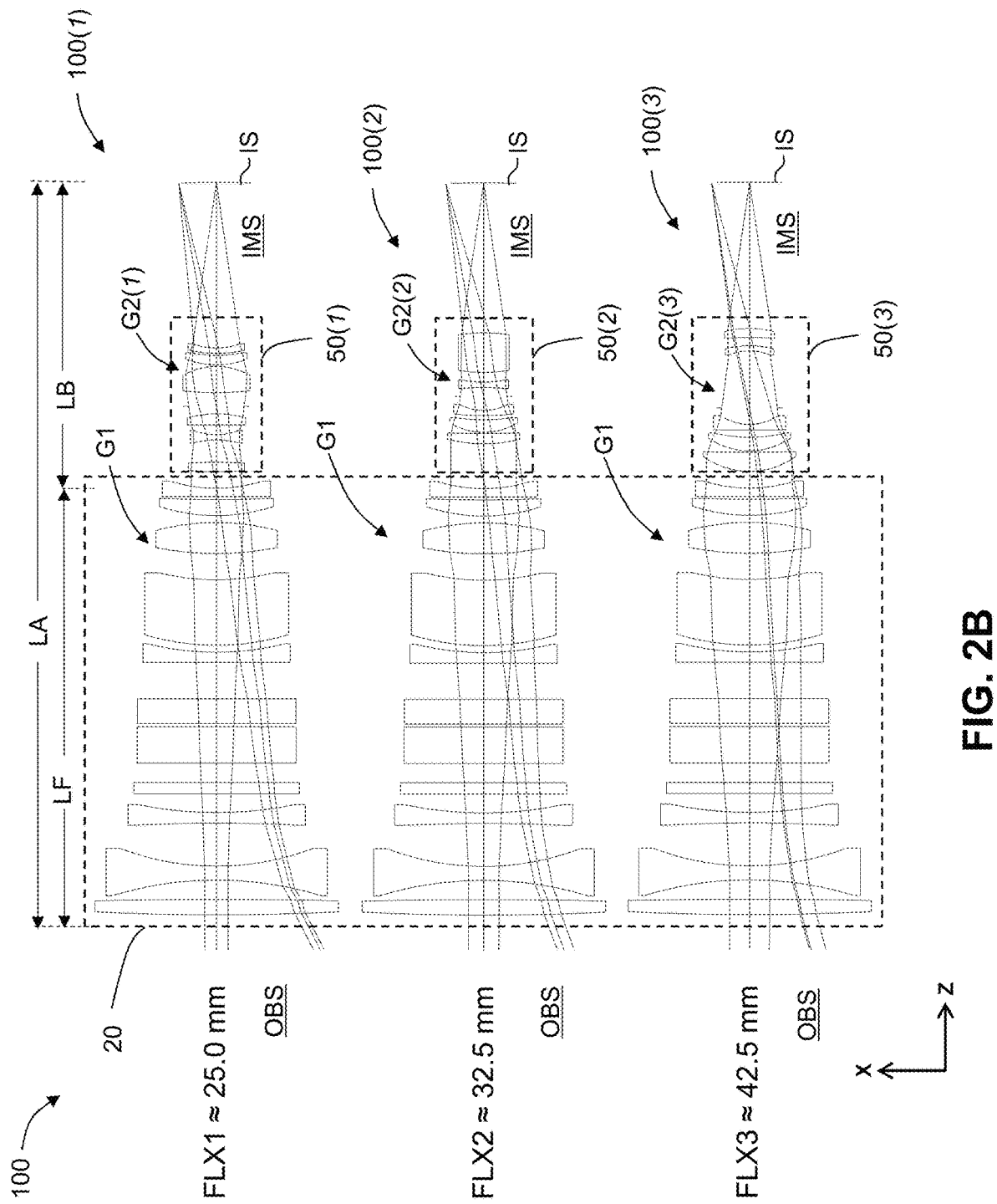
Figures 2C, 2D, 2E:
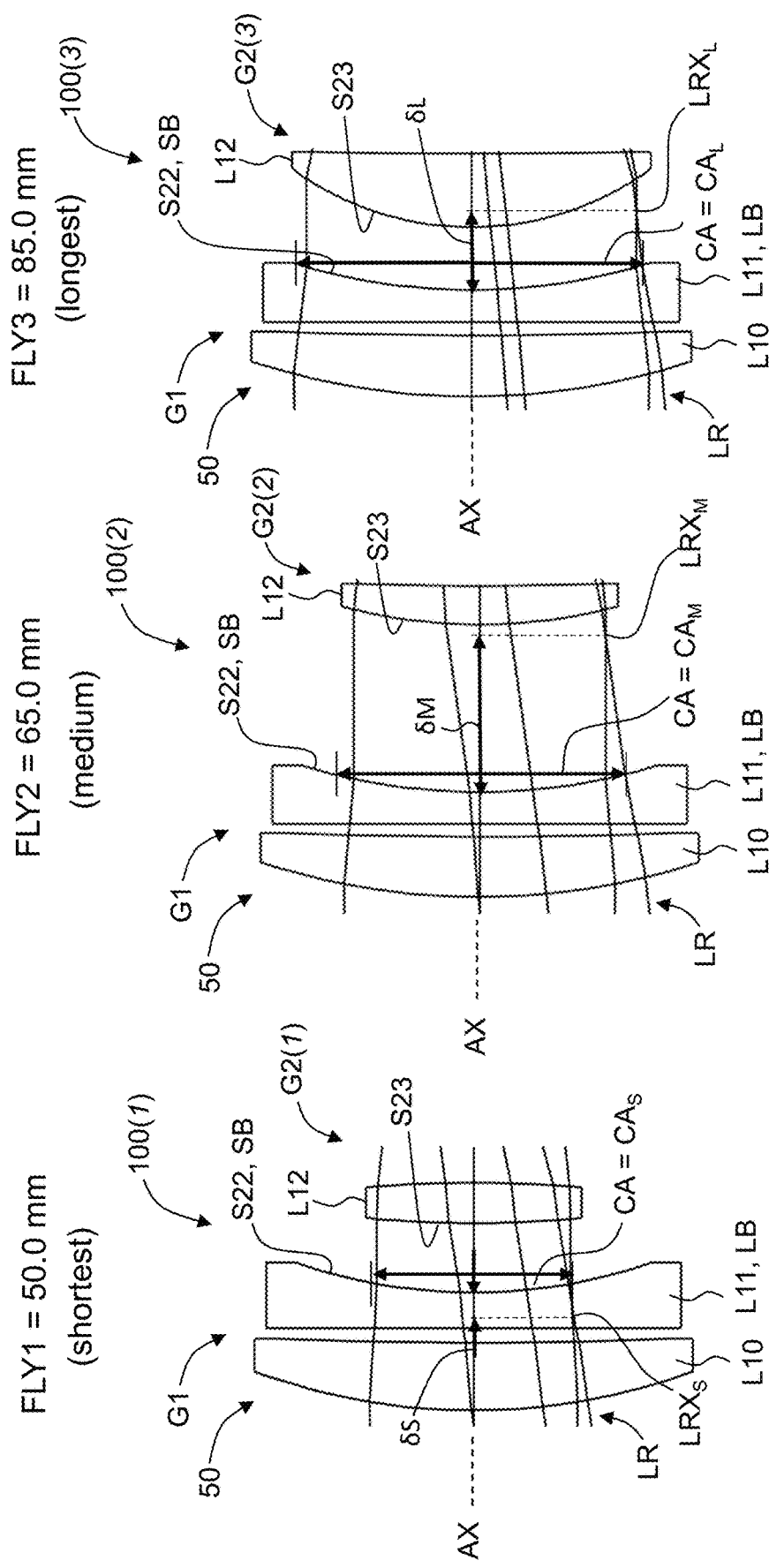

FIGS. 2C, 2D and 2E are close-up views of the backmost lens element of the front anamorphic section and the frontmost lens element of the back non-anamorphic section along with traced rays for example short focal length (FIG. 2C), medium focal length (FIG. 2D) and long focal length (FIG. 2E) for the anamorphic objective lens assembly embodiments, illustrating how the maximum clear aperture CA of the aforesaid backmost surface of the backmost lens element of the front anamorphic section occurs for the longest focal length anamorphic objective lens assembly.

Figure 3A:
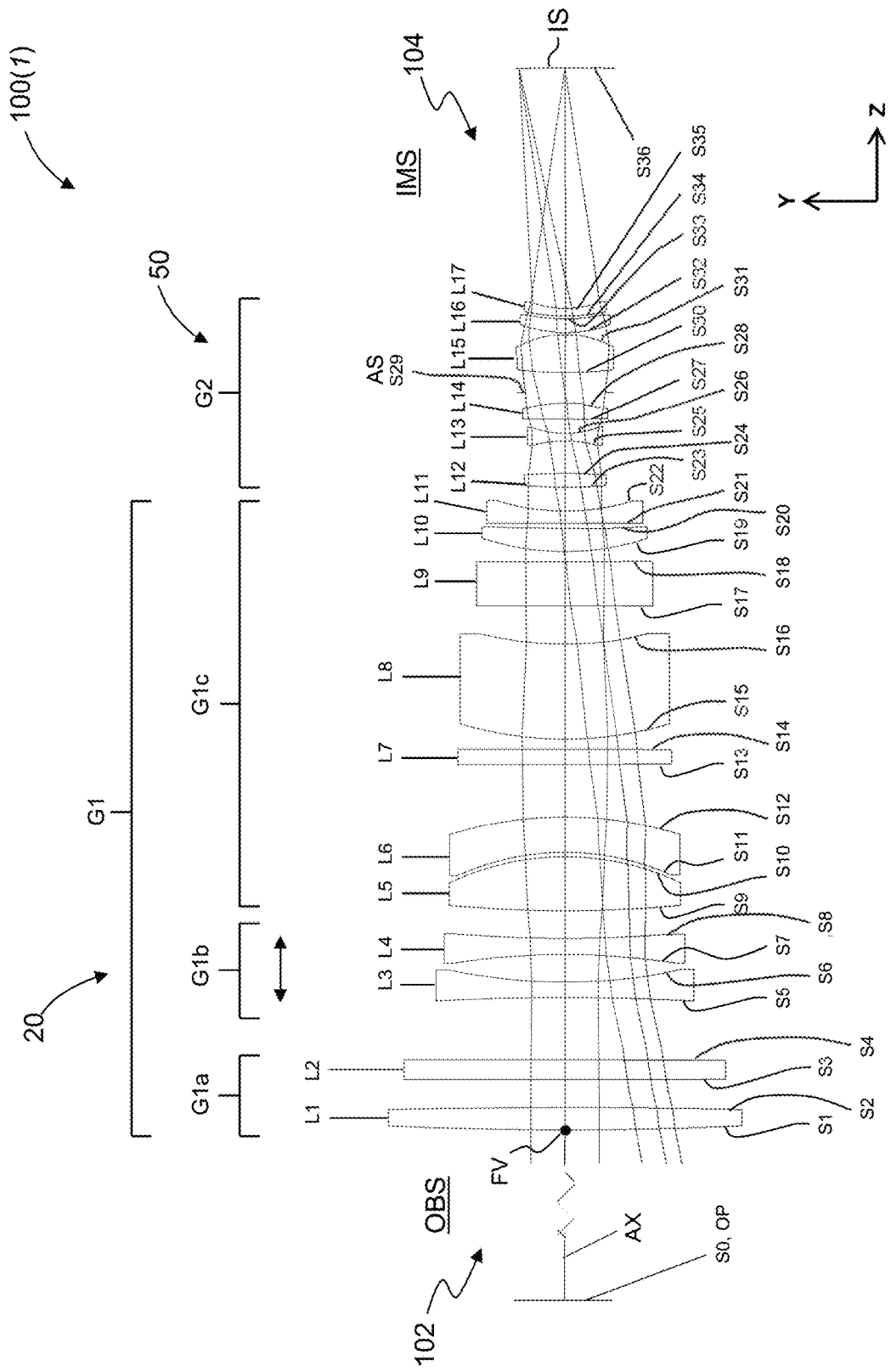

FIG. 3A is a close-up side (Y-Z plane) view of the short focal length embodiment (100(1)) of the anamorphic objective lens assembly of FIG. 2A, wherein FLY1=50.0 mm and FLX1≈25.0 mm.

Figure 3B:
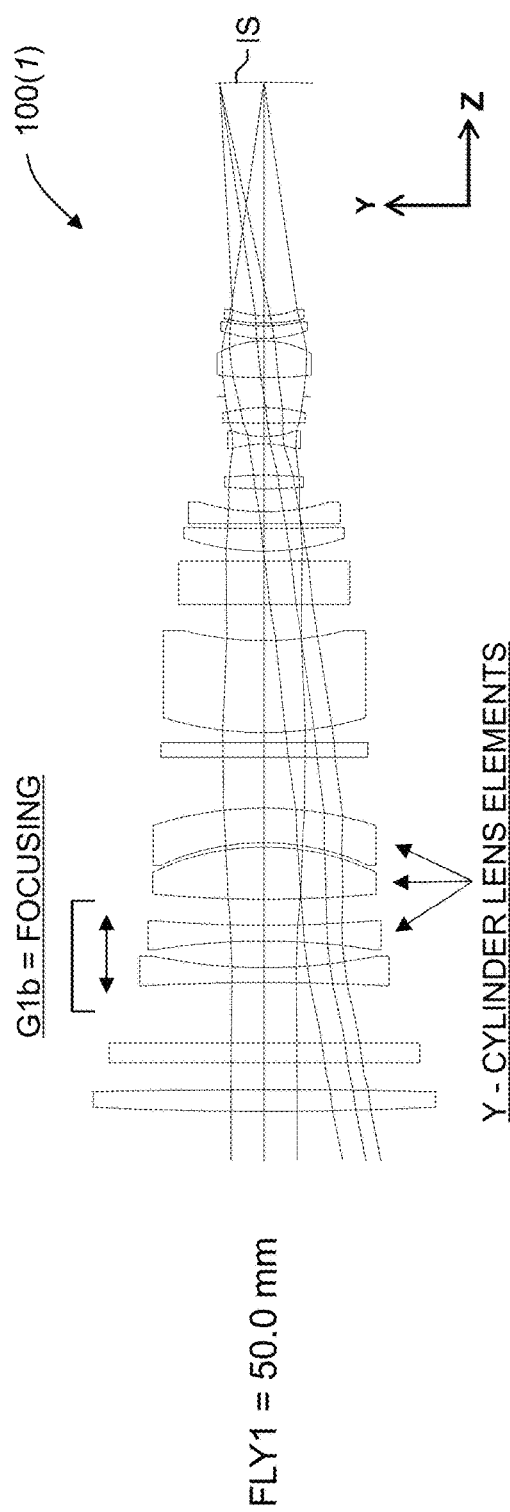
Figure 3C:
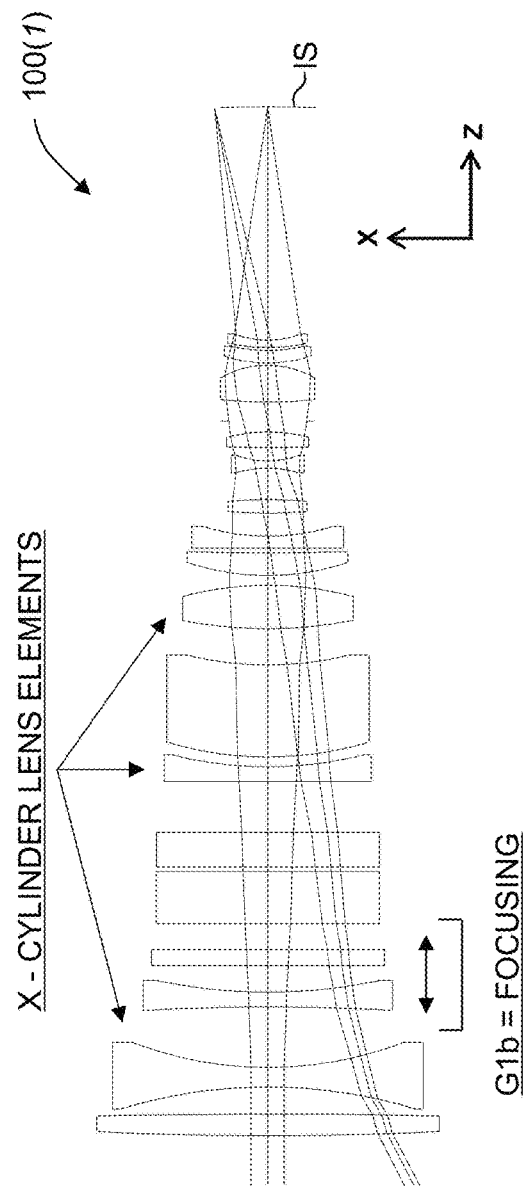

FIGS. 3B and 3C are side (Y-Z plane) and plane (X-Z) views, respectively, of the short focal length embodiment of the anamorphic objective lens assembly of FIG. 3A, highlighting the Y-cylinder and X-cylinder lens elements.

Figure 3E:
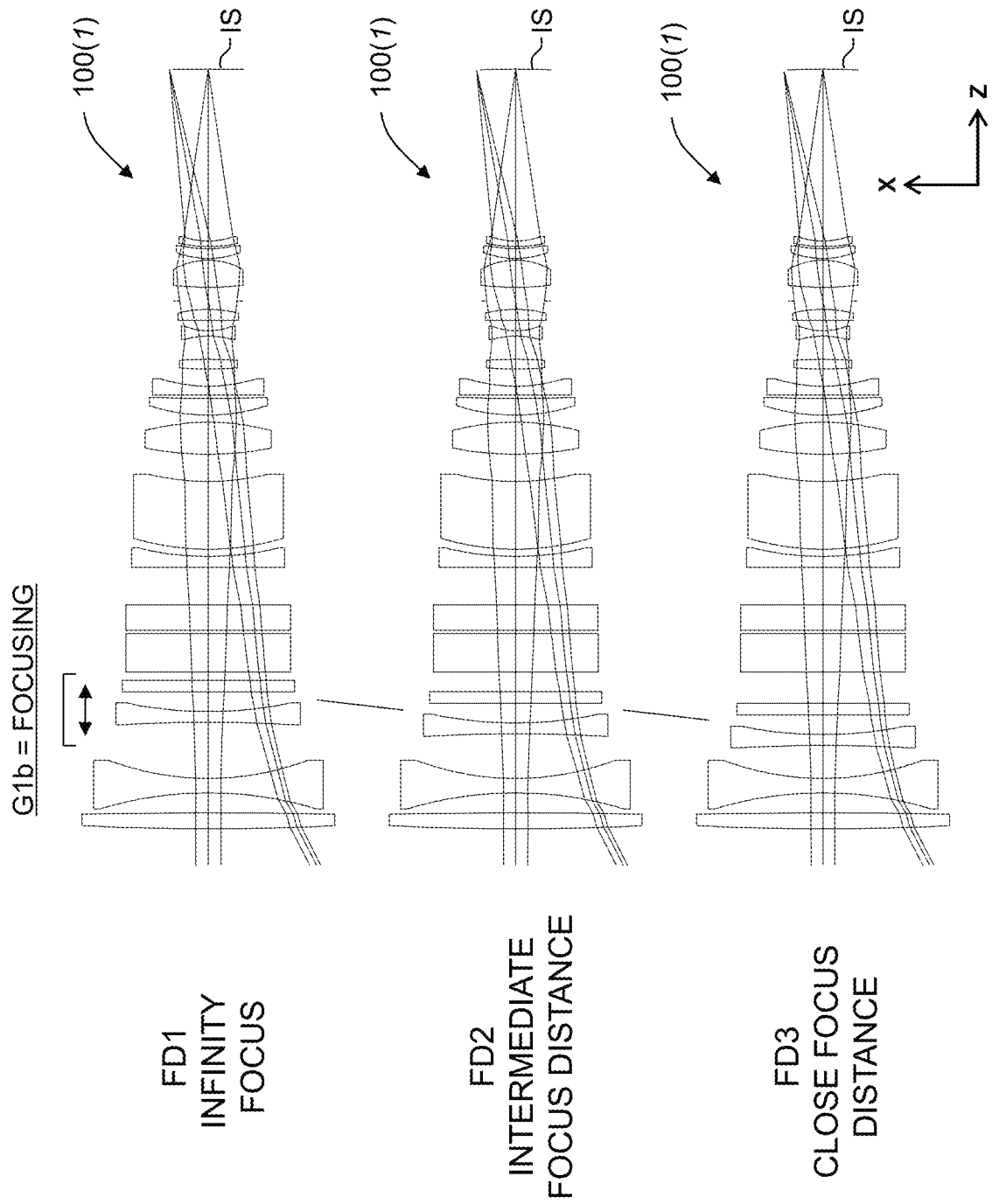

FIGS. 3D and 3E show side (Y-Z plane) and plane (X-Z) views of the short focal length embodiment of the anamorphic objective lens assembly of FIG. 3A, illustrating the movement of the focusing sub-group G1*b* for infinity focus, intermediate focus ("mid-focus") distance and close focus distance.

Figure 4A:
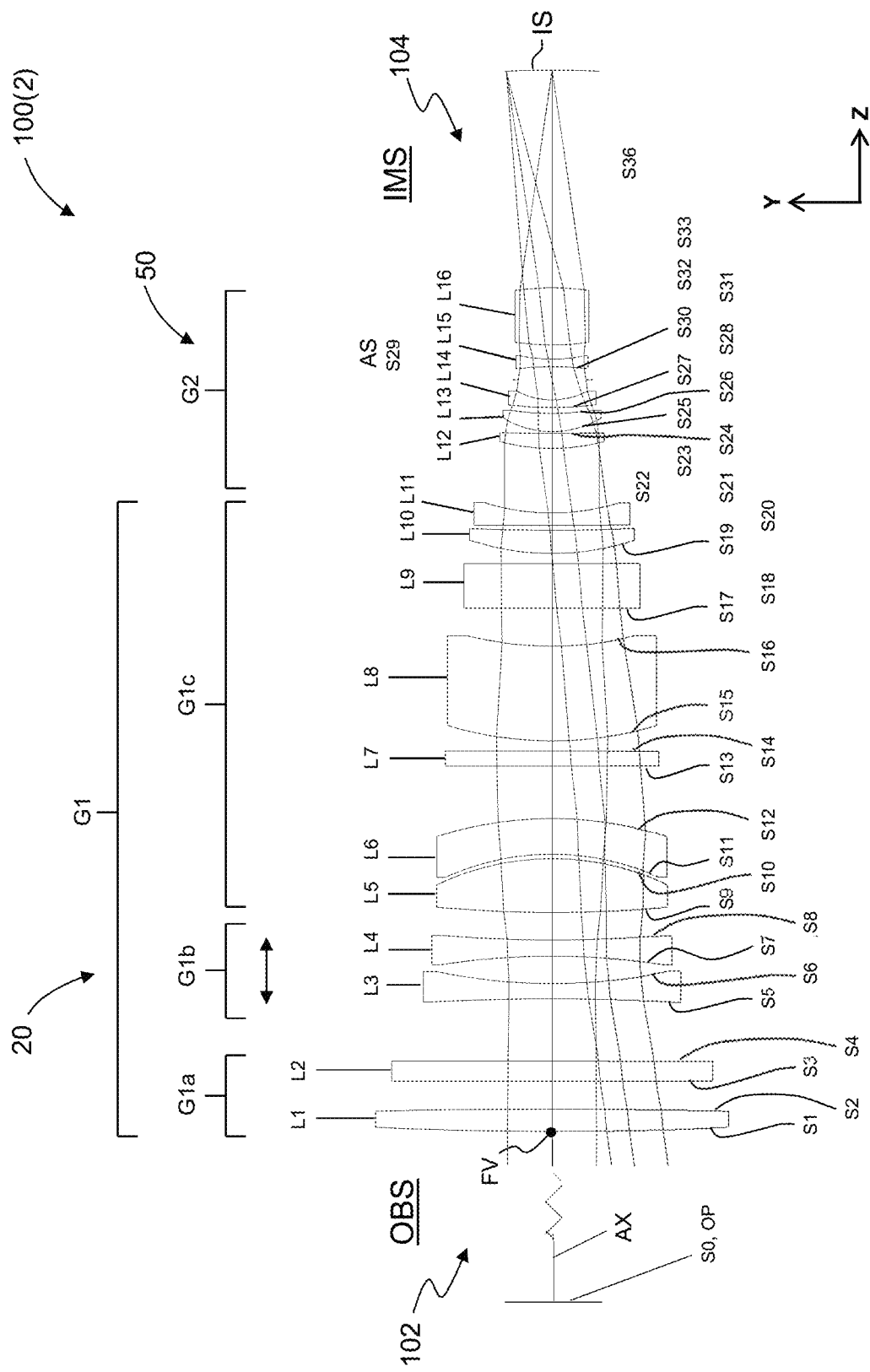

FIG. 4A is a close-up side (Y-Z plane) view of the medium focal length embodiment (100(2)) of the anamorphic objective lens assembly of FIG. 2A, wherein FLY2=65.0 mm and FLX2≈32.5 mm.

Figure 4B:
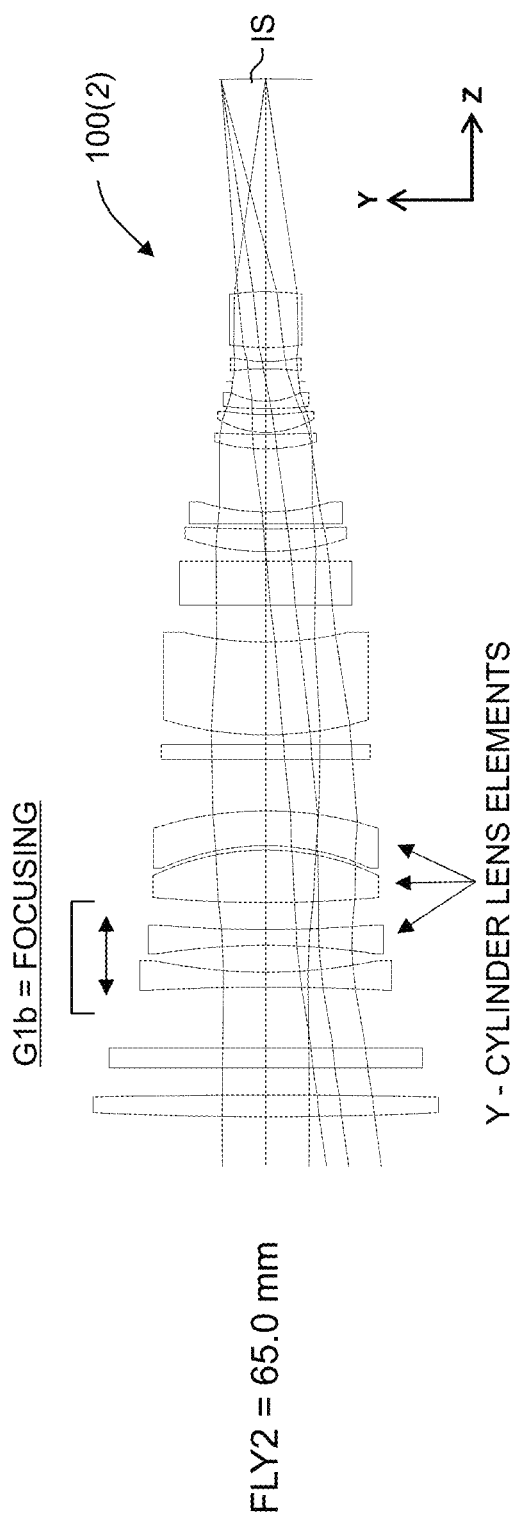
Figure 4C:
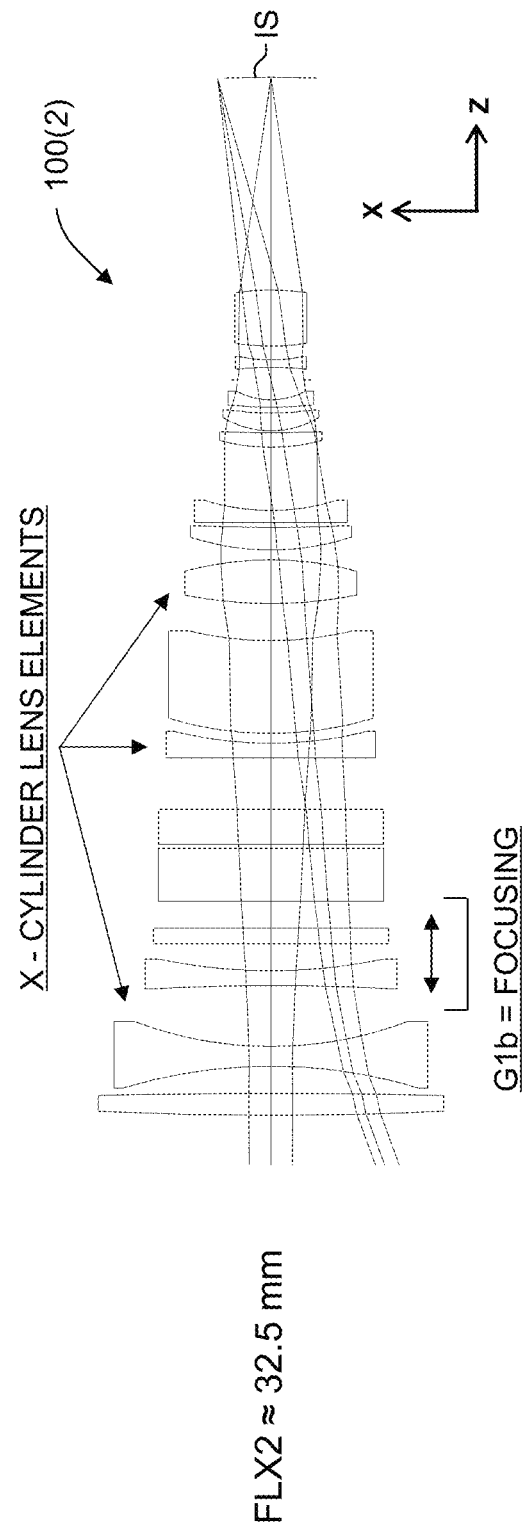

FIGS. 4B and 4C are side (Y-Z plane) and plane (X-Z) views, respectively, of the medium focal length embodiment of the anamorphic objective lens assembly of FIG. 4A, highlighting the Y-cylinder and X-cylinder lens elements.

Figure 4D:
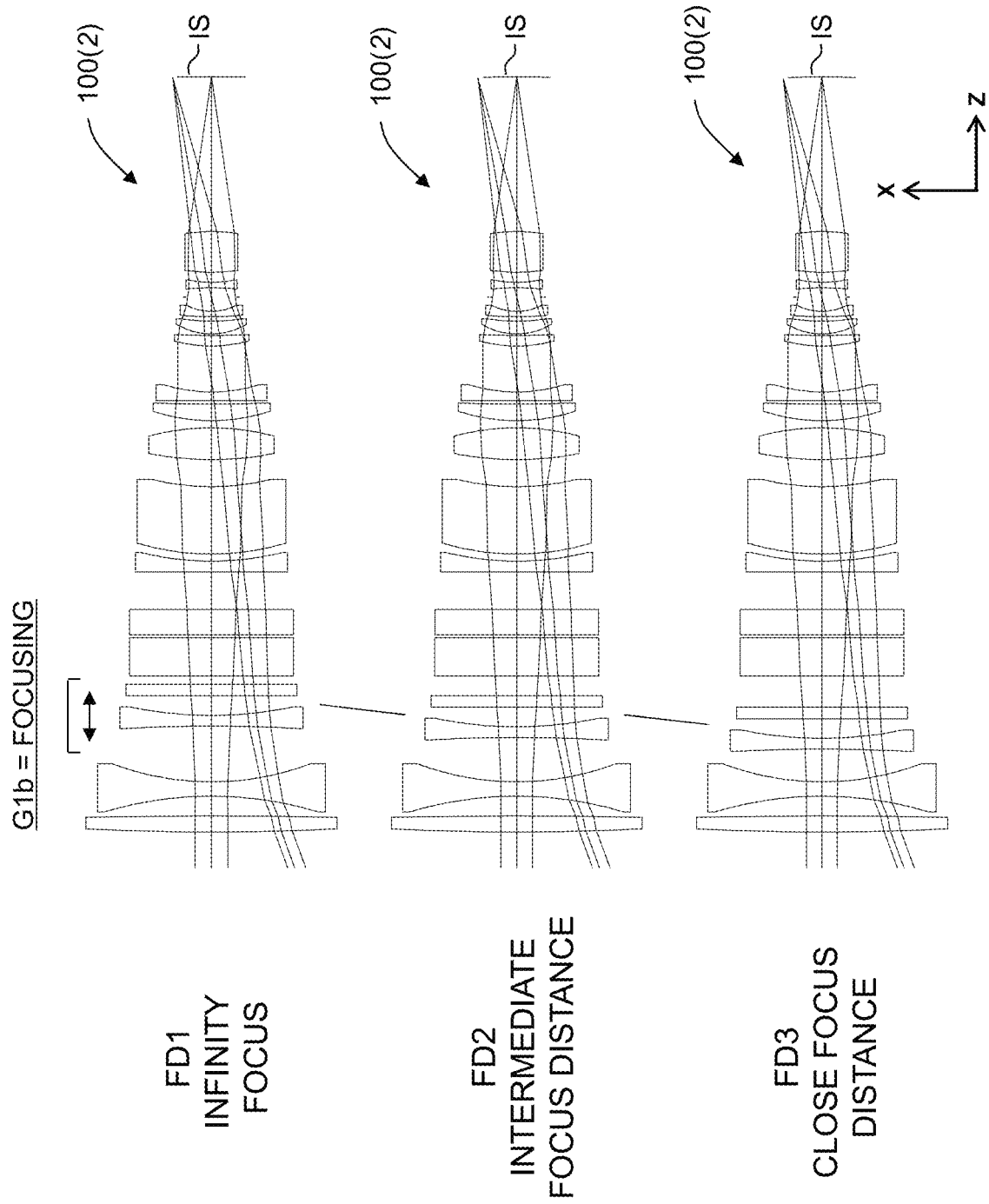
Figure 4E:
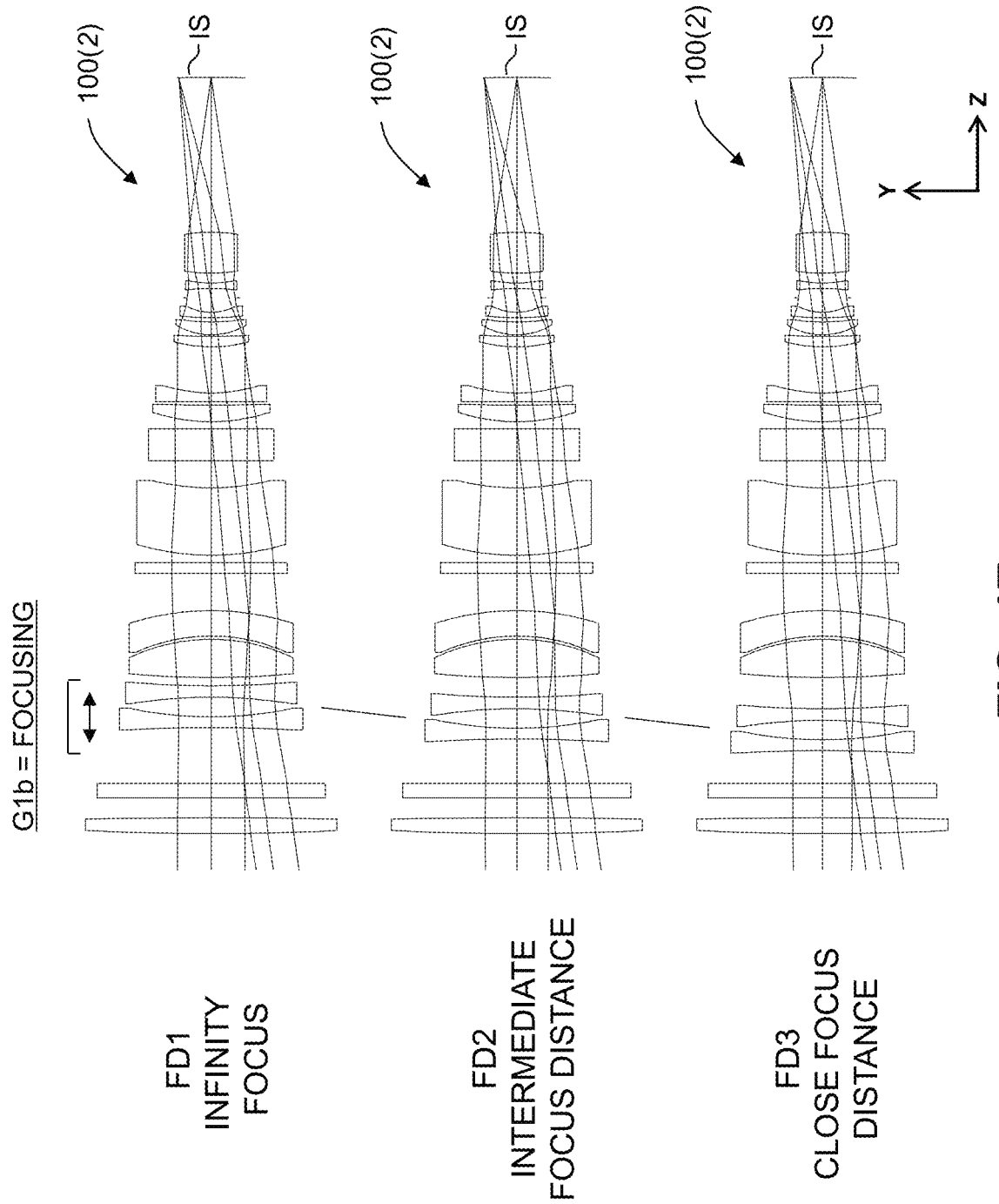

FIGS. 4D and 4E show side (Y-Z plane) and plane (X-Z) views of the medium focal length embodiment of the anamorphic objective lens assembly of FIG. 4A, illustrating the movement of the focusing sub-group G1b for infinity focus, intermediate focus distance and close focus distance.

Figure 5A:
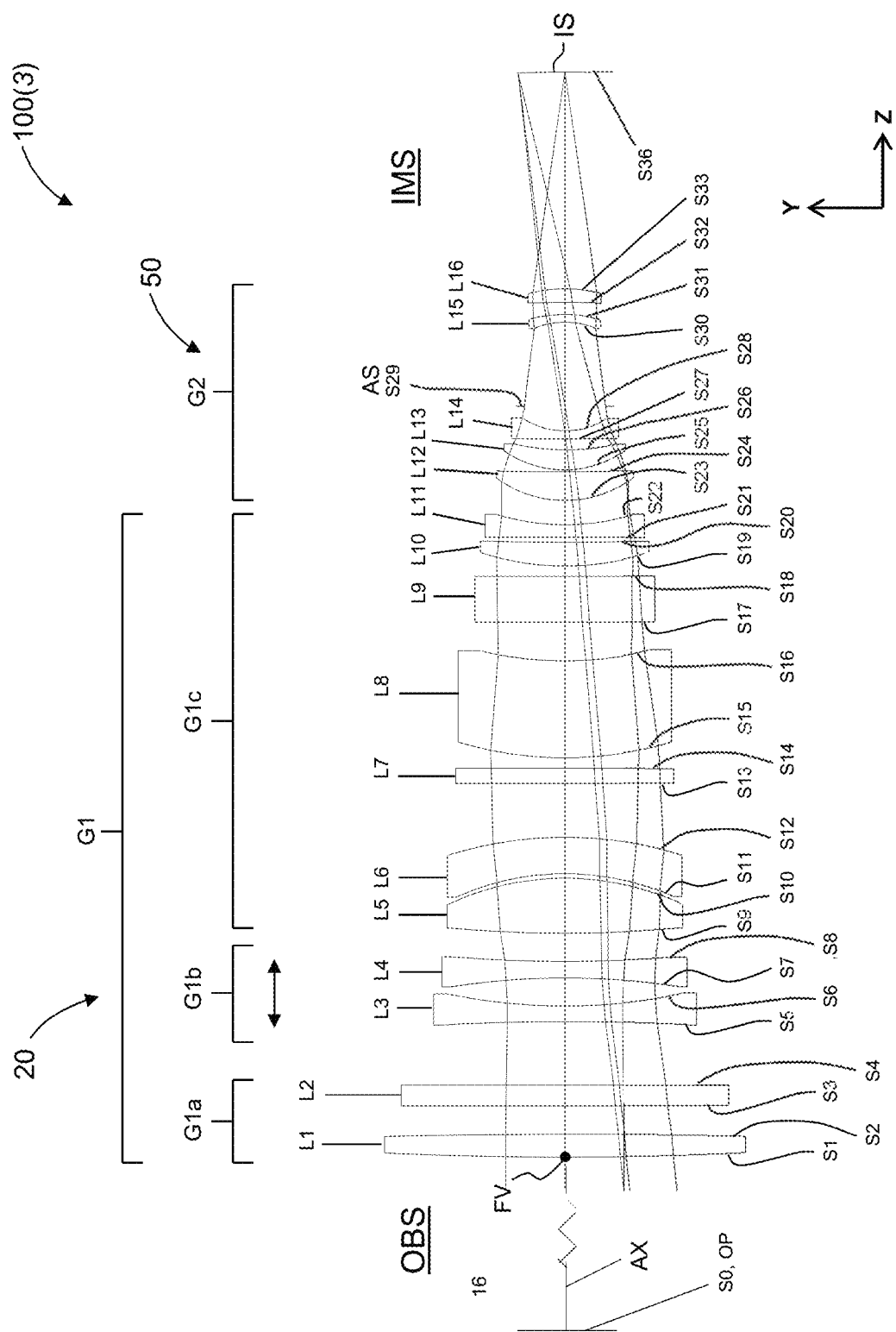

FIG. 5A is a close-up side (Y-Z plane) view of the long focal length embodiment (100(3)) of the anamorphic objective lens assembly of FIG. 2A, wherein FLY3=85.0 mm and FLX3≈42.5 mm.

Figure 5B:
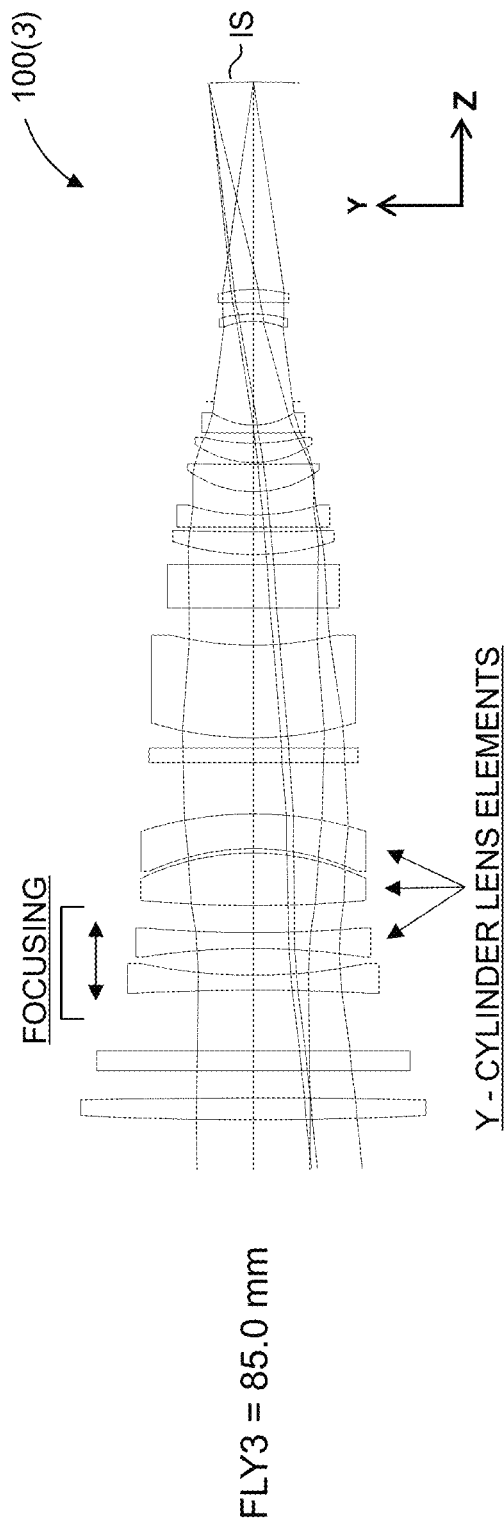
Figure 5C:
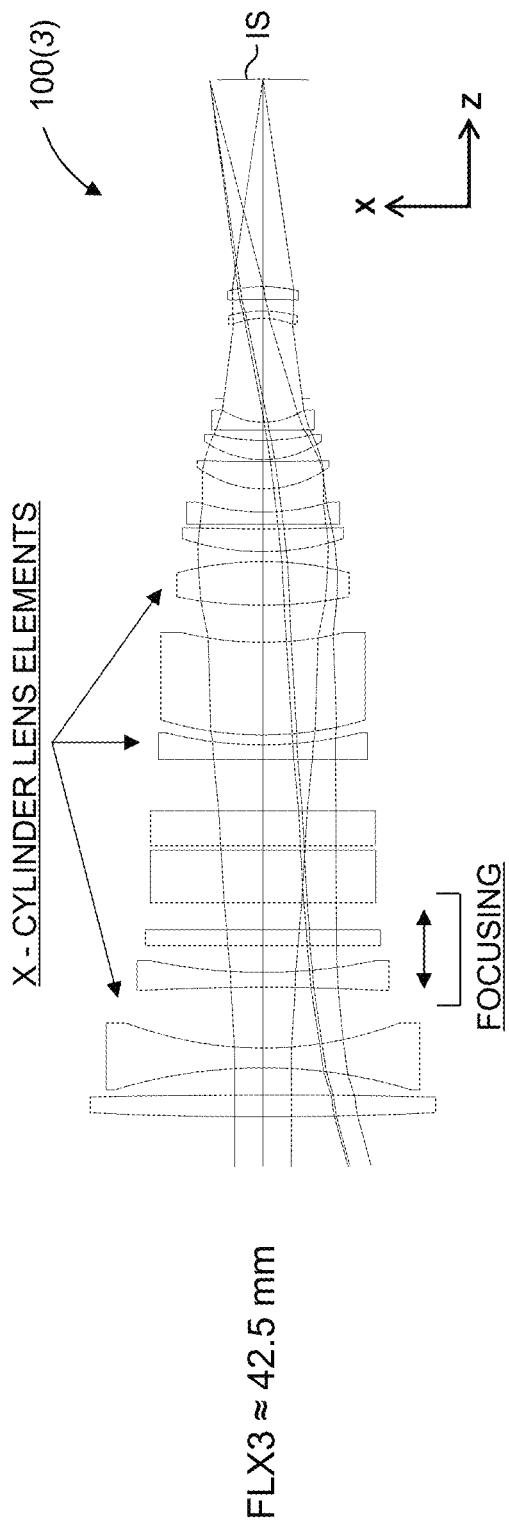

FIGS. 5B and 5C are side (Y-Z plane) and plane (X-Z) views, respectively, of the long focal length embodiment of the anamorphic objective lens assembly of FIG. 5A, highlighting the Y-cylinder and X-cylinder lens elements.

Figure 5D:
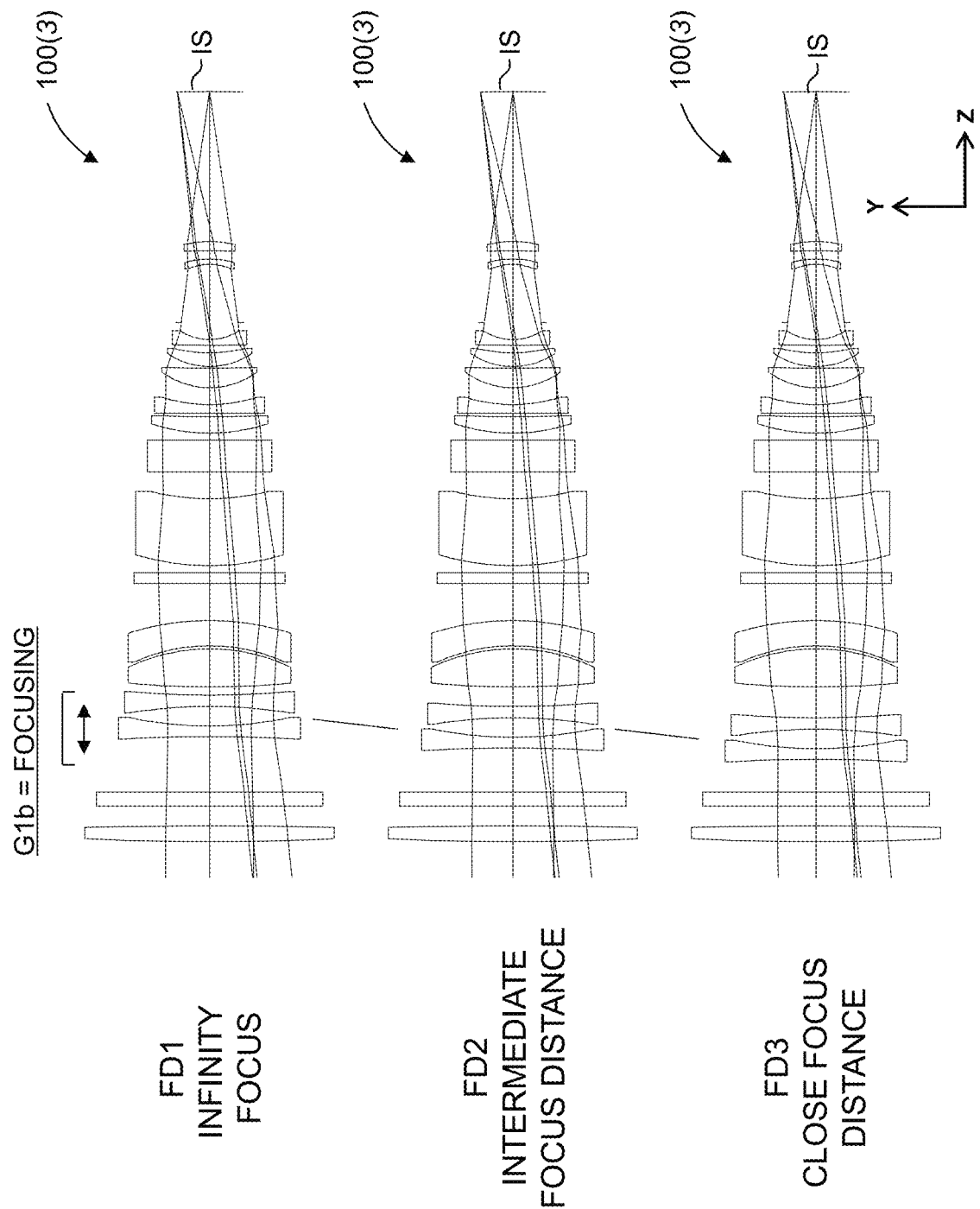
Figure 5E:
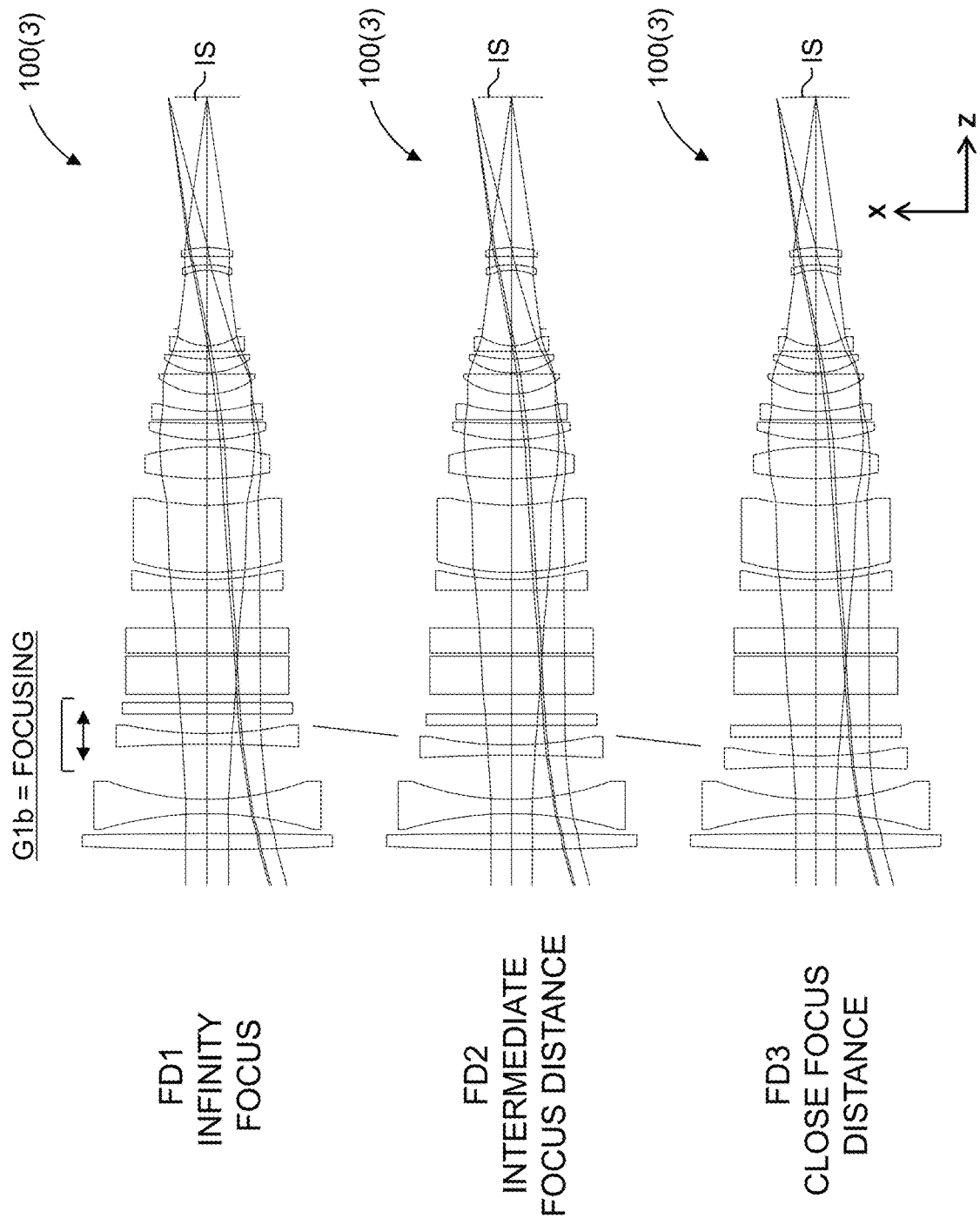
Figure 6A:
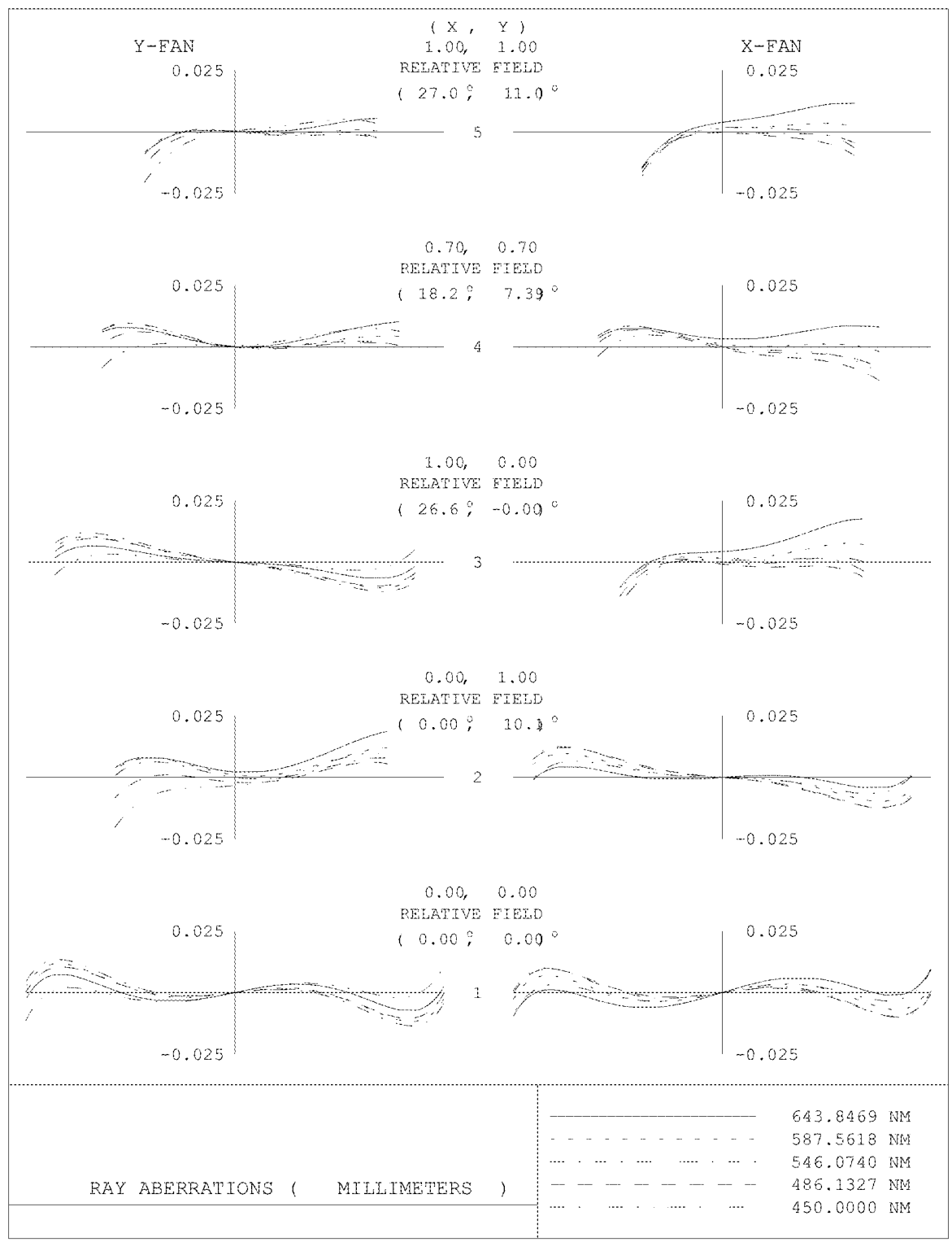
Figure 6B:
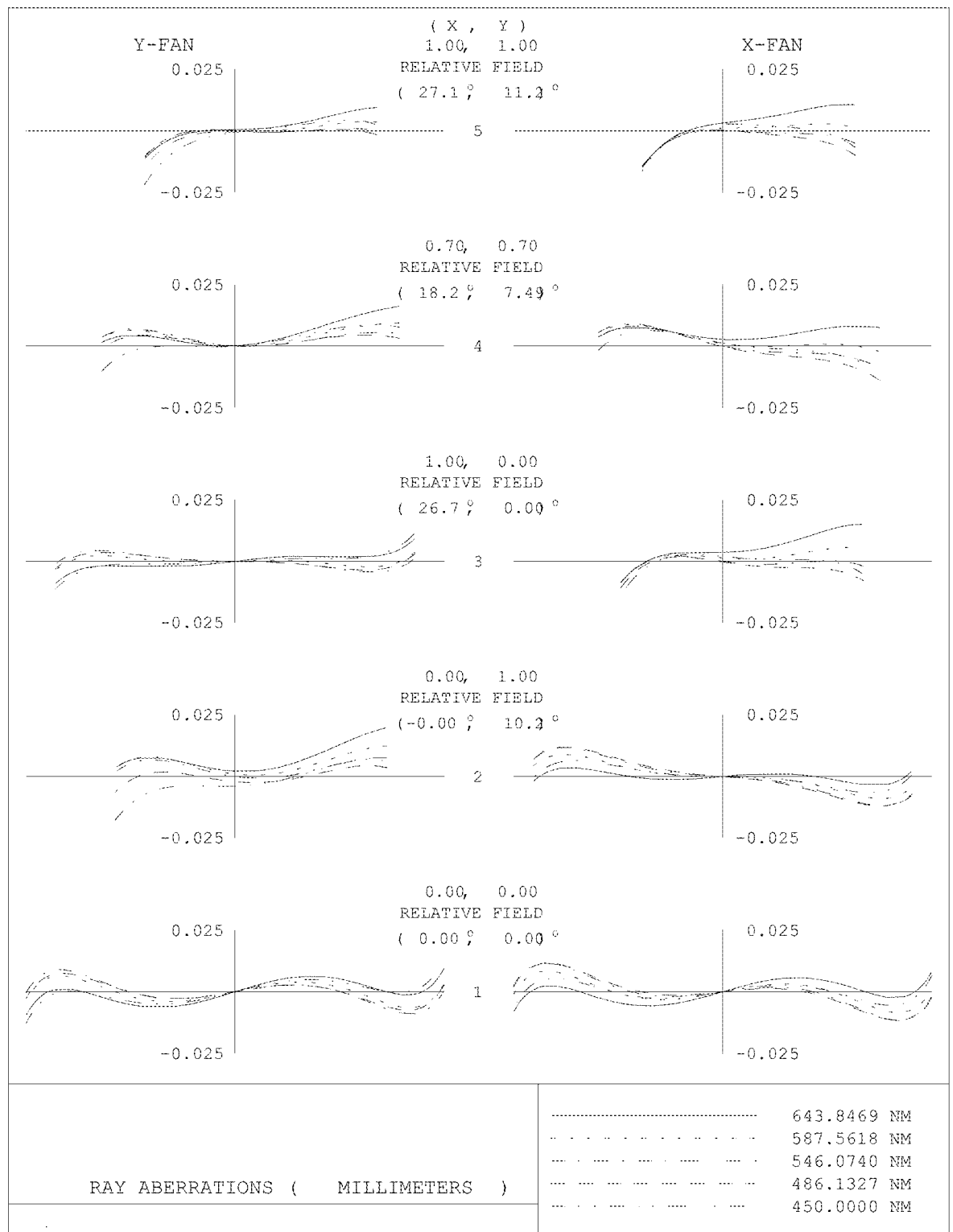
Figure 6C:
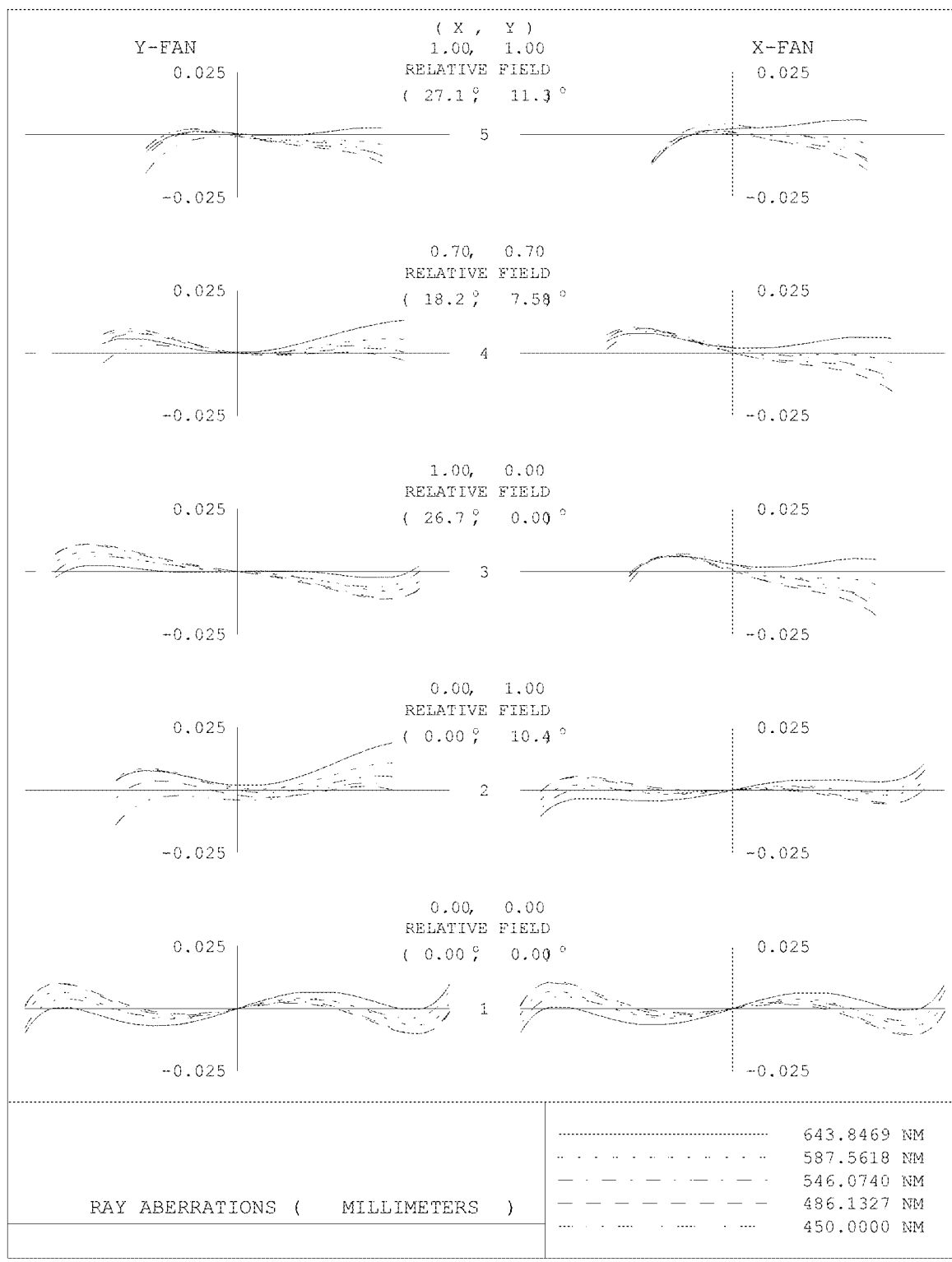
Figure 7A:
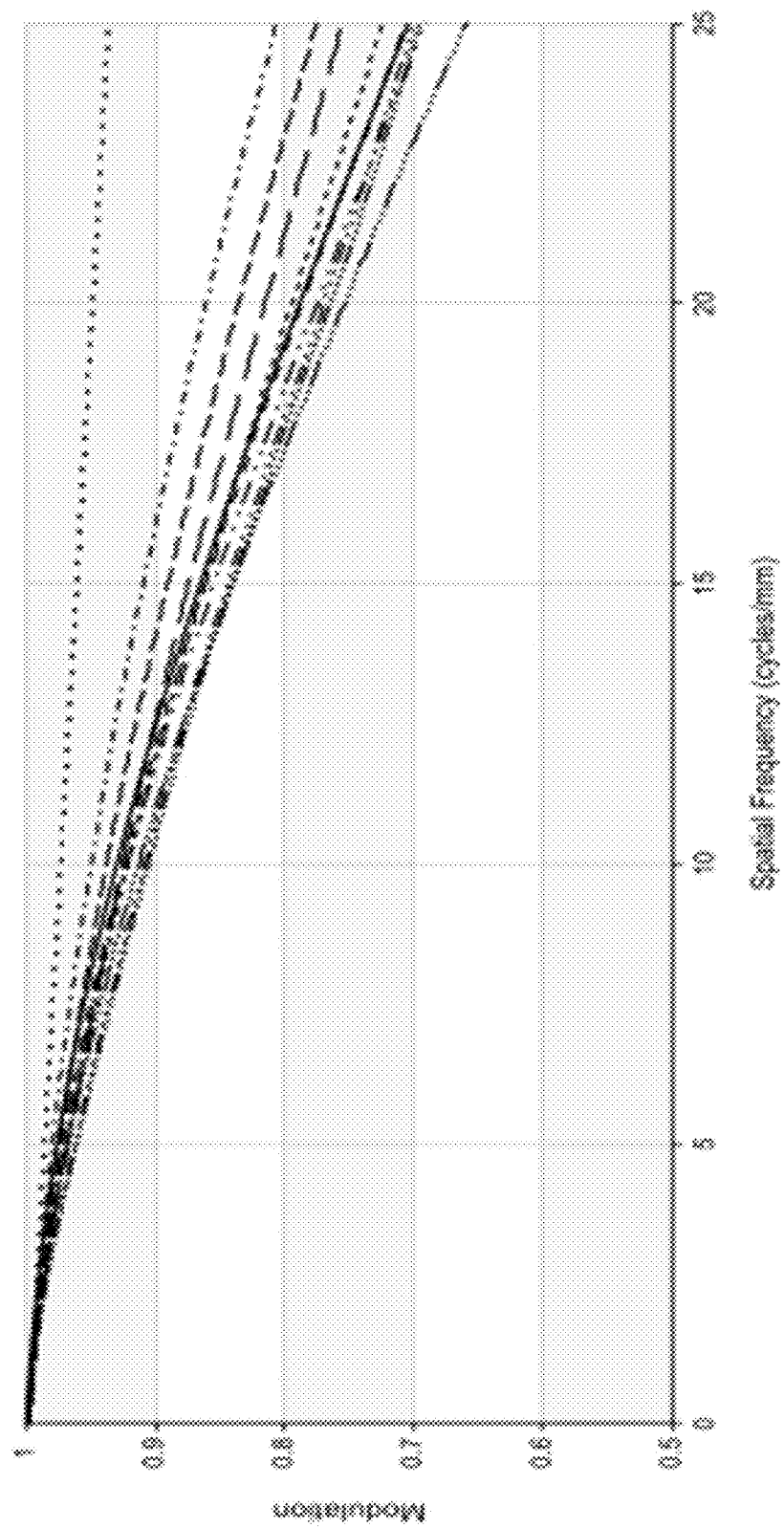
Figure 7B:
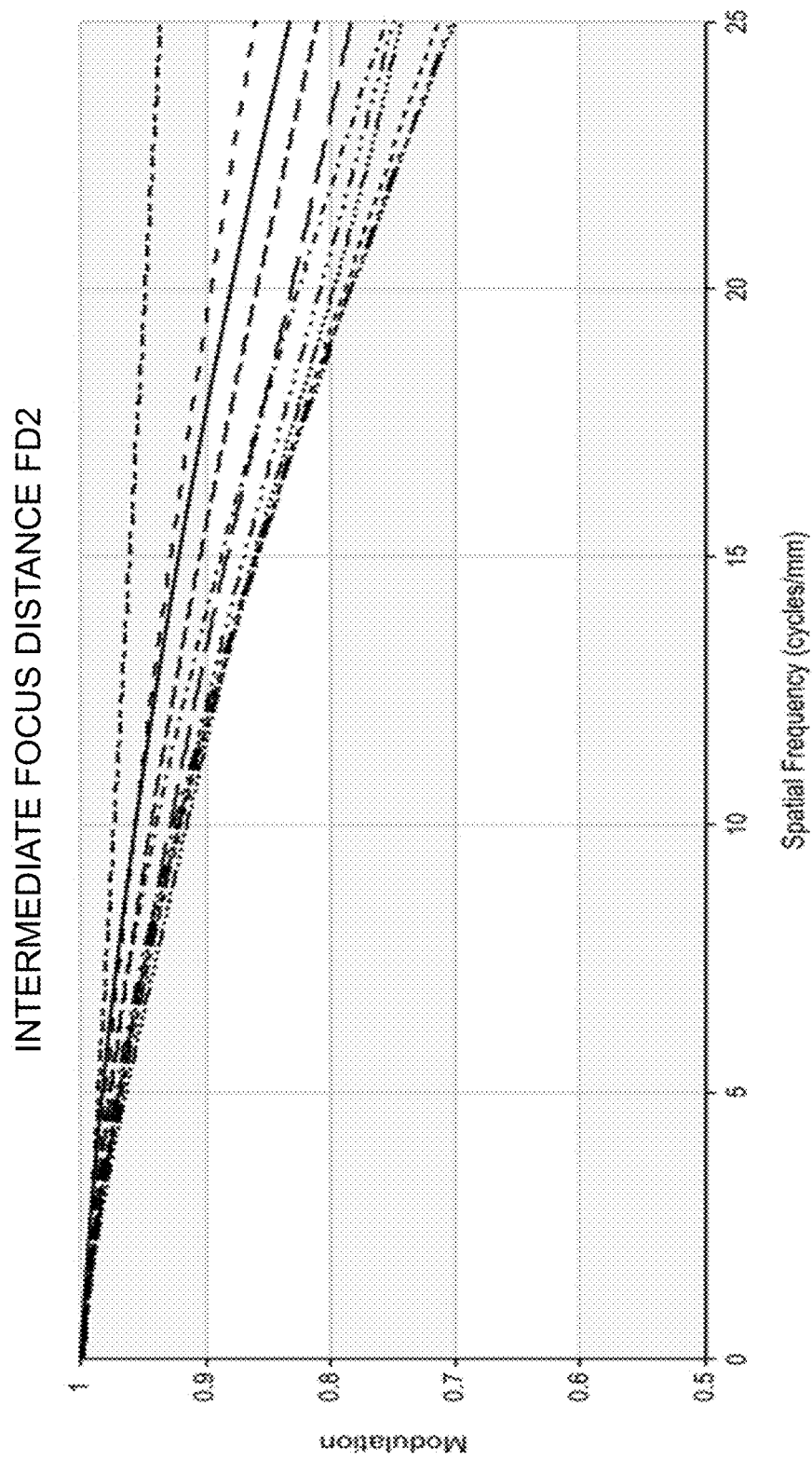
Figure 7C:
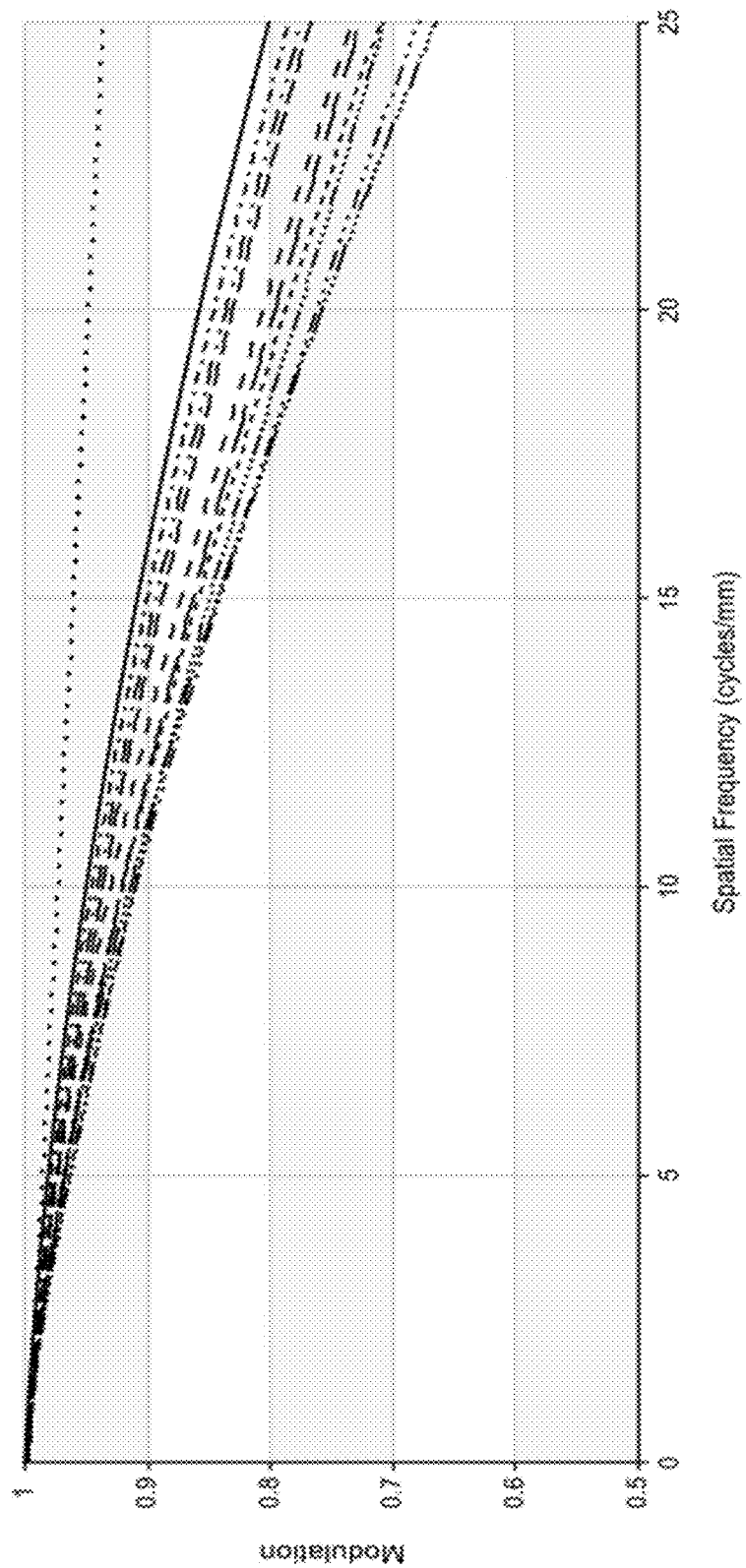
Figure 8A:
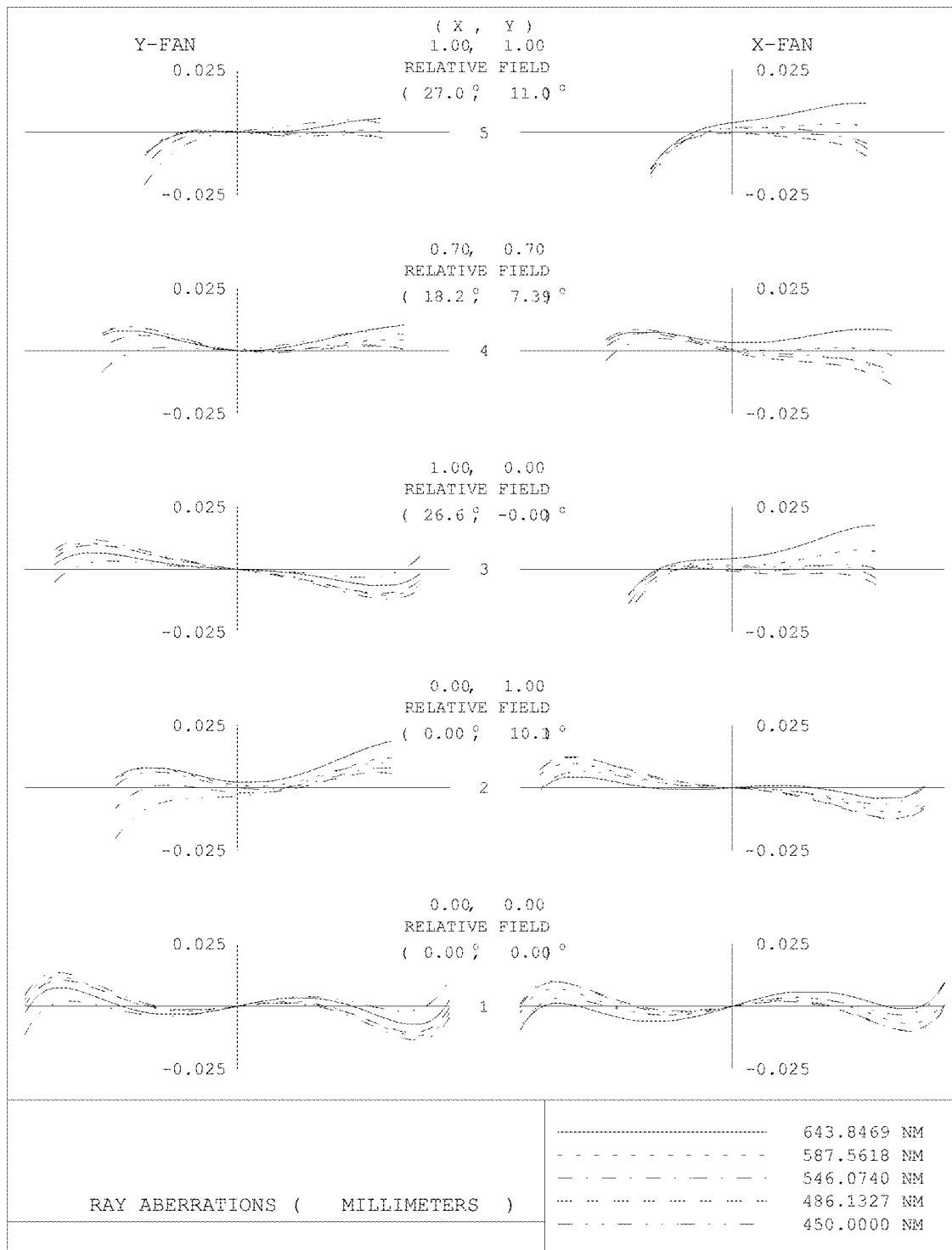
Figure 8B:
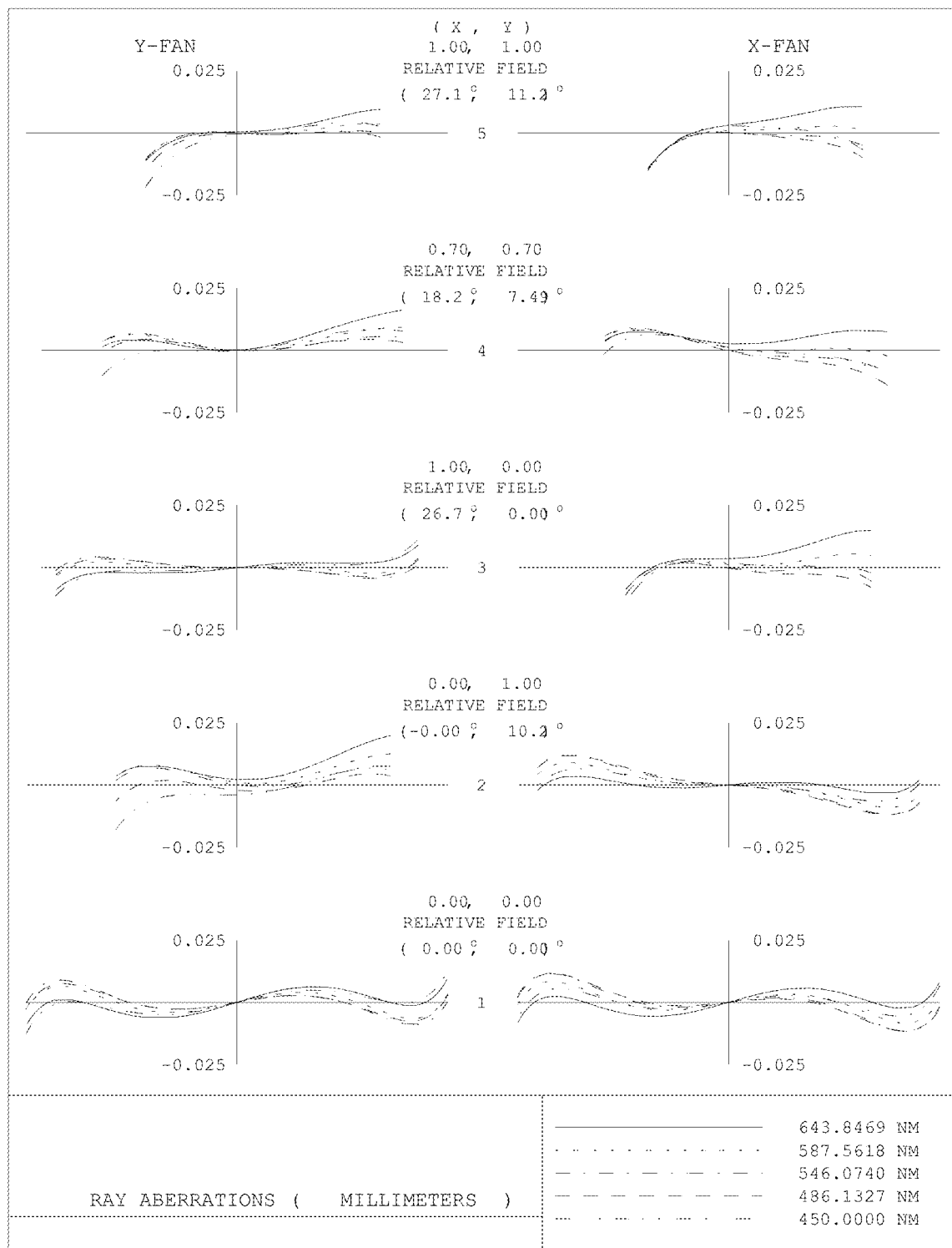
Figure 8C:
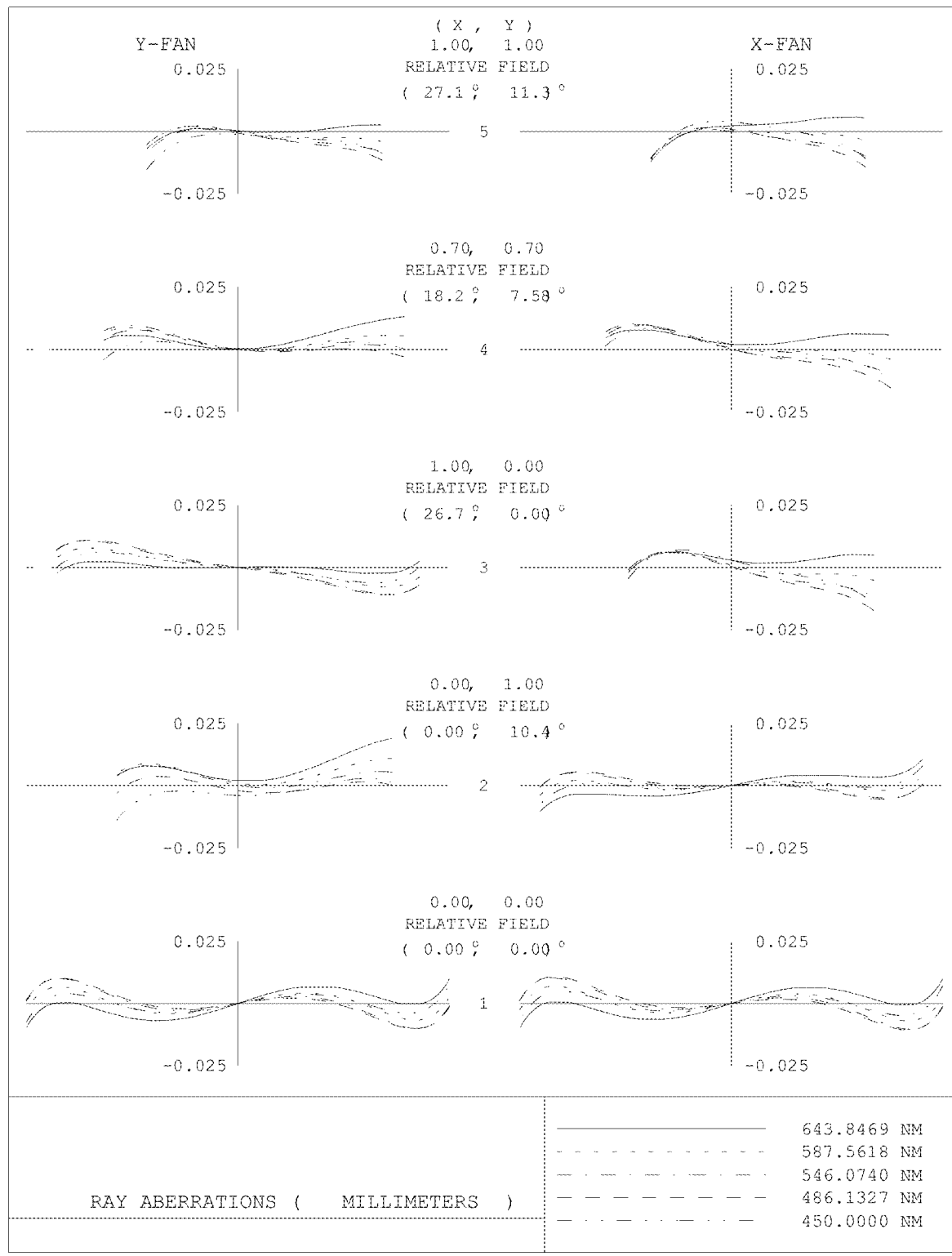
Figure 9A:
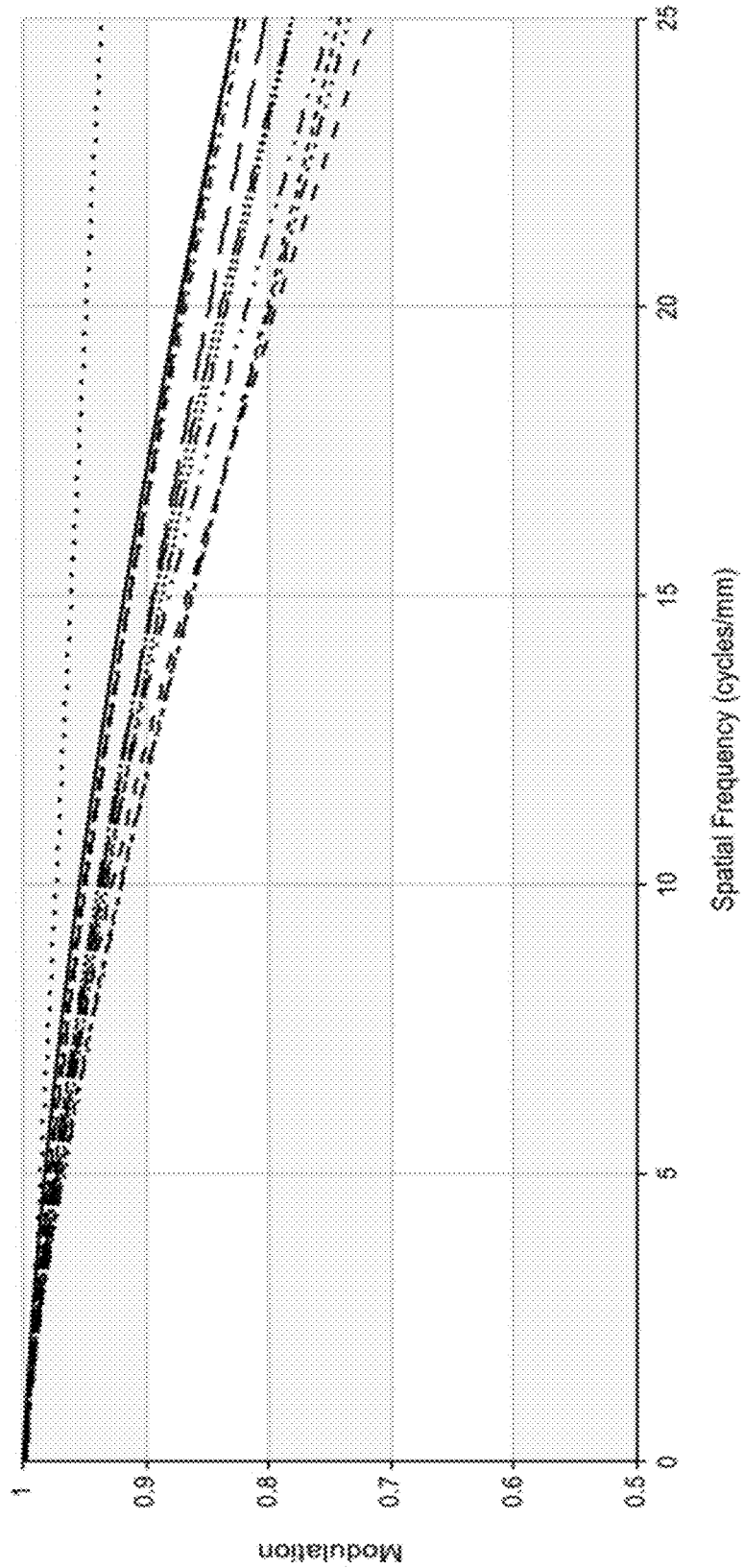
Figure 9B:
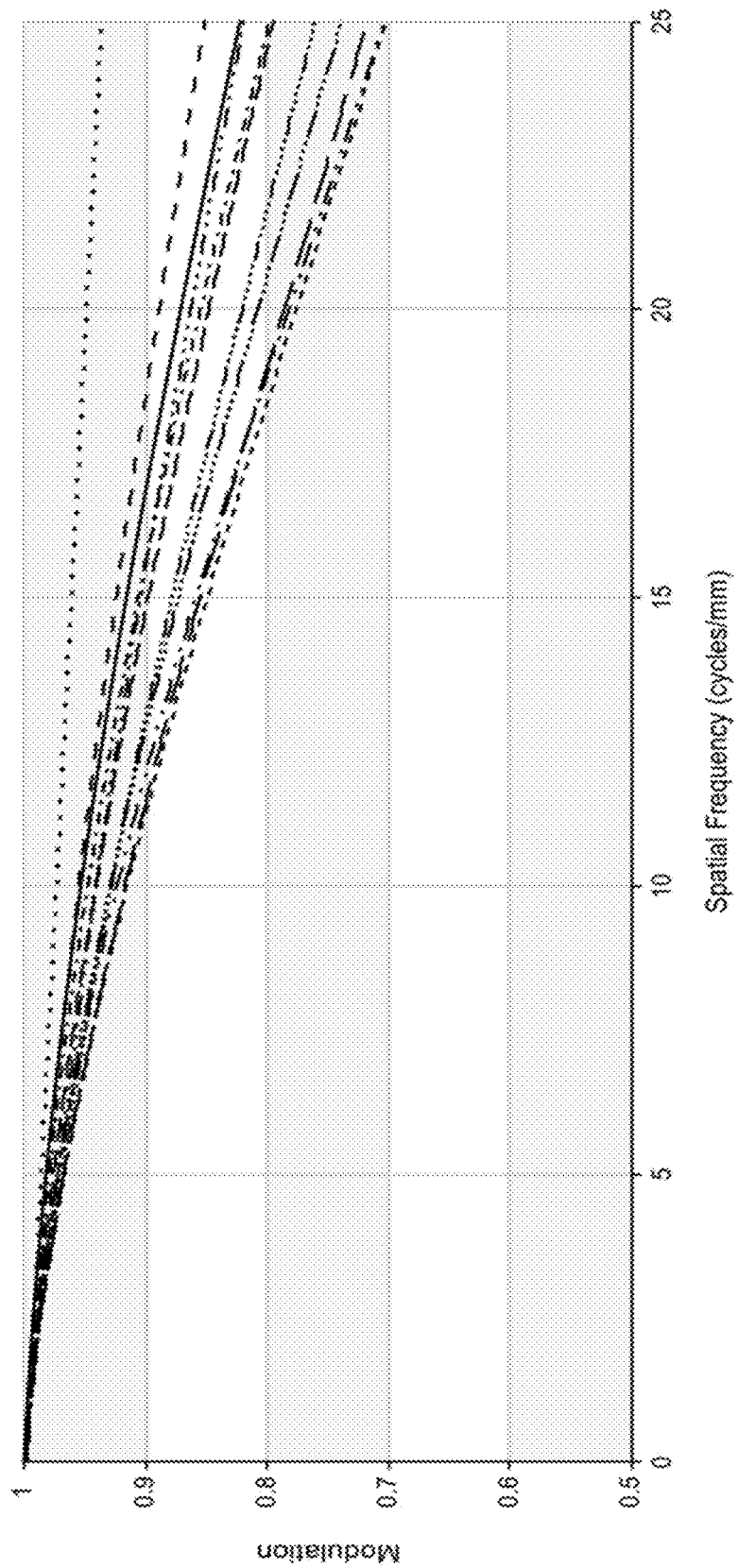
Figure 9C:
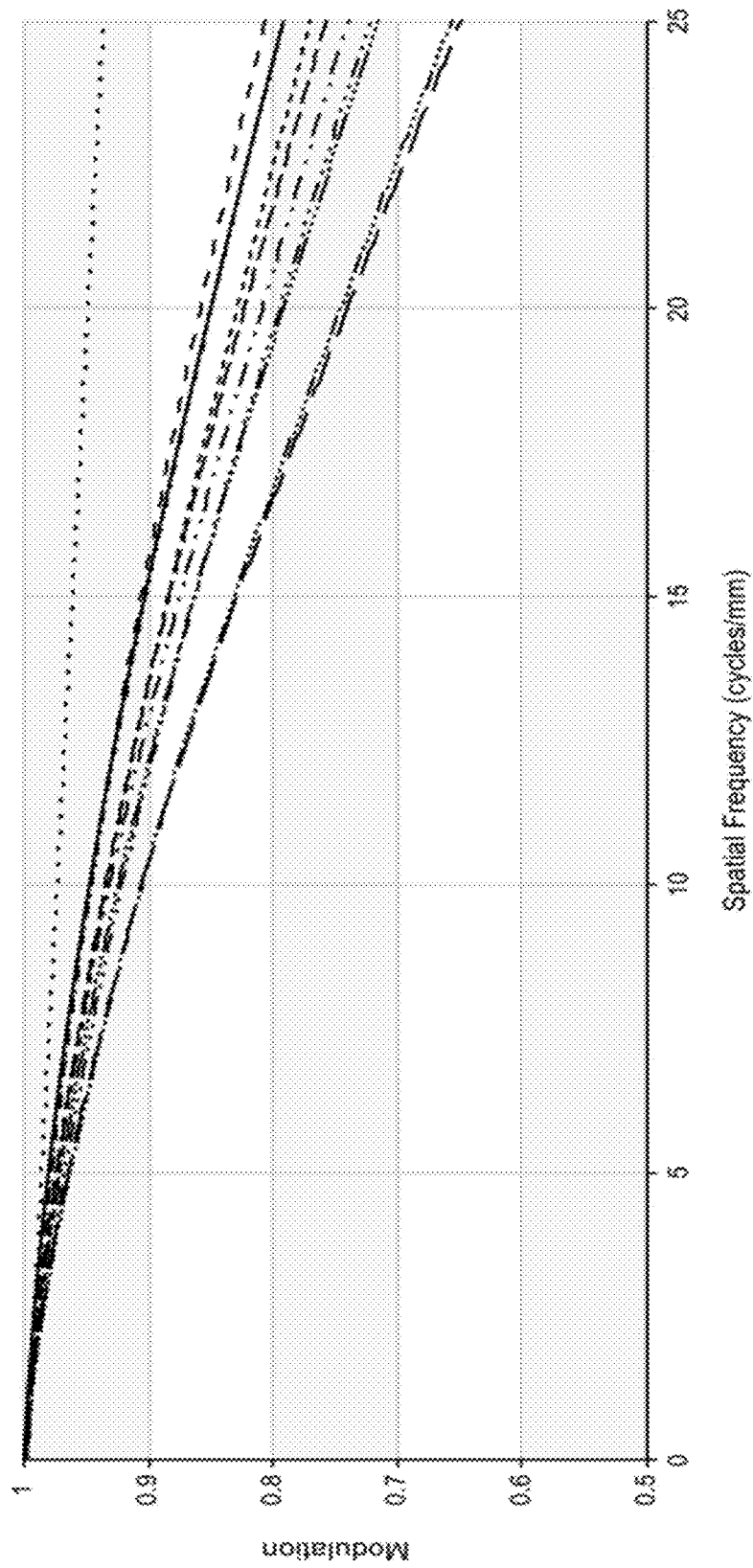

FIGS. 5D and 5E show side (Y-Z plane) and plane (X-Z) views of the long focal length embodiment of the anamorphic objective lens assembly of FIG. 5A, illustrating the movement of the focusing sub-group G1b for infinity focus, intermediate focus distance and close focus distance.

FIGS. 6A-6C, 8A-8C and 10A-10C show transverse ray aberration plots for various field/image positions over a range of wavelengths respectively for the short, medium and long focal length examples of the anamorphic objective lens assemblies.

FIGS. 7A-7C, 9A-9C and 11A-11C show diffraction limited polychromatic MTF plots (modulation M vs. spatial frequency f in cycles/mm) for tangential and sagittal azimuths for the short, medium and long focal length examples of the anamorphic objective lens assembly, where the modulation is above 60% at a spatial frequency f of 25 cycles/mm, wherein the curves are for the same fields and wavelengths as in FIGS. 6A-6C, 8A-C and 10A-10C, with the dotted line representing the diffraction limit.

Figure 12A:
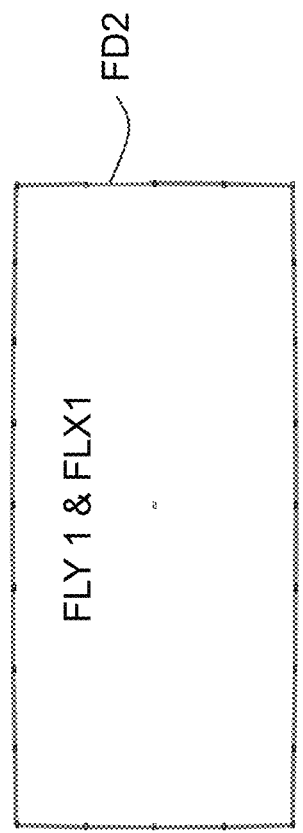
Figure 12B:
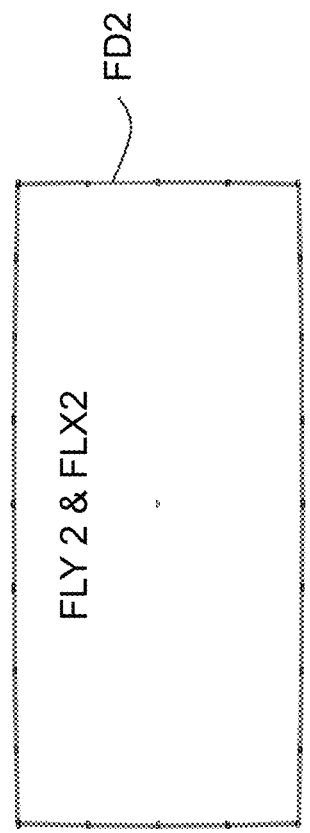
Figure 12C:
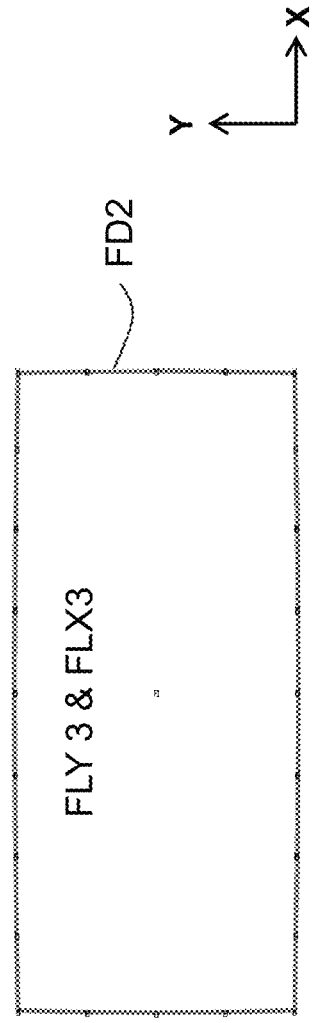

FIGS. 12A-12C show the peripheral distortion for the short, medium and long focal length examples of the anamorphic objective lens assembly at the intermediate focus distance FD2.

FIGS. 13A-13C illustrate the on-axis bokeh for the short, medium and long focal length examples of the anamorphic objective lens assembly at the far distance FD1 close to infinity for the anamorphic lens assembly set at the FD3 close focus distance.

Figure 14A:
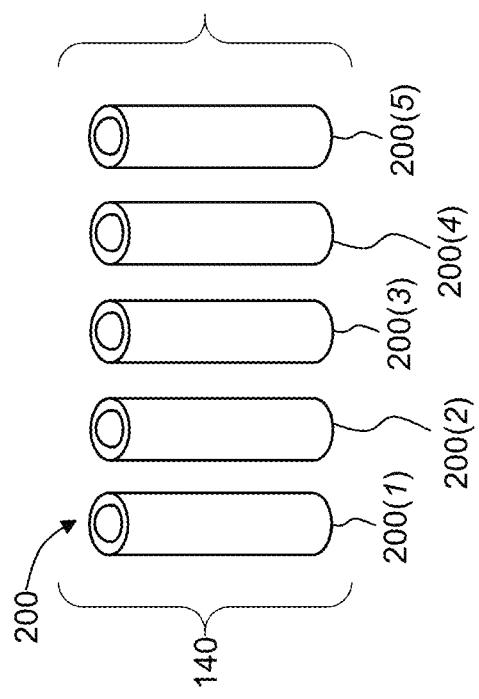

FIG. 14A is a schematic diagram that illustrates how a set of five conventional prime lenses is used to cover the five focal lengths in the above example focal length span from 40 mm to 100 mm according to the prior art approach.

Figure 14B:
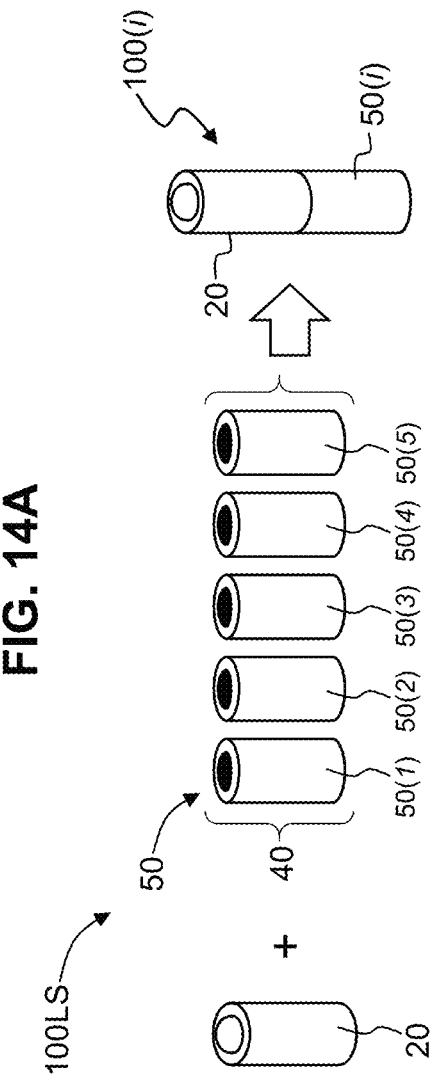

FIG. 14B shows how the five conventional prime lenses 200 can be replaced by a lens system having a single front anamorphic section 20 and a set 40 of five non-anamorphic sections that can be used to form five different lens assemblies having the respective focal lengths of the five conventional prime lenses.

Figure 15:
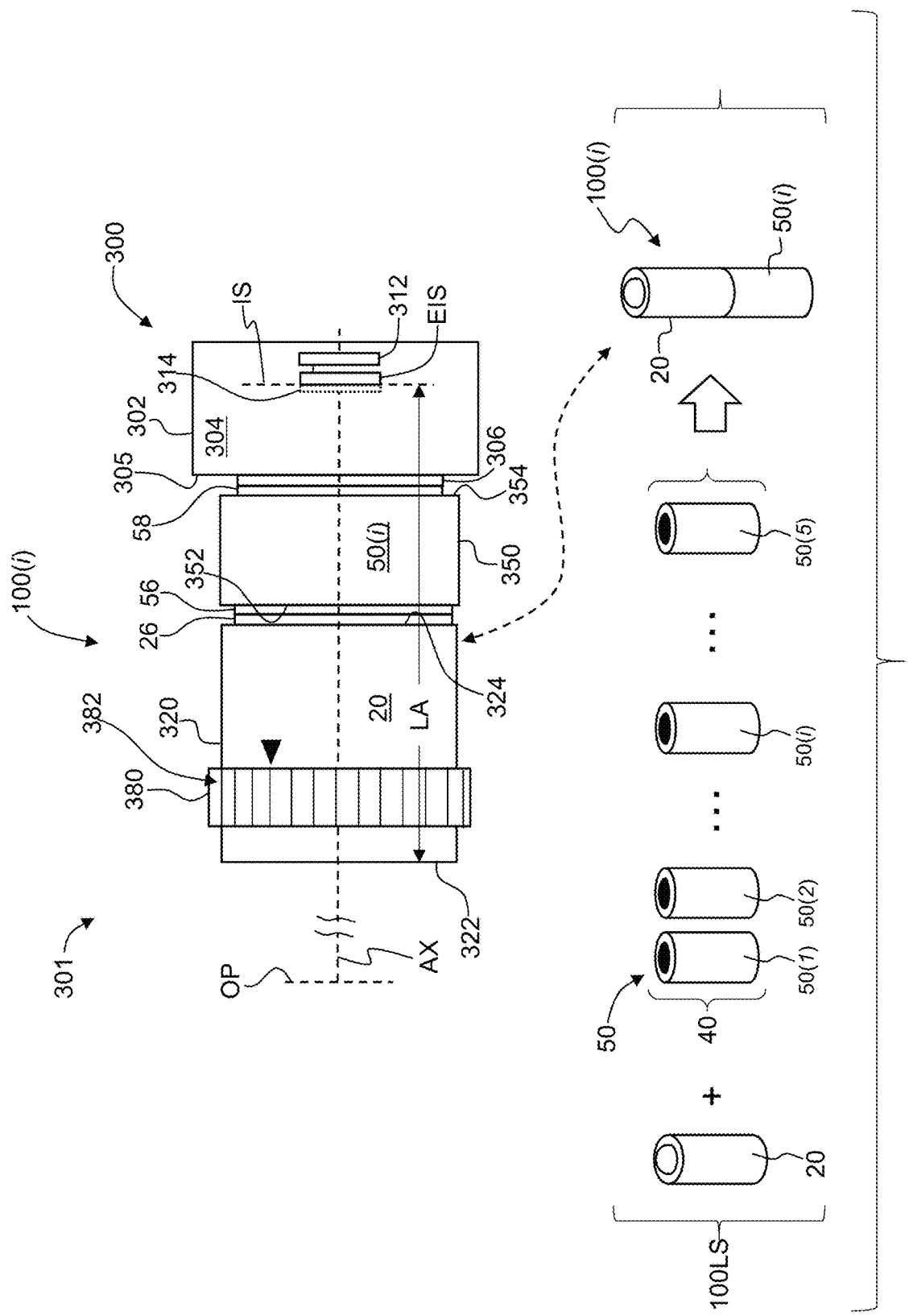

FIG. 15 is a schematic diagram of an example anamorphic objective lens system used in combination with a camera, and also showing how one of the multiple anamorphic objective lens assemblies can be used with the camera to form a camera system.

The information shown in the Figures, and the data contained in the Design Tables set forth below was generated by CodeV® optical design software, which is commercially available from SYNOPSYS, INC, Pasadena, Calif., USA.

DETAILED DESCRIPTION

The claims as set forth below are incorporated into and constitute part of this Detailed Description.

Cartesian coordinates are used in some of the Figures for reference and are not intended to be limiting with respect to position, orientation, direction, etc.

The optical axis is Z shown as horizontal and is positive moving from left to right. The two perpendicular axes are X and Y (positive for Y-direction from bottom to top of the page and positive for X direction into the page). The Y-direction is referred to as the vertical direction and the X-direction is referred to as the horizontal direction, as is conventional in the art of anamorphic lens design and anamorphic optical systems.

Focus distances are denoted by the letters FD, and in the discussion below range from a far or infinite focus FD1 to a close or close-up focus FD3, along with intermediate focus distance FD2, wherein FD1>FD2>FD3.

The parameters FLY1, FLY2 and FLY3 refer to paraxial focal lengths in the Y-direction for three examples of the object distances at a far focus distance FD1, an intermediate focus distance FD2 and a close focus distance FD3. The parameters FLX1, FLX2 and FLX3 refer to approximate paraxial focal lengths in the X-direction for the same focus distances as for FLY1, FLY2 and FLY3 paraxial focal lengths. In some examples and in the claims, reference to first and second vertical focal lengths FLY1 and FLY2 can be for any two anamorphic objective lens assemblies for anamorphic object lens system and not just the first two.

In an example, one of two or more anamorphic objective lens assemblies (say, a "first" one) has a first vertical focal length FLY1 that is the shortest vertical focal length of all the assemblies of the anamorphic object lens system while another of two or more anamorphic objective lens assemblies (say, a "second" one) has second vertical focal length FLY2 that is the longest vertical focal length of all the assemblies of the anamorphic object lens system, and these shortest and longest vertical focal lengths FLY1 and FLY2 define a vertical focal length ratio RYFL=FLY2/FLY1. In various examples, 1.25<RYFL<100 or 1.25<RYFL<50 or 1.25<RYFL<20 or 1.25<RYFL<10 or 1.25<RYFL<4 or 1.25<RYFL<2, depending on the total number of non-anamorphic sections used, the given imaging application, and the range of imaging options desired, and like factors known in the art.

The term "lens group" as used herein means a set of one or more individual lens elements. The term "lens sub-group" as used herein means a sub-set of lens elements of a given lens group. In the discussion below, the first lens group G1 includes all of the lens elements in the front anamorphic section and the second lens group G2 includes all of the lens elements in the (back) non-anamorphic section.

The terms "aperture stop," "optical stop," "stop" and "iris" are equivalent terms that can be used interchangeably. In examples, the aperture stop is located in the non-anamorphic section.

The term "design focal length" used herein to mean a paraxial focal length, denoted FLY and FLX as measured in the Y and X directions, respectively, and at which the objective lens imaging has optimal focus. The convention in the art of anamorphic optical design and anamorphic optical system is to have the focal length defined by the vertical focal length (VEFL), though in some cases horizontal focal length (HEFL) is sometimes mentioned. More conventionally the squeeze ratio SR, which is the ratio of the vertical and horizontal focal lengths (i.e., SR=VEFL/HEFL) is mentioned instead, and the horizontal focal length HEFL is defined in terms of the vertical focal length VEFL via the relationship HEFL=VEFL/SR. A given anamorphic objective lens assembly thus has a focal length in the Y-Z plane, which is called the Y focal length or the vertical focal length and is denoted herein as FLY, while the focal length in the X-Z plane is called the X focal length or horizontal focal length and denoted herein as FLX. Reference to "a focal length" is assumed to be the Y focal length (i.e., the vertical focal length) unless otherwise stated.

Terms having the form "between A and B" as used herein are intended to include A and B, so that the expression "between two design focal lengths and four design focal lengths" such as used in the specification and the claims means "two design focal lengths or three design focal lengths or four design focal lengths." Expressions that intend to exclude end points in given range for a given parameter K use the symbol "<", such as in the case for u<K<v, where the range on the parameter K does not include u or v.

The term "spherical" as used in connection with a spherical lens group (or sub-group) or spherical lens sub-assembly means that all of the lens elements in the spherical lens group (or sub-group) or spherical lens sub-assembly have spherical surfaces, wherein a spherical surface is defined by a portion of a sphere so that the surface curvature is the same in an X-Z plane and a Y-Z plane and when the spherical surface has an infinite or near infinite radius may be called a "flat", "planar" or "plano" surface.

The term "anamorphic" as used in connection with an anamorphic lens group (or sub-group) or an anamorphic lens sub-assembly means that at least one of the lens elements in the anamorphic lens group (or sub-group) or anamorphic lens sub-assembly has an anamorphic surface, wherein an anamorphic surface has different curvatures in X-Z and Y-Z planes and thus is not rotationally symmetric. A cylindrical lens is an example type of anamorphic lens. An aspherical lens or "asphere" as the term is used herein has one or two rotationally symmetric surfaces and so is not considered an anamorphic lens. Thus, in an example, a non-anamorphic optical system as the term is used herein is one that has rotationally symmetric lens elements.

The term "anamorphic objective lens system" as used herein means a set of at least one front anamorphic lens sub-assembly ("front anamorphic section") and a set of two or more rear non-anamorphic lens sub-assemblies ("non-anamorphic sections") each configured to be operably connected to the at least one front anamorphic section to form two or more anamorphic objective lens assemblies having different focal lengths and in an example substantially the same overall axial lens length. The set of the two or more non-anamorphic sections are designed to be "optically matched" with the front anamorphic section to substantially optimize imaging performance of the two or more anamorphic objective lens assemblies with respect to, for example, one or more of aberration correction, entrance-exit pupil matching, vignetting control, axial length preservation (optionally), in order to produce suitable imaging for the given application.

This is to distinguish from the case where someone might try to combine a front anamorphic section with one or more rear non-anamorphic lens sub-assemblies that are not optically matched to (i.e., was not designed to work operably with) the front anamorphic section to form an inoperable anamorphic objective lens system, i.e., one that does not have suitable imaging (i.e., a suitable image) for the given imaging application, such as by attempting to use an off-the-shelf non-anamorphic lens that was not designed using information about the construction of the front anamorphic section. Unsuitable imaging would include undue amounts of one or more aberrations, significant entrance-exit pupil mismatch, poor vignetting control, etc.

The suitable imaging can be high-performance imaging (as defined immediately below) or something less than high-performance imaging as long as the imaging quality is appropriate for the given application and the variation in imaging between different non-anamorphic sections is deemed acceptable. In practice, some imaging applications (including certain cinemagraphic applications) do not require very high imaging performance, in a strict sense, due to, for example, artistic and esthetic considerations that distinguish anamorphic objective lenses from spherical objective lenses. Still, even for imaging applications where non-optimal imaging is allowed, there are still minimum imaging performance requirements.

Anamorphic objectives can have a greater level of residual aberration than spherical lenses and this can decrease one or more performance criteria such as the modulation transfer function. Although this decrease in performance can be achieved by other means such as filters attached to the lens, many end users prefer that the decrease in performance happen intrinsically within the lens. When using off-the-shelf still lenses in place of the rear non-anamorphic lens sub-assemblies disclosed herein, at least some degradation in performance for the anamorphic objective lens system will be present because there has been no matching of residual aberrations of the front anamorphic lens sub-assembly and a set of two or more rear non-anamorphic lens sub-assemblies.

The "optical matching" is accomplished via a lens design process that analyzes optical performance of the (virtual) anamorphic objective lens assembly formed by the front anamorphic section as respectively operably connected to each one of the (back) non-anamorphic sections in the set of non-anamorphic sections. Said differently, each anamorphic objective lens assembly is designed and optimized to work with each of the respective non-anamorphic sections.

The term "high-performance imaging" as used herein refers to a quality of the imaging of the anamorphic objective lens assembly that is deemed acceptable for the given application, such as still photography, video, cinematography, etc. The imaging quality is considered over the entire field and can be measured using one or more of a number of imaging performance parameters and criteria known in the art, such as the polychromatic modulation transfer function (MTF) for tangential and sagittal azimuths, transverse ray aberration plots, distortion plots, etc.

In an example, high-performance imaging as the term is used herein means that the polychromatic MTF is equal to or greater than 60% of the diffraction limited modulation at 25 cycles/mm at far, intermediate and close focus distances FD1, FD2, and FD3 and over wavelengths of 643.8 nm, 587.6 nm, 546.1 nm, 486.1 nm and 450.0 nm with respective weightings of 7, 8, 9, 7 and 4, with a variation in the polychromatic MTF performance through focus being equal to or less than 10%, and a variation in the polychromatic MTF performance at the same focus between all of the anamorphic objective lens assemblies in the set of such assemblies as formed from the given front anamorphic section and the set of non-anamorphic sections is equal to or less than about 10%.

Thus, if a first anamorphic lens assembly that utilizes a front anamorphic section and a first non-anamorphic section has a first high-performance imaging and if a second anamorphic lens assembly that utilizes the same front anamorphic section but a second non-anamorphic section has a second high-performance imaging, then the first high-performance imaging and the second high-performance imaging are substantially the same when the polychromatic MTFs are within 10% of each other, subject to the above conditions on what constitutes high-performance imaging.

This provides an example tolerance on the variance in the aforementioned optical matching of the anamorphic section to each of the matched non-anamorphic sections.

The criterion that all of the anamorphic objective lens assemblies have high-performance imaging reflects the aforementioned condition that the front anamorphic section and each of the non-anamorphic sections be optically matched and precludes the use of non-matched non-anamorphic sections with the front anamorphic section to form anamorphic objective lens assemblies since non-optically-matched non-anamorphic sections by definition do not provide a satisfactorily uniform standard of imaging for the set of anamorphic objective lens assemblies that can be formed using the given anamorphic objective lens system. Nevertheless, an optical mismatch can be introduced as desired but may not be readily correctable.

In the discussion below, a lens surface of a given lens element is said to be a front surface when it is the closer of the two lens surfaces to the object space. For example, for a positive meniscus lens disposed with its convex surface closest to the object space and its concave surface closest to the image space, the convex surface is referred to as a "front convex surface," while the concave surface can be referred to as a "rear concave surface."

A Y-cylinder surface has a curvature in the Y-Z plane and no curvature in the orthogonal X-Z plane. Likewise, an X-cylinder surface has a curvature in the X-Z plane and no curvature in the orthogonal Y-Z plane.

The object space (denoted OBS) is immediately adjacent the front end of the given anamorphic objective lens assembly as described below and so defines a frontward direction while the image space (denoted IMS) is immediately adjacent a back or rear end of the given anamorphic objective lens assembly and so defines a rearward direction. Thus, certain lens sub-groups can be referred to as being frontward or forward while certain other lens sub-groups in the same lens group can be described as being backward or rearward, with the understanding that in a given lens group, the frontward or forward lens sub-group is closer to the front end or object space than the backward or rearward rear lens sub-group.

The aperture stops AS in the examples below are adjustable to define different F-numbers (F-number) of the given anamorphic objective lens assembly 100. The F-number is taken at the image surface IS unless otherwise stated. The F-number at the image surface can be referred to as the image-space F-number or the image-surface F-number.

The reference numbering convention for the lens elements and optical surfaces in the optical diagrams is selected to match the information provided in the corresponding lens design tables set forth below.

Basic Design

Figure 1A:
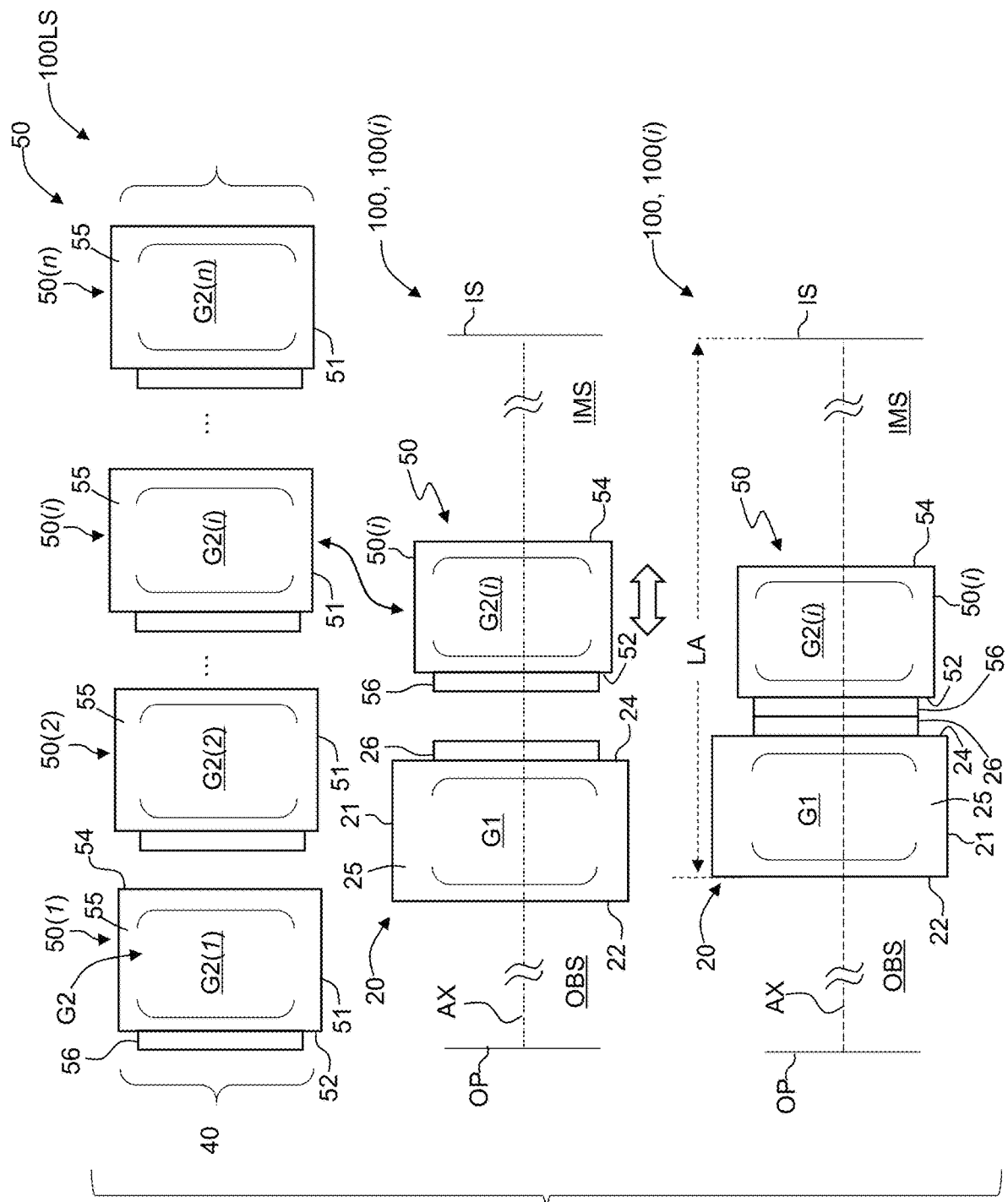
FIG. 1B is similar to FIG. 1A and illustrates a set of three anamorphic objective lens assemblies formed using one anamorphic (first) lens group and set of three different non-anamorphic (second) lens groups, with the anamorphic lens group comprising first, second and third lens sub-groups, with the middle lens sub-group being movable for focusing.

FIG. 1A is a schematic diagram of the anamorphic objective lens system ("lens system") 100LS as disclosed herein. The lens system 100LS includes a front anamorphic section 20 having a housing 21 with a front end 22 and a back end 24. In an example, the housing 21 comprises a lens barrel. The back end 24 includes a first mounting fixture 26. The housing 21 operably supports within an interior 25 a first lens group G1 that includes at least one anamorphic lens element, as described below.

The lens system 100LS also includes a set 40 of two or more non-anamorphic sections 50 having a housing 51 with a front end 52 and a back end 54. In an example, the housing 51 comprises a lens barrel. The front end 52 includes a second mounting fixture 56 configured to operably engage and disengage with the first mounting fixture 26, so that the non-anamorphic sections 50($i$) can be swapped into and out of the front anamorphic section 20, as illustrated by the double-ended arrow.

The housing 51 operably supports within an interior 55 a second lens group G2 that in an example has no anamorphic lens elements and further in an example has only spherical lens elements, as described below. The n different non-anamorphic sections 50 are denoted 50(1), 50(2), . . . 50($i$) . . . 50($n$), and each have a different second lens group G2, which are respectively denoted as G2(1), G2(2), . . . G2($i$) . . . G2($n$). The letter i is used to denote an arbitrary one of the non-anamorphic sections 50 or an arbitrary one of the second lens groups G2 of the n total second lens groups G2 of the n total different non-anamorphic sections 50. As noted above, n≥2. The second lens group G2 can also be referred to as the non-anamorphic lens group.

The lower portion of FIG. 1A shows the front anamorphic section 20 operably engaged with one of the non-anamorphic sections 50($i$) at their respective mounting fixtures 26 and 56 to form an anamorphic objective lens assembly ("lens assembly") 100 having an optical axis AX, an X-Z plane focal length FLX, a Y-Z plane focal length FLY (collectively written below as an ordered pair (FLX, FLY) for compactness), an object plane OP in an object space OBS, an image surface IS in an image space IMS and an axial length LA between the front end 22 of the front anamorphic section 20 and the image surface IS. A total of n different lens assemblies 100 can be formed using the n different non-anamorphic sections 50 in the set 40 of non-anamorphic sections. A given lens assembly 100 that utilizes a non-anamorphic section 50($i$) having a second lens group G2($i$) is also denoted 100($i$).

Figure 1B:
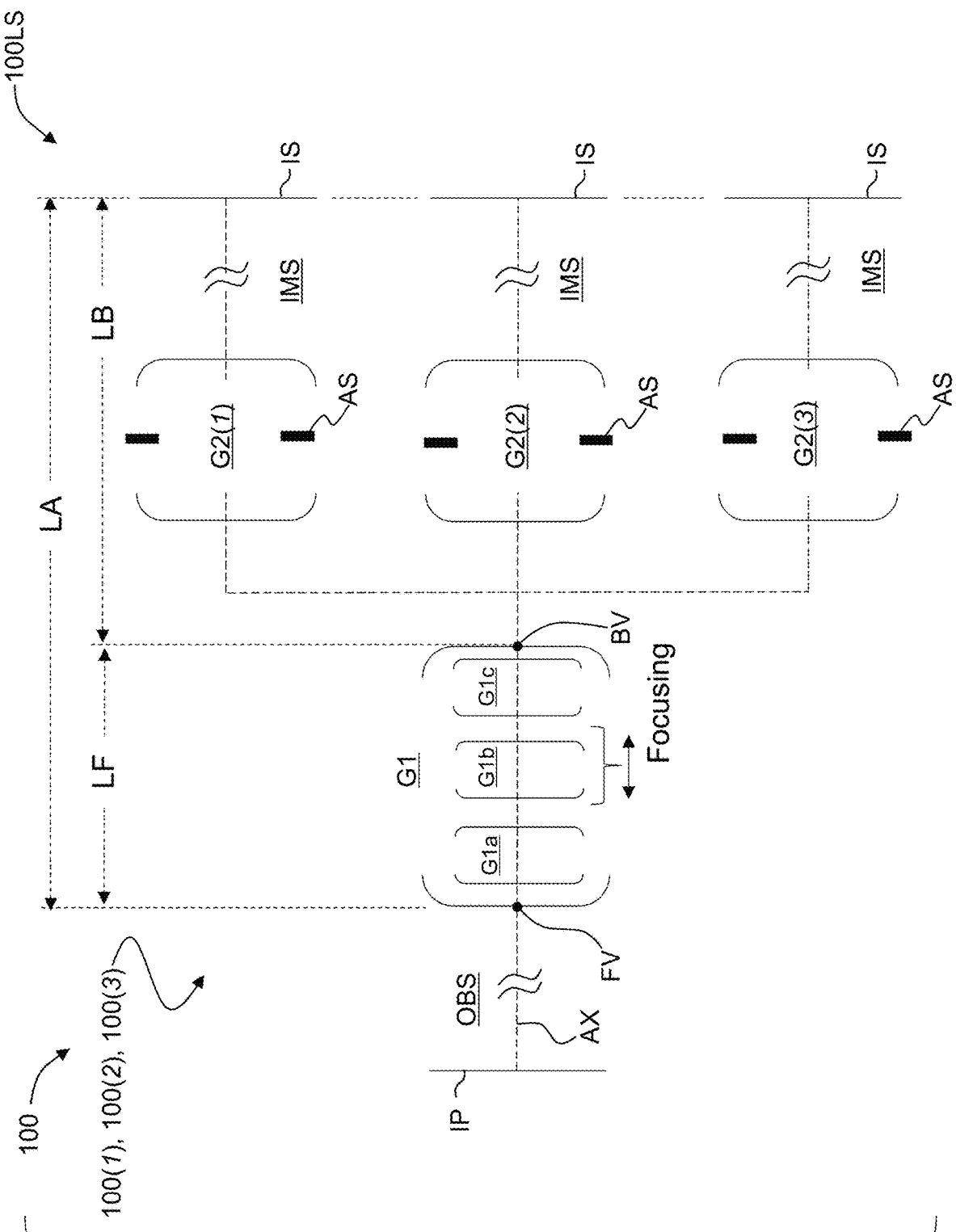

FIG. 1B is similar to FIG. 1A and illustrates a lens system 100LS of three lens assemblies 100 (e.g., 100(1), 100(2) and 100(3)) formed using one anamorphic (first) lens group G1 and set of three different spherical (second) lens groups G2(1), G2(2) and G2(3). The anamorphic lens group G1 is shown by way of example as comprising a frontward lens sub-group G1$a$, a middle lens subgroup G1$b$ and a rearward lens sub-group G1$c$, wherein the middle lens sub-group G1$b$ is axially movable for focusing (G1$b$ is also referred to herein as the "focusing optics" or "focusing sub-group"). The axial length LA for all three lens assemblies 100(1), 100(2) and 100(3) is the same.

The lens systems 10013 disclosed herein allows for different lens assemblies 100 with different vertical focal lengths (FLY) to be formed using a modular approach, wherein the relatively high-complexity front anamorphic section 20 is attached to one relatively low-complexity non-anamorphic section 50 of a set 40 of such sections. The non-anamorphic sections 50 are swappable to define different lens assemblies 100 having different focal lengths. This obviates the need for multiple expensive high-complexity anamorphic lenses each having different focal lengths.

The main optical design considerations in forming the anamorphic objective lens system include some, most or all of the following, depending on the particular application: (1) locating any and all of the anamorphic elements in the front anamorphic section 20; (2) locating the focusing optics (sub-group G1$b$) and the attendant focusing mechanics in the front anamorphic section 20; (3) having at least one anamorphic surface located within or frontwards (i.e., towards object space) of the focusing optics G1$b$ to consistently maximize the image quality over the focus range for all focal lengths; (4) having mostly if not only spherical lens elements in the non-anamorphic section 50; (5) matching the front anamorphic section 20 to the non-anamorphic section 50 with respect to aberration control and imaging performance, which can include vignetting and pupil control and other considerations listed above; (6) ensuring that the different lens assemblies formed using a common front anamorphic section 20 and different non-anamorphic sections 50 all have substantially the same length; and (7) enabling the use of first and second mechanical mounting fixtures 26 and 56 that allow for readily connecting and disconnecting the different non-anamorphic sections 50 to the front anamorphic section 20.

Although the example anamorphic objective lens assemblies 100 set forth below have a nominal 2× squeeze (aspect) ratio by way of example, the actual paraxial focal length based squeeze ratios (as calculated by taking the paraxial Y focal length FLY divided by the paraxial X focal length FLX) vary for the given focus distances. This is partly attributable to varying distortions in the X and Y directions of the field of view (over the image) and focus breathing, where focus breathing is the change in field size (or field angle or magnification) when focusing. The fact that the latter occurs to some extent through focus makes up a part of the anamorphic look and is usually a preferred condition of anamorphic objective lens.

Thus, an additional design consideration for the lens assemblies disclosed herein can include producing a similar quantity of minimized breathing to the point where it substantially matches that of a conventional prime lens, especially at the shortest focal lengths.

Large differences in breathing between the Y and X directions are reduced once residual aberrations (non-paraxial) such as distortions are included. For the three examples of the lens assembly 100 disclosed herein, the maximum Y-direction breathing based on a decreasing field angle from the far (infinity) focus distance FD1 to the mid-focus (intermediate focus) distance FD2 and to close focus distance FD3 are respectively +1.00%, +1.03% and +1.07%.

For the three examples of the lens assembly 100 disclosed herein, the maximum X-direction breathing values based on a decreasing field angle from the far focus distance FD1 to the mid-focus distance FD2 and to close focus distance FD3 are respectively +1.00%, +1.00% and +1.01%.

Tables 1, 2 and 3 set forth below are optical prescriptions for the short, medium and long focal length example lens assemblies having Y-Z focal lengths FLY2 of 50.0 mm, 65.0 mm and 85.0 mm, respectively. All three example lens assemblies 100 have an overall axial length LA from the front vertex FV to the image surface IS of 210.2 mm. The front anamorphic section 20 has an axial length LF of 122.5 mm and all three swappable non-anamorphic sections 50(1), 50(2) and 50(3) have an axial length LB measured from the last surface vertex BV of the front anamorphic sub-unit to the image surface IS of 87.7 mm.

The circular clear aperture half diameters of all the lens element surfaces in the front anamorphic section 20 for the three example lens assemblies 100 are given in Tables 1, 2 and 3, wherein they are all the same because the values given are chosen from the maximum required for all the examples. All three example lens assemblies 100 have a full aperture of f/3.5.

Contemporary prime lenses provide focusing over object space distances from far (infinity) to very close to the front of the lens. Since one use of the lens assemblies 100 disclosed herein is as a substitute for having to use multiple anamorphic prime lenses, examples of the lens assemblies 100 disclosed herein also have substantially the same object-space focusing properties as a high-performance prime lens.

This is accomplished by the first lens group G1 having a first stationary lens sub-group G1a followed by the axially movable lens sub group G1b, which is movable to provide in-focus images for different object space distances. In the example lens assemblies 100 described below, the focusing lens sub-group G1b is followed by a stationary third lens sub-group G1c.

FIGS. 2A and 2B are side (Y-Z plane) and plane (X-Z plane) detailed views, respectively, of an example lens system 100LS having three different lens assemblies 100(1), 100(2) and 100(3) with different focal lengths (FLX, FLY) as defined by using a set 40 of back sections 50 having three different non-anamorphic sections 50(1), 50(2) and 50(3). The focal lengths (FLX, FLY) are paraxial, with the Y-direction focal length FLY being exact and the X-direction focal length FLX being approximate. Note that the example lens assembly 100(1) has a short focal length, the example lens assembly 100(2) has medium focal length and the example lens assembly 100(3) has a long focal length.

The details of the various lens elements shown in FIGS. 2A and 2B that constitute the example anamorphic lens group G1 for the front anamorphic section 20 and the spherical lens groups G2(1), G2(2) and G2(3) that constitute the respective example non-anamorphic sections 50(1), 50(2) and 50(3) of the respective lens assemblies 100(1), 100(2) and 100(3) are presented below.

Clear Aperture of Backmost Surface of Front Anamorphic Section

FIGS. 2C, 2D and 2E are close-up views of the three example lens assemblies 100(1), 100(2) and 100(3) of FIG. 2A for the different focal lengths FLY1=50 mm, FLY2=65 mm and FLY3=85 mm, and in particular shows the last two elements L10 and L11 of the lens group G1 of the example front anamorphic section 20, and the first lens element L12 of the lens groups G2(1), G2(2) and G2(3) of the three example non-anamorphic sections 50(1), 50(2) and 50(3), respectively. FIGS. 2C, 2D and 2E include light rays LR, which have been traced through the lens systems 100(1), 100(2) and 100(3) using the aforementioned optical design software.

The example front anamorphic section 20 has a backmost lens element L11, which has a backmost surface SB, which happens to be lens surface S22 for the example front anamorphic section 20 (see FIG. 3A). This backmost surface SB has a clear aperture diameter ("clear aperture") CA, which is defined as twice the maximum height of the light rays (as measured from the optical axis AX) passing through the given lens surface—in the present case, the backmost surface SB of lens L11. The clear aperture CA for the backmost surface SB varies based on the focal length FLY of the lens assembly 100 and is denoted $CA_S$ for the short (or shortest) focal length embodiment of FIG. 2C as defined by the non-anamorphic section 50(1), $CA_M$ for the intermediate or medium focal length embodiment of FIG. 2D as defined by the non-anamorphic section 50(2), and $CA_L$ for the long (or longest) focal length embodiment of FIG. 2E as defined by the non-anamorphic section 50(3).

FIGS. 2C, 2D and 2E also show coincident non-paraxial light ray crossings $LRX_S$, $LRX_M$ and $LRX_L$ for the short, medium and long focal lengths, respectively. In particular, the light ray crossings occur where the axial beam and field beam rim rays cross over.

Of particular interest is the proximity of the light ray crossings $LRX_S$, $LRX_M$ and $LRX_L$ to the backmost surface SB of the front anamorphic section 20 as indicated by an axial LRX distance δ, denoted as δS, δM and δL for the short, medium and long focal length embodiments, respectively. For the short focal length embodiment of FIG. 2C, the $LRX_S$ position is objectwise of the backmost surface SB and the $LRX_S$ distance δS is less than the thickness of lens element L11, i.e., δS<2.45 mm (see Table 1). For the medium focal length embodiment of FIG. 2D, the $LRX_M$ position is imagewise of the backmost surface SB and the $LRX_M$ distance δM is slightly smaller than the axial spacing between the lens elements L11 and L12, i.e., δM<12.79 mm (see Table 2). For the long focal length embodiment of FIG. 2E, the $LRX_L$ position is imagewise of the backmost surface SB and the $LRX_L$ distance δL is slightly greater than the axial spacing between the lens elements L11 and L12, i.e., δL>4.72 mm (see Table 3).

Achieving the preferred low size, weight, cost and related high imaging performance of the front anamorphic section 20 involves reducing the size of the clear aperture of the first lens surface adjacent the object space OBS (i.e., the frontmost lens surface) of the front anamorphic section. Reducing this clear aperture involves reducing the size of the clear aperture CA of the backmost surface SB of the front anamorphic section. As it turns out, the design characteristics of the disclosed lens assemblies 100 are such that the largest clear aperture CA of the backmost surface SB of the front anamorphic section 20 occurs for the non-anamorphic section 50 that produces the longest focal length for the lens assembly 100. This can be seen from FIGS. 2C, 2D and 2E, wherein the longest focal length embodiment 100(3) (FIG. 2E) of the three lens assemblies 100 has the largest clear aperture $CA=CA_L$ for the backmost surface SB of the front anamorphic section 20. Said differently, $CA_S<CA_M<CA_L$. The more general design condition is $CA_S \leq CA_L$. These conditions assume that the F-numbers in the image space IMS are the same or alternatively are substantially the same (e.g., to within design tolerances) for each of the lens assemblies 100.

This condition depends partly on vignetting, but is mainly due to the entrance pupil of all of the rear non-anamorphic sections 50(i) being pushed forward, and in particular substantially more forward than for a stand-alone spherical objective lens so that the light ray crossover locations $LRX_S$, $LRX_M$ and $LRX_L$ are preferably located in front of the rear non-anamorphic sections. This is especially true for the non-anamorphic sections 50 that provide the shorter focal lengths for the lens assembly 100 and which is contrary to many wide angle objective lens designs.

The close proximity of the light ray crossover location $LRX_S$ to the backmost surface SB (as indicated by the small $LRX_S$ distance δS) for the short focal length embodiment is by design because it keeps the clear aperture $CA_S$ small, which in turn keeps the clear aperture of the frontmost lens element L1 (see e.g., FIG. 3E) small. Since the short focal length embodiment will usually have the largest clear aperture for the frontmost lens surface S1 of the frontmost lens element L1 (see FIG. 3A, introduced and discussed below), the lens assemblies 100(i) can be kept relatively compact with respect to the physical size of the lens elements for a wide range of focal lengths.

Interestingly, there is no need to do this with still photography lenses and in fact it actually helps with aberration correction not to do this for such lenses because it facilitates reducing residual aberrations. For the lens assemblies 100 disclosed herein, residual aberration reduction is not solely dependent on the design of the rear non-anamorphic sections 50 but rather depends on optimization of the entire lens assembly, i.e., the front non-anamorphic section 20 and each non-anamorphic section 50(i).

It will be appreciated by those skilled in the art of lens design that conventional wide angle, short focal length commercial photography prime (objective) lenses tend to have a larger clear aperture at the first or frontmost optical surface than for narrower angle, longer focal length lenses. Based on the above condition on the clear aperture CA of the backmost lens surface SB of the front anamorphic section 20, this makes using off-the-shelf conventional objective lenses in place of the optically matched non-anamorphic highly problematic.

In the case of the lens assemblies 100 disclosed herein, it is possible to reduce the clear aperture CA of the backmost surface SB of the front anamorphic section 20 by placing the backmost lens element L11 of the front anamorphic section axially close to the first or frontmost lens element L12 of the non-anamorphic section 50 because the front anamorphic section 20 and the non-anamorphic sections are optically matched, i.e., designed and optimized to work together. In the case of still photography objective lenses, this may be difficult if not impossible to do because the optics and mechanics of the front anamorphic section and especially the still photography rear non-anamorphic sections have been previously designed and would need to be changed by redesign.

In the design Tables 1, 2 and 3 set forth below, the (Clear) Aperture Half Diameter of the backmost surface SB (surface S22) of the front anamorphic section 20 is given as 13.17 mm (i.e. 26.34 mm diameter) for all three example lens assemblies 100(1), 100(2) and 100(3). This was done simply because the largest value (as determined by the longest (vertical) focal length FLY1 of 85 mm) was chosen so that the front anamorphic section can be used with all of the example rear non-anamorphic sections without blocking any light. Said differently, in practice the physical diameter of the backmost lens element LB of the front anamorphic section 20 will be made to accommodate the largest value of the clear aperture CA for the backmost surface SB, and this largest value occurs for the longest focal length embodiment of the non-anamorphic section 50(3) and the corresponding lens assembly 100(3) for the three example configurations. The specific clear aperture half diameters for examples 1, 2 and 3, respectively are 8.32 mm (i.e., $CA_S$=16.64 mm diameter), 11.94 mm (i.e., $CA_M$=23.88 mm diameter), and 13.17 mm (i.e., $CA_L$=26.34 mm diameter).

Example Lens Assembly 100(1)—Short Focal Length

FIG. 3A is a close-up side (Y-Z plane) view of the example short focal length ("short focus") lens assembly 100(1) of FIG. 2A, wherein FLY1=50.0 mm and FLX1≈25.0 mm.

FIGS. 3B and 3C are side (Y-Z plane) and plane (X-Z) views, respectively, of the example short-focus lens assembly 100(1) of FIG. 3A, highlighting the Y-cylinder and X-cylinder lens elements.

The short focal length lens assembly 100(1) includes the aforementioned optical axis AX, a front (or forward) end 102 that defines the object space OBS and a back end (or rear end or rearward end) 104 that defines the image space IMS. FIG. 3A also shows the image surface IS that resides in the image space IMS and the object plane OP that resides in the object space OBS.

The short focal length lens assembly 100(1) comprises, in order from the object space OBS to the image space IMS (i.e., object wise to image wise) and along the optical axis AX: the first or anamorphic lens group G1 associated with the front anamorphic section 20 and the second or spherical lens group G2 associated with the non-anamorphic section 50.

The first lens group G1 is divided up into three lens sub-groups G1a, G1b and G1c.

The first lens sub-group G1a has first and second, lenses L1 and L2. The first lens L1 has front and back surfaces S1 and S2 and is biconvex. The second lens L2 has front and back surfaces S3 and S4 and is biconcave cylindrical, with no power in the Y-Z plane and negative power in the X-Z plane. The first lens sub-group G1a has overall positive (+) power in the Y-Z plane and overall negative (−) power in the X-Z plane.

The second lens sub-group G1b has third and fourth lenses L3 and L4. The third lens L3 has front and back surfaces S5 and S6 and is biconcave. The fourth lens L4 has front and back surfaces S7 and S8 and is biconcave cylindrical with no power in the X-Z plane and negative power in the Y-Z plane. As noted above, the second lens sub-group G1b is axially movable for focus. The second lens sub-group G1b has overall negative (−) power in both the X-Z and Y-Z planes.

The third lens sub-group G1c has a fifth lens L5, a sixth lens L6, a seventh lens L7, an eighth lens L8, a ninth lens L9, a tenth lens L10 and an eleventh lens L11. The fifth lens L5 has front and back surfaces S9 and S10 and is cylindrical biconvex, with positive (+) power in the Y-Z plane and no power in the X-Z plane. The sixth lens L6 has front and back surfaces S11 and S12 and is cylindrical meniscus with the front surface S11 being concave, with the sixth lens having negative power in the Y-Z plane and no power in the X-Z plane. The fifth and sixth lenses L5 and L6 define a cylindrical air-spaced doublet with overall positive (+) power in the Y-Z plane and no power in the X-Z plane. The seventh lens L7 has front and back surface S13 and S14 and is cylindrical negative meniscus with the front surface S13 being flat and with no power in the Y-Z plane and the back surface with negative (−) power in the X-Z plane. The eighth lens L8 has front and back surfaces S15 and S16 and is negative meniscus with the front surface S15 being convex. The ninth lens L9 has front and back surface S17 and S18 and is cylindrical biconvex with no power in the Y-Z plane and positive (+) power in the X-Z plane. The tenth lens L10 has front and back surfaces S19 and S20 and is positive meniscus with the front surface S19 being convex and the back surface S20 being concave. The tenth lens L10 has positive (+) power. The eleventh lens L11 has front and back surfaces S21 and S22 and is negative meniscus with the front surface S21 being convex and the back surface S22 being concave. The tenth lens L10 and the eleventh lens L11 constitute a positive-negative air-spaced doublet.

The second lens group G2 of the non-anamorphic section 50 has a total of six lens elements L12 through L17. The twelfth lens L12 has front and back surfaces S23 and S24 and is biconvex with positive (+) power. The thirteenth lens L13 has front and back surfaces S25 and S26 and is biconcave with negative (−) power. The fourteenth lens L14 has front and back surfaces S27 and S28 and is substantially plano-convex with the front surface S27 being substantially planar (flat). The fifteenth lens L15 has surfaces S30 and S31, with a surface S29 residing between the fourteenth and fifteenth lenses L14 and L15 and defining an aperture stop AS. The fifteenth lens L15 is biconvex with positive (+) power. The sixteenth lens L16 has front and back surfaces S32 and S33 and is positive meniscus with the front surface S32 being convex. The seventeenth lens L17 has front and back surfaces S34 and S35 and is negative meniscus with the front surface S34 being convex.

The image surface IS constituted, by the last surface S36. The object plane OP constitutes an initial surface S0.

FIGS. 3D and 3E show respective side (Y-Z plane) and plane (X-Z plane) views of the example short focal length lens assembly 100(1) of FIG. 3A, illustrating the movement of the focusing sub-group G1b for the infinity focus distance FD1, the intermediate focus distance FD2 and the close focus distance FD3.

For the lens assembly 100(1), the vertical and horizontal paraxial focal lengths (FLY, FLX) are respectively in the Y and X directions (50.0 mm, 24.2 mm), (48.4 mm, 24.1 mm) and (46.9 mm, 23.9 mm), giving respective paraxial squeeze ratios of 2.06, 2.01 and 1.96 at focus distances of FD1, FD2 and FD3. The relative illuminations at the corner of the field/image are respectively 31.0%, 30.9% and 31.0% at the focus distances of FD1, FD2 and FD3. FLX and FLY is the natural order of writing FLX and FLY, however, in the case of anamorphic lenses the FLY usually is stated before as in FLY and FLX. This is explained elsewhere via the squeeze ratio being divided into the FLY to give the FLX—noting that the FLY and FLX ratios are all paraxial.

The breathing based on the Y-direction paraxial focal lengths with infinity focus distance FD1 as the reference is respectively 1.00%, 1.03% and 1.07% at the focus distances of FD1, FD2 and FD3. The breathing based on the paraxial X-direction focal lengths with infinity focus distance FD1 as the reference is respectively 1.00%, 1.00% and 1.01% at the focus distances of FD1, FD2 and FD3. The anamorphic look is enhanced by introducing some breathing in the Y-direction.

Table 1A contains an optical prescription for the example lens assembly 100(1) (Example 1) according to the first general embodiment of FIG. 3A, wherein the design Y-Z focal length is FLY1=50.0 mm.

Example Lens Assembly 100(2)—Medium Focal Length

FIG. 4A is a close-up side (Y-Z plane) view of the example medium focal length lens assembly 100(2) of FIG. 2A, wherein FLY2=65.0 mm and FLX2≈32.5 mm. FIGS. 4B and 4C are side (Y-Z plane) and plane (X-Z) views, respectively, of the example medium-focus lens assembly 100(2) of FIG. 4A, highlighting the Y-cylinder and X-cylinder lens elements.

The intermediate focal length lens assembly 100(2) is similar to the short focal length lens assembly 100(1) in that it has the same front anamorphic section 20 but a different non-anamorphic section 50 with a different second lens group G2.

The second lens group G2 has five lens elements L12 through L16. The twelfth lens L12 has front and back surfaces S23 and S24 and is positive meniscus with the front surface S23 being convex and the back surface S24 being concave. The thirteenth lens element L13 has front and back surfaces S25 and S26 and is positive meniscus with the front surface S25 being convex and the back surface S26 being concave. The fourteenth lens element L14 has front and back surfaces S27 and S28, and is negative meniscus with the back surface S28 being concave. The fifteenth lens element L15 has front and back surfaces S30 and S31 and is biconcave. The aperture, stop AS is defined by surface S29 that resides between the fourteenth and fifteenth lens elements L14 and L15. The sixteenth lens element L16 has front and back surfaces S32 and S33 and is biconvex.

FIGS. 4D and 4E show respective side (Y-Z plane) and plane (X-Z plane) views of the example medium focal length lens assembly 100(2) of FIG. 4A, illustrating the movement of the focusing sub-group G1b for the infinity focus distance FD1, the intermediate focus distance FD2 and the close focus distance FD3.

The paraxial focal lengths are respectively in the Y and X directions, 65.0 mm and 31.5 mm, 62.3 mm and 31.2 mm and 59.8 mm and 31.0 mm, giving respective paraxial squeeze ratios of 2.06, 2.00 and 1.93 at focus distances of FD1, FD2 and FD3. The relative illuminations at the corner of the field/image are respectively 38.1%, 38.0% and 38.1% at focus distances of FD1, FD2 and FD3.

The breathing based on the Y-direction (FLY) paraxial focal lengths with infinity focus distance FD1 as the reference are respectively 1.00%, 1.04% and 1.09% at focus distances of FD1, FD2 and FD3. The breathing based on the paraxial X-direction (FLX) focal lengths with infinity focus distance FD1 as the reference are respectively 1.00%, 1.01% and 1.02% at focus distances of FD1, FD2 and FD3.

Table 2A contains an optical prescription for the example lens assembly 100(2) (Example 2) according to the second general embodiment of FIG. 4A, wherein the design Y-Z focal length is FLY2=65.0 mm.

Example Lens Assembly 100(3)—Long Focal Length

FIG. 5A is a close-up side (Y-Z plane) view of the example long focal length lens assembly 100(3) of FIG. 2A, wherein FLY2=85.0 mm and FLX2≈42.5 mm. FIGS. 5B and 5C are side (Y-Z plane) and plane (X-Z) views, respectively, of the example long-focus lens assembly 100(3) of FIG. 5A, highlighting the Y-cylinder and X-cylinder lens elements.

The long focal length focus lens assembly 100(3) is similar to the short and medium focal length focus lens assemblies 100(1) and 100(2) in that it has the same front anamorphic section 20 but a different non-anamorphic section 50 with a different second lens group G2.

The second lens group G2 has five lens elements L12 through L16. The twelfth lens L12 has front and back surfaces S23 and S24 and is substantially plano-convex, with front surface S23 being convex. The thirteenth lens element L13 has front and back surfaces S25 and S26 and is positive meniscus with the front surface S25 being convex. The fourteenth lens element L14 has front and back surfaces S27 and S28, with the front surface S27 being convex. The fifteenth lens element L15 has front and back surfaces S30 and S31 and is negative meniscus with the front surface S30 being concave. The aperture stop AS is defined by surface S29 that resides between the fourteenth and fifteenth lens elements L14 and L15. The sixteenth lens element L16 has front and back surfaces S32 and S33 and is substantially plano-convex, with the front surface S32 being substantially plano, e.g., flat or slightly concave.

FIGS. 5D and 5E show respective side (Y-Z plane) and plane (X-Z plane) views of the example long focal length lens assembly 100(3) of FIG. 5A, illustrating the movement of the focusing sub-group G1b for the infinity focus distance FD1, the intermediate focus distance FD2 and the close focus distance FD3.

The paraxial focal lengths are respectively in the Y and X directions, 85.0 mm and 41.2 mm, 80.4 mm and 40.7 mm and 76.3 mm and 40.2 mm, giving respective paraxial squeeze ratios of 2.06, 1.98 and 1.90 at focus distances of FD1, FD2 and FD3. The relative illuminations at the corner of the field/image are respectively 26.6%, 26.6% and 26.7% at focus distances of FD1, FD2 and FD3.

The breathing based on the Y-direction (FLY) paraxial focal lengths with infinity focus distance FD1 as the reference are respectively 1.00%, 1.06% and 1.11% at focus distances of FD1, FD2 and FD3. The breathing based on the paraxial X-direction (FLX) focal lengths with infinity focus distance FD1 as the reference are respectively 1.00%, 1.01% and 1.03% at focus distances of FD1, FD2 and FD3.

Table 3A contains an optical prescription for the example lens assembly 100(3) (Example 3) according to the third general embodiment of FIG. 5A, wherein the design Y-Z focal length is FLY1=85.0 mm.

Additional Features

The front anamorphic section 20 includes at least one anamorphic lens element, and further in the example can include at least one cylindrical element. In cases where cost reduction and design simplicity are important, the lens elements in the front anamorphic section can comprise only spherical and cylindrical surfaces, wherein a plano surface is considered a spherical surface and not an aspherical surface. Said differently, in an example, the front anamorphic section 20 does not include any aspherical or toroidal or aspherical toroidal surfaces.

In the case of not having any aspherical or aspherical toroidal surfaces, this has an advantage with respect to bokeh, which is the aesthetic quality of out-of-focus parts of an image. A front anamorphic section 20 having only spherical and cylindrical surfaces avoids the detrimental "onion ring" effect on bokeh associated with the use of aspherical lens elements.

In an example, a given anamorphic lens element can have an XZ curved surface on the front surface of a lens element and a YZ curved surface on the back surface of the same lens element.

The objective lenses 100 disclosed herein can be configured so that the axial lens length LA remains unchanged when changing focus and further in all examples the lens length remains unchanged when also changing between the design focus distances.

Further in the example, the axial lens length LA also stays constant when swapping out one non-anamorphic section 50 for another when forming the lens assemblies 100. This property of the axial lens length LA not changing when changing focus distance obviates the need to change a calibrated focus scale on a focus dial on the front anamorphic section 20 (see FIG. 15).

While the example lense assemblies 100 are shown in the above-cited Figures in isolation for ease of explanation, in examples it may be preceded by or followed by any number of optics within the scope of the present disclosure.

Optical Performance

FIGS. 6A-6C, 8A-8C and 10A-10C show transverse ray aberration plots for various field/image positions over a range of wavelengths respectively for the short, medium and long focal length examples for the infinite, intermediate and close focus distances FD1, FD2 and FD3, respectively.

FIGS. 7A-7C, 9A-9C and 11A-11C show diffraction limited polychromatic MTF plots (modulation M vs. spatial frequency f (cycles/mm)) for tangential and sagittal azimuths respectively for the short, medium and long focal length examples where the modulation is above 60% at a spatial frequency of 25 cycles/mm. The MTF curves are for the same fields and wavelengths as in FIGS. 6A-6C, with the topmost curve (dotted line) representing the diffraction limit.

The MTF performance is provided for five field positions, namely on-axis (center of the image), top of the image, side of the image, 70% of the diagonal of the corner of the image and the corner of the image at Y and X azimuths at the fields given in Table B.

The relative wavelength weightings for the curves is as follows in Table A.

TABLE A

Wavelength Weighting for MTF plots

| Wavelength (nm) | Weight |
|---|---|
| 643.8469 | 7 |
| 587.5618 | 8 |
| 546.0740 | 9 |
| 486.1327 | 7 |
| 450.0000 | 4 |

The line types in the MTF plots as a function of field position are as follows, with the dotted line representing the diffraction limit.

TABLE B

Line types and field positions

| FIELD | Line Type | LOCATION |
|---|---|---|
| FIELD 1 Y | Solid | On axis |
| FIELD 1 X | Dashed-dot | |
| FIELD 2 Y | Short dashed | Top/bottom |
| FIELD 2 X | Dash-dot-dot | |
| FIELD 3 Y | Medium dashed | Side |
| FIELD 3 X | Dash-dot-dot-dot | |
| FIELD 4 Y | Long dashed | 70% diagonal |
| FIELD 4 X | Dash-dot-dot-dot-dot | |
| FIELD 5 Y | Extra-long dashed | Corner of |
| FIELD 5 X | Dash-dot-dot-dot-dot-dot | Diagonal |

The image size dimensions for the field positions given in FIGS. 6A-6C, 8A-8C and 10A-10C and 7A-7C, 9A-9C and 11A-11C are X=0 mm and Y=0 mm for on-axis, X=0 mm and Y=8.91 mm for top of the image, X=10.65 mm and Y=0 mm for side of the image, X=7.46 mm and Y=6.24 mm for 70% of the diagonal of the corner of the image and X=10.65 mm and Y=8.91 mm for the corner of the image.

FIGS. 12A-12C show the peripheral distortion for the short, medium and long focal length examples at intermediate focus distance FD2.

FIGS. 13A-13C illustrate the on-axis bokeh for the short, medium and long focal length examples where the lens examples are all set at a close focus distance FD3 and the object is at a far focus distance FD1.

FIGS. 7A-7C, 9A-9C and 11A-11C indicate that the three lens assembly examples all provide an MTF greater than 60% diffraction limited modulation at 25 cycles/mm at far, intermediate and close focus distances FD1, FD2, and FD3 and at wavelengths of 643.8 nm, 587.6 nm, 546.1 nm, 486.1 nm and 450.0 nm with respective weightings of 7, 8, 9, 7 and 4. The variation in the lowest MTF performance for each example lens assembly 100 through focus is less than 10% and the variation in the lowest MTF performance between all of the example lens assemblies at all focus distances is less than about 10%. Therefore, the MTF of all lenses at all focus distances is consistent and shows high performance.

Figure 10A:
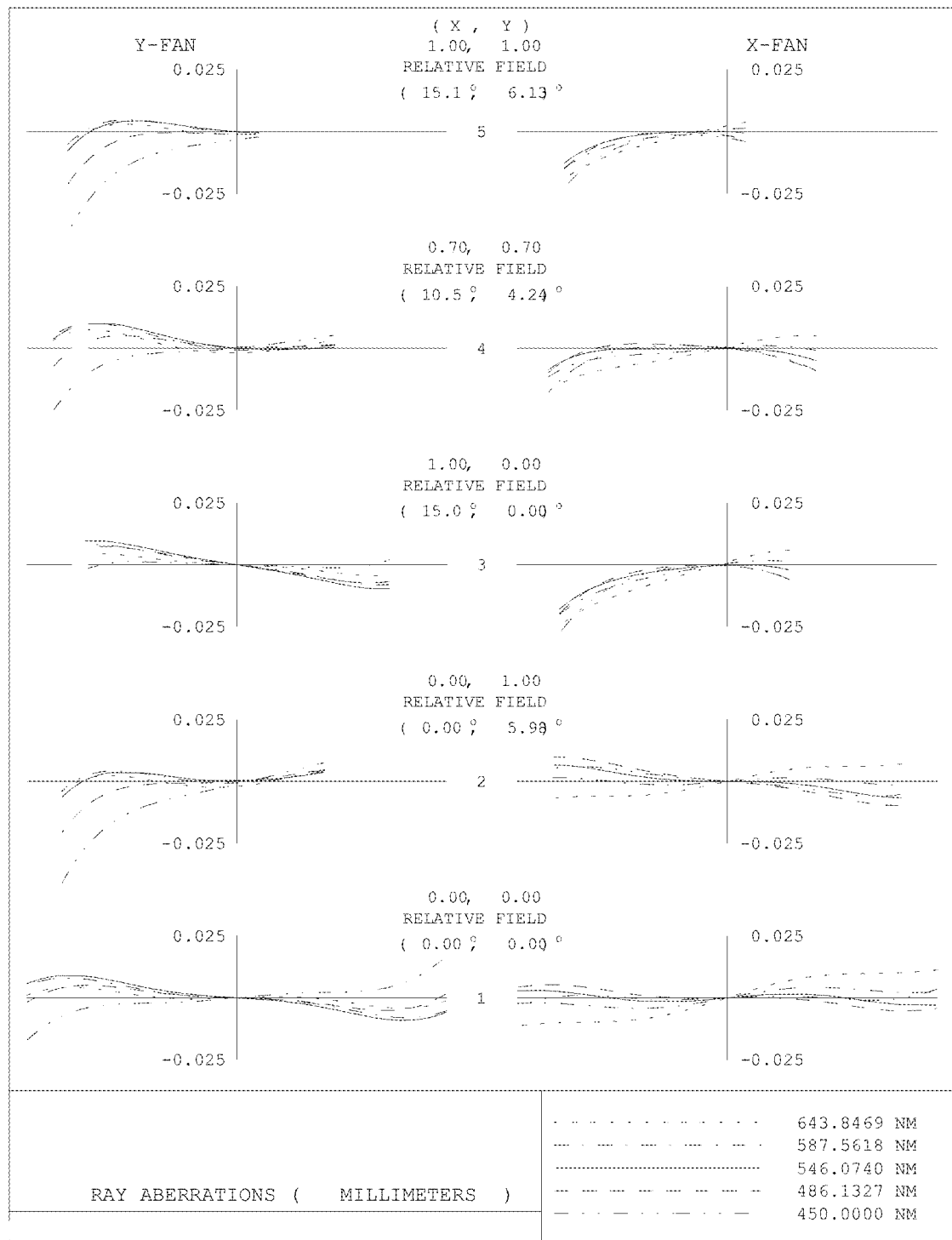
Figure 10B:
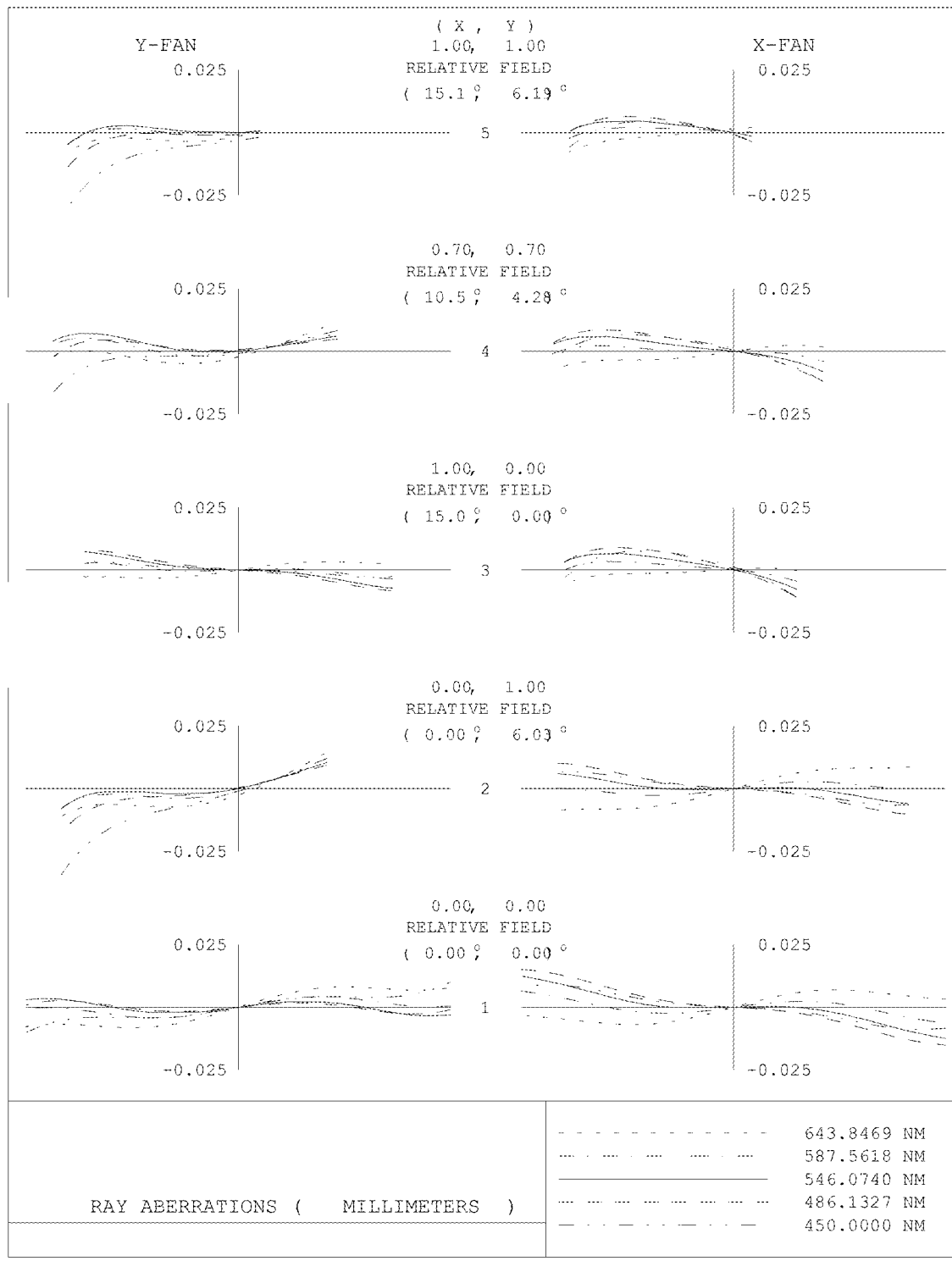
Figure 10C:
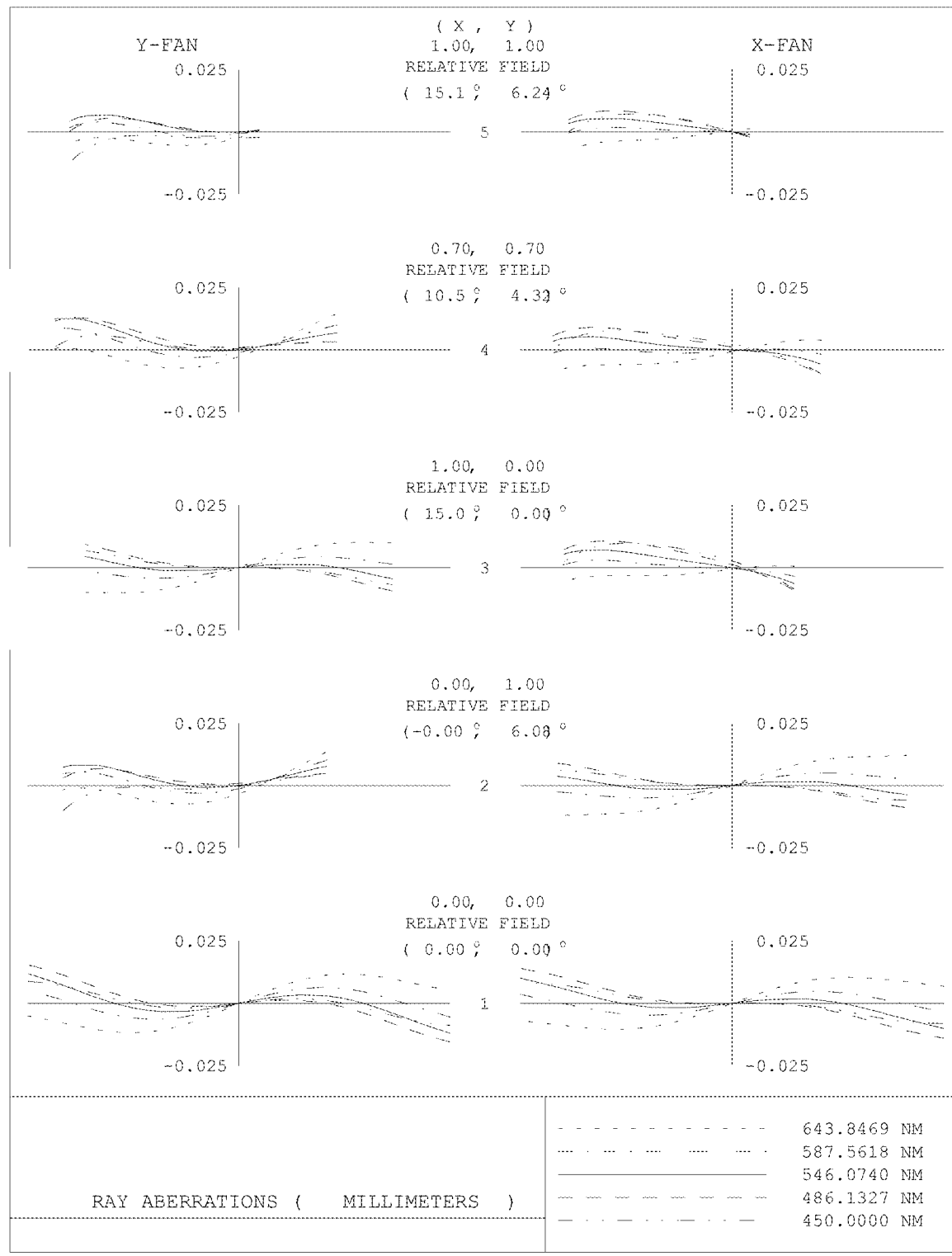
Figure 11A:
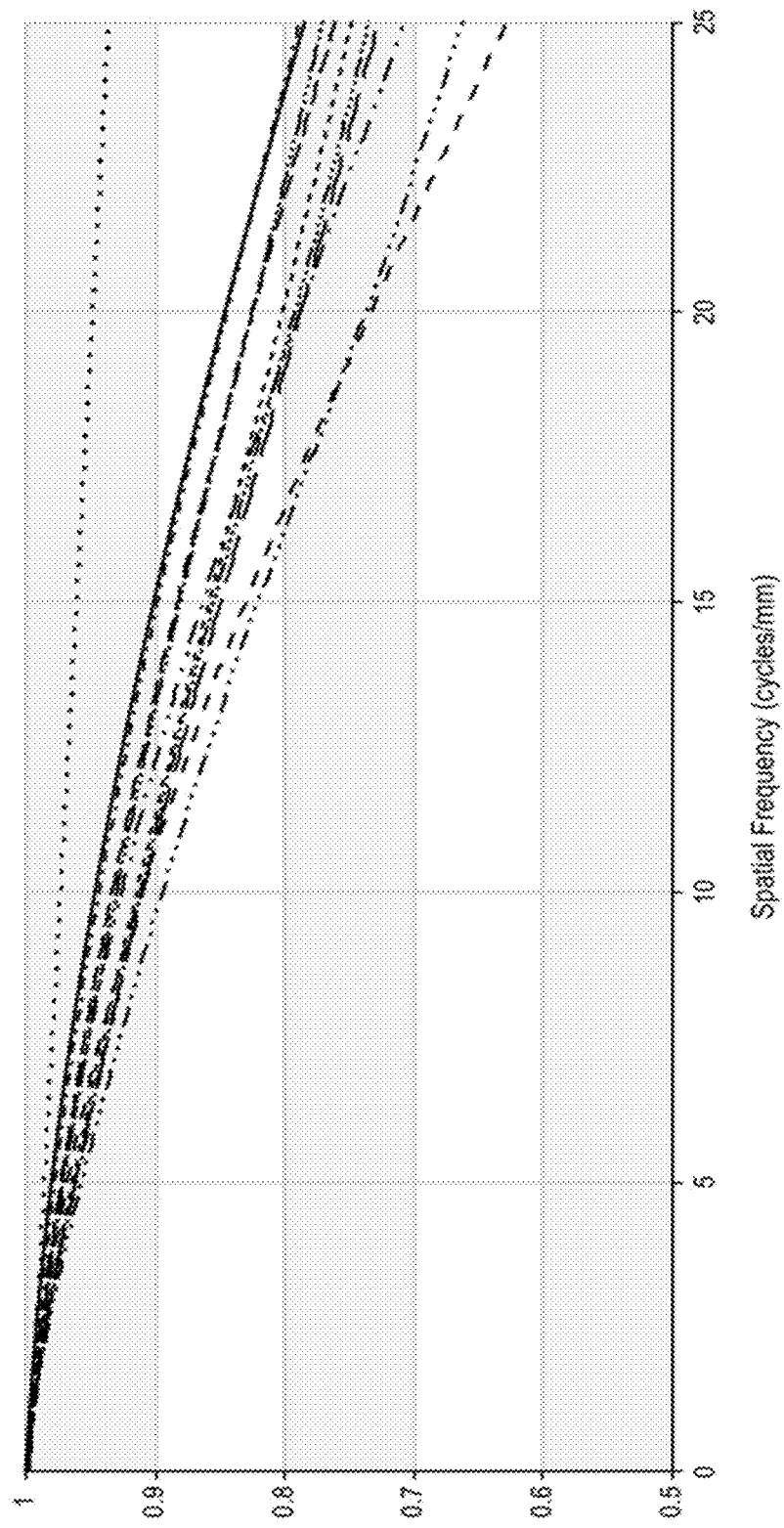
Figure 11B:
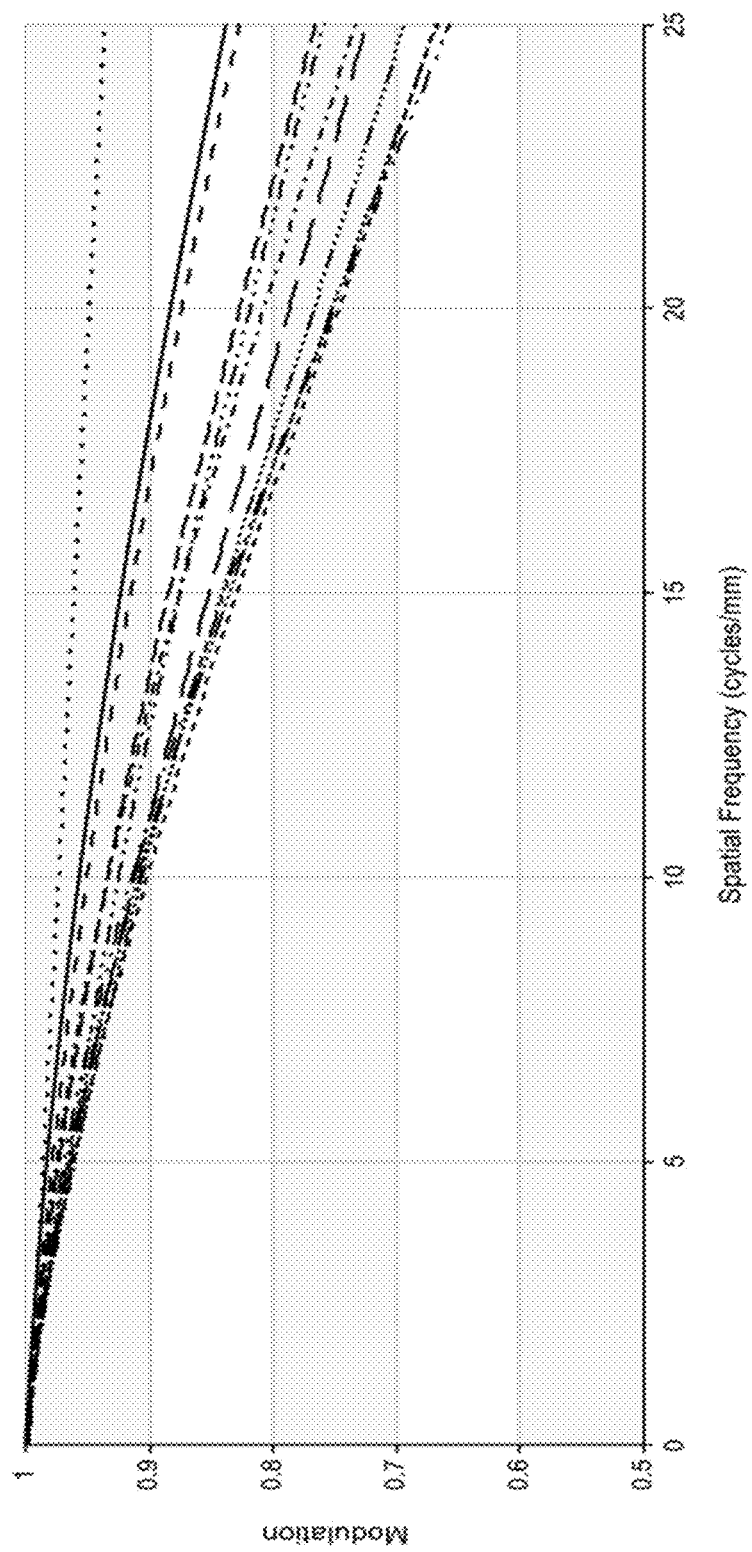
Figure 11C:
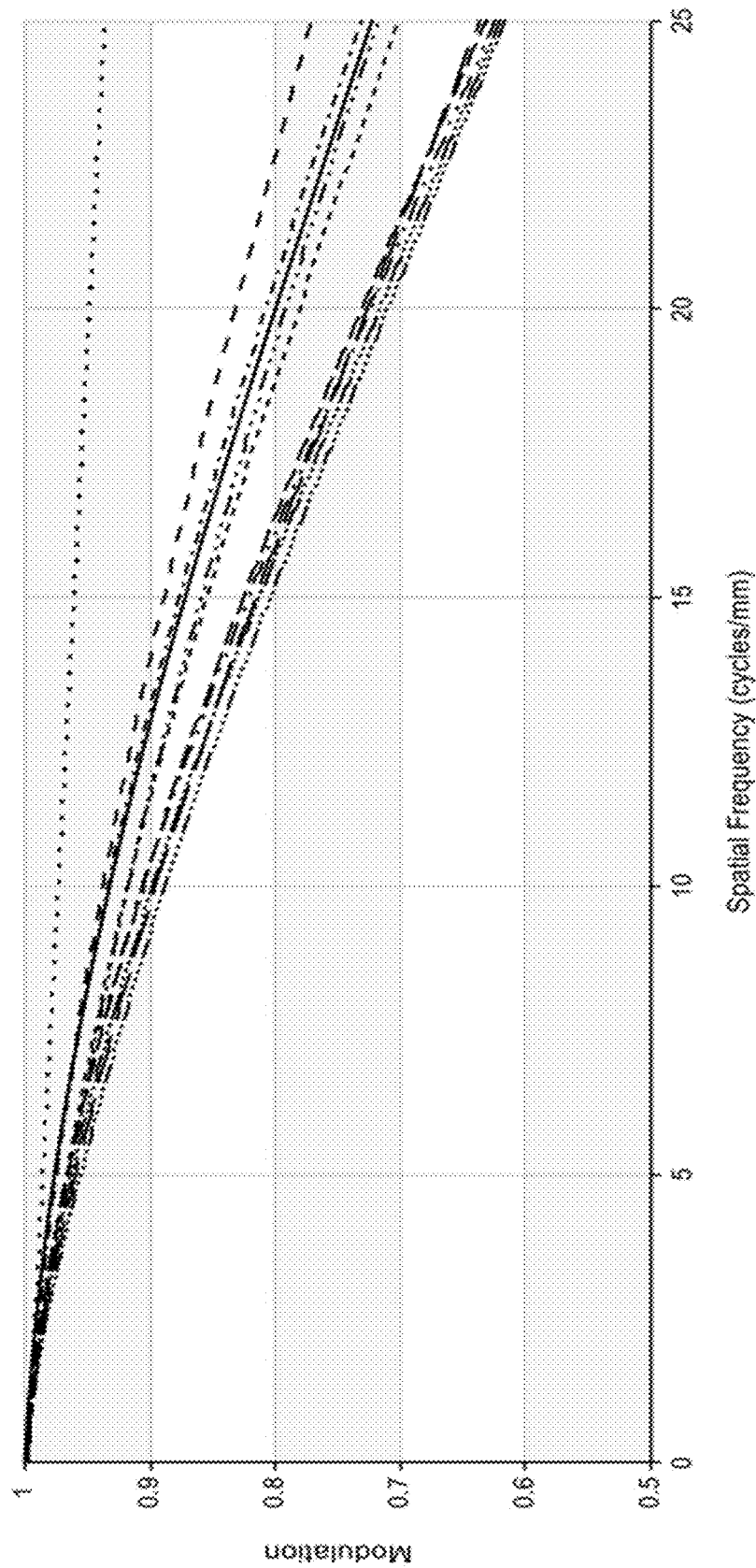

The transverse ray aberration performance of the three example lens assemblies 100 is shown in FIGS. 6A-6C, 8A-8C and 10A-10C and show that all the transverse ray aberration performance for the example lens assemblies is mostly within plus or minus 0.025 mm at the image surface at wavelengths of 643.8 nm, 587.6 nm, 546.1 nm, 486.1 nm and 450.0 nm except for a few fields at a wavelength of 450.0 nm in FIGS. 10A and 10B which slightly exceed minus 0.025 mm at the image surface.

FIGS. 12A-12C are peripheral distortion plots and are given for the example lenses focused at the intermediate focus distance FD2 for each of three example lens assemblies 100. The peripheral distortion plots show that the amount of peripheral distortion is small and similar for all the example lens assemblies.

FIGS. 13A-13C are plots of the on-axis bokeh for the three example lens assemblies 100, with the object at the far distance (FD1) and the lens assemblies focused at the close focus distance (FD3). The plots show that the bokeh shape is oval or elliptical with a maximum vertical dimension over maximum horizontal direction that is similar to the 2× squeeze ratio of the lenses and the shapes of the bokehs are all similar hence consistent.

The anamorphic objective lens system 100LS disclosed herein allows for forming multiple lens assemblies each having a different focal length and also having consistent high-quality imaging performance, e.g., substantially the same as that of high-performance prime lenses. Thus, an aspect of the disclosure is directed to replacing a set of relatively expensive anamorphic objective prime lenses with a single front anamorphic section 20 and a set 40 of two or more non-anamorphic sections 50 that can be attached to and swapped to form different lens assemblies having different focal lengths while maintaining high-performance imaging. The multiple lens assemblies 100 formed using the anamorphic objective lens system 100LS are far less expensive than the same number of conventional anamorphic objective lenses. While the front anamorphic section 20 may be close in cost to a conventional anamorphic objective lens, the non-anamorphic sections cost is substantially less than the front anamorphic section. Thus, the cost savings starts with having just n=2 two non-anamorphic sections 50 quickly accumulate as the number n of non-anamorphic sections 50 increases.

A conventional way to cover a relatively wide focal length span from about 35 mm to 100 mm with a set of prime lenses is to have P=5 different prime lenses with design focal lengths spread out over the focal length span, such as 35 mm, 40 mm, 50 mm, 75 mm and 100 mm. It is noted that each of the prime lenses may cost between about $30K and $40K, so that the cost of this set of P=5 prime lenses is about $150K to $200K.

FIG. 14A is a schematic diagram that illustrates how a set 140 of five conventional prime lenses 200, denoted, 200(1) through 200(5) is used to cover the five focal lengths in the above example focal span from 35 mm to 100 mm according to the prior art approach. FIG. 14B shows how the five conventional prime lenses 200 can be replaced by a lens system 100LS having a single front anamorphic section 20 and a set 40 of five non-anamorphic sections 50, denoted 50(1) through 50(5), that can be used to form five different lens assemblies 100 having the respective focal lengths of the five conventional prime lenses 200(1) through 200(5).

It can be conservatively assumed that the single front anamorphic section 20 costs about the same as one conventional prime lens 200 and that a single one of the non-anamorphic sections 50 costs about 25% that of the front anamorphic section 20 and thus about 25% of the conventional prime lens 200.

If each conventional prime lens 200 costs 1 unit, then the set 140 of the prime lenses costs 5 units. On the other hand, the lens system 100LS costs a total of 2.25 units, i.e., 1 unit for the front anamorphic section 20 and 5·(0.25)=1.25 units for the 5 non-anamorphic sections 50. The lens system 100LS thus costs 45% of the cost of the set 140 of conventional prime lenses 200.

For a larger set of prime lenses having an additional two focal lengths of 35 mm and 135 mm, the lens system 100LS costs a total of 2.75 units, i.e., 1 unit for the front anamorphic section and 7·(0.25)=1.75 units for the 7 non-anamorphic sections 50. With each conventional prime lens 200 cost being 1 unit, then the set 140 of the prime lenses costs 7 units. The lens system 100LS thus costs less than 40% (i.e. 39.3%) of the cost of the set 140 of conventional prime lenses 200.

For an even larger set of conventional prime lenses there can be further cost savings.

Camera System Embodiment

FIG. 15 is a schematic diagram of the lens system 100LS as disclosed herein used in combination with a camera 300 to form a camera system 301. The camera 300 includes a camera housing 302 having interior 304 and a front side 305. Front side 305 includes a mounting fixture 306. The camera 300 operably supports within the interior 304 an image sensor EIS that is electrically connected to camera electronics 312. The camera electronics 312 are configured to receive and process the images captured by the image sensor EIS.

The front anamorphic section 20 of the lens assembly 100($i$) includes a lens barrel 320 with a front end 322 and a back end 324 that includes the mounting fixture 26. The non-anamorphic section 50($i$) of the lens assembly 100($i$) includes a lens barrel 350 with a front end 352 that includes the mounting fixture 56 and a back end 354 that includes another mounting fixture 58 configured to operably engage and disengage with (i.e., operably attachable to and detachable from) the mounting fixture 306 of the camera one at a time.

In an example, the front anamorphic section 20 includes a focusing dial 380 for changing focus, wherein rotating the focus dial causes axial movement of the focusing lens sub-group G1$b$ in the anamorphic lens group G1 of the anamorphic front section. The focusing dial 380 has a focus scale 382, which remains calibrated when the axial lens length LA of the different lens assemblies 100($i$) is substantially the same.

The mechanical means for operably connecting the focusing dial 380 to the focusing lens sub-group G1$b$ and for movably supporting the focusing lens sub-group are well known in the art.

The camera system 301 can include an optional optical filter 314 arranged within the camera housing interior 304 adjacent and in front of the image sensor EIS. In examples, the camera 300 can be a cinemagraphic camera or a video camera.

The MTF performance of the lens assemblies 100 disclosed herein is at a level suitable for use with electronic (image) sensors ESI having around 6,000 pixels or more across the field of view. Such electronic image sensors EIS are known by those skilled in the art as 6K image sensors.

Additional Cost Considerations

The total number of lens elements in each of the example lens assemblies 100(1), 100(2) and 100(3) is 17, 16 and 16 lens elements, respectively. However, the front anamorphic section 20 with 11 lens elements is only used once with multiple rear non-anamorphic sections. Therefore, this gives an overall total of 27 (i.e. 11, 6, 5 and 5) lens elements for the three lens assemblies, with a total of 6 cylindrical lens elements. The corresponding overall total number of lens elements for a conventional lens which provides the same number of focal lengths could be 49 (i.e. 17, 16 and 16).

Cylindrical lens elements are more expensive to manufacture, e.g., approximately twice the cost of correspondingly sized spherical lens elements. This means that on a cost factored basis, the overall total of the 27 lens elements (cylindrical+spherical) is equivalent to the cost of 33 spherical lens elements. The corresponding lens cost of a conventional anamorphic objective lens that provides the same number of focal lengths could be set at 67 units due to the front anamorphic section being used three times.

This means that purely in terms of lens element cost, the disclosure contains just less than half of the cost of the conventional design approach. However, the conventional design approach has other higher cost contributions from using three focus optics and mechanics rather than one for the disclosed lens assemblies. Furthermore, cylindrically surfaced lens elements are notoriously difficult to assemble and adjust during building of the lens system and having to deal with them three times using the conventional approach as compared to dealing with them only once for the disclosure differentiates the cost even more, further lowering the cost of the anamorphic objective lens of the present disclosure. It would be reasonable to expect that after considering most known cost factors the disclosure contains just about two-fifths (i.e. 40%) of the cost of the conventional design approach.

Although not direct cost advantages, there are indirect cost benefits related to the disclosure. For example, by having swappable rear optics with the same axial length the close focus distance of all focal length lenses is the same which can speed up camera shooting by requiring less setup change. Also, having less weight and overall volume the storage size and transportation costs for the disclosure should be less than that for prime lenses. Furthermore, having only one high complexity anamorphic part of the optical system containing only one focusing system servicing should be less time consuming and lower in cost.

Design Tables

The various Design Tables mentioned above for each of the three example lens assemblies 100(1), 100(2) and 100(3) are included below. Note that the front anamorphic section 20 is the same for each of the three example lens assemblies and this information is included in each Table for completeness.

In the Design Tables and Figures, the following symbols are used

Group=lens group
Sub-group=lens sub-group
L=Lens element
S=Surface
FD($i$)=focus distance position i
FL=Design focal length
SEP=Separation between adjacent surfaces (mm)
RX, RY=X, Y Radii of curvature (mm); R=Radius of curvature for a spherical surface
TYPE=material of medium, e.g., glass or air
Code=glass code
Name=glass name
Supplier=glass supplier
MTF=Modulation Transfer Function. The MTF data is polychromatic diffraction MTF data (%) at 25 cycles/mm at various object-to-image focus distances at a fixed image position surface and at wavelengths of 643.9 nm, 587.6 nm, 546.1 nm, 486.1 nm and 455.0 nm with respective weightings of 7, 8, 9, 7 and 4.

The design Tables 1 through 3 are set forth below starting on the next page.

Example 1—Table 1

TABLE 1

Optical Prescription

| Item | Group | Sub Group | Surface No. | Surface Shape[1] | Focus Position | Separation (nm) | X Radius of Curvature (nm) | Y Radius of Curvature (nm) | Material Type | Code | Name[2] | Supplier[3] | Aperture[4] Half Diameter (nm) |
|---|---|---|---|---|---|---|---|---|---|---|---|---|---|
| Object Plane | | | S0 | Plano | FD1 | 100002.00 | Flat | Flat | Air | | | | |
| | | | | | FD2 | 1843.000 | | | | | | | |
| | | | | | FD3 | 868.000 | | | | | | | |
| L1 | G1 | G1a | S1 | Sph. | All | 4.429 | 700.562 | 700.002 | Glass | 547238 | STH53 | OHARA | 32.82 |
| | | | S2 | Sph. | All | 5.519 | −1525.00 | −1525.000 | Air | | | | 31.92 |
| L2 | G1 | G1a | S3 | X Cyl. | All | 4.000 | −101.063 | Flat | Glass | 497816 | SFPL51 | OHARA | 29.72 |
| | | | S4 | X Cyl. | FD1 | 15.511 | 76.335 | Flat | Air | | | | 27.33 |
| | | | | | FD2 | 12.336 | | | | | | | |
| | | | | | FD3 | 8.320 | | | | | | | |
| L3 | G1 | G1b | S5 | Sph. | All | 3.000 | −422.684 | −422.634 | Glass | AP7816 | SFP51 | OHARA | 23.75 |
| | | | S6 | Sph. | All | 5.416 | 106.119 | 106.119 | Air | | | | 22.52 |
| L4 | G1 | G1b | S7 | Y Cyl. | All | 3.200 | Flat | −138.368 | Glass | 58486 | SLAH65 | OHARA | 22.09 |
| | | | S8 | Y Cyl. | FD1 | 2.286 | Flat | 258.236 | Air | | | | 21.77 |
| | | | | | FD1 | 5.488 | | | | | | | |
| | | | | | FD3 | 5.677 | | | | | | | |
| L5 | G1 | G1c | S9 | Y Cyl. | All | 10.640 | Flat | 243.348 | Glass | 638634 | SFH52 | OHARA | 21.17 |
| | | | S10 | Y Cyl. | All | 0.853 | Flat | 41.527 | Air | | | | 21.86 |
| L6 | G1 | G1c | S11 | Y Cyl. | All | 7.066 | Flat | −49.911 | Glass | 547238 | STH53 | OHARA | 28.85 |
| | | | S12 | Y Cyl. | All | 10.492 | Flat | −73.368 | Air | | | | 21.31 |
| L7 | G1 | G1c | S13 | Sph. | All | 3.000 | Flat | Flat | Glass | 606457 | STH53 | OHARA | 19.57 |
| | | | S14 | X Cyl. | All | 2.000 | T9065 | Flat | Air | | | | 19.48 |
| L8 | G1 | G1c | S15 | Sph. | All | 18.758 | 70.533 | 70.533 | Glass | 806254 | STH56 | OHARA | 19.14 |
| | | | S16 | Sph. | All | 7.528 | 67.370 | 67.370 | Air | | | | 16.36 |
| L9 | G1 | G1c | S17 | X Cyl. | All | 8.543 | 87.531 | Flat | Glass | 497816 | SFPL51 | OHARA | 16.01 |
| | | | S18 | X Cyl. | All | 2.000 | −68.533 | Flat | Air | | | | 15.71 |
| L10 | G1 | G1c | S19 | Sph. | All | 4.582 | 50.729 | 50.719 | Glass | 535427 | SLAH55V | OHARA | 14.97 |
| | | | S20 | Sph. | All | 0.976 | 337.165 | 337.165 | Air | | | | 14.41 |
| L11 | G1 | G1c | S21 | Sph. | All | 2.458 | 4393.823 | 4393.823 | Glass | 686437 | SBAM4 | OHARA | 14.16 |
| | | | S22 | Sph. | All | 4.786 | 43.481 | 43.481 | Air | | | | 13.17 |
| L12 | G2 | | S23 | Sph. | All | 2.744 | 84.664 | 84.664 | Glass | 768528 | SYGH31 | OHARA | 7.14 |
| | | | S24 | Sph. | All | 6.801 | −195.007 | −195.007 | Air | | | | 7.06 |
| L13 | G2 | | S25 | Sph. | All | 1.500 | −22.376 | −22.376 | Glass | 596392 | STD18 | OHARA | 6.39 |
| | | | S26 | Sph. | All | 2.794 | 18.038 | 18.038 | Air | | | | 4.54 |
| L14 | G2 | | S27 | Sph. | All | 3.116 | 1028.618 | 1028.618 | Glass | 581359 | SLA3156 | OHARA | 7.87 |
| | | | S28 | Sph. | All | 2.268 | −31.996 | −31.996 | Air | | | | 7.46 |
| Stop | | | S29 | Sph. | All | 3.844 | Flat | Flat | Air | | | | 7.85 |
| L15 | G2 | | S30 | Sph. | All | 7.600 | 84.567 | 84.567 | Glass | 497816 | SFP51 | OHARA | 5.38 |
| | | | S31 | Sph. | All | 0.500 | −18.917 | −18.917 | Air | | | | 8.62 |
| L16 | G2 | | S32 | Sph. | All | 2.686 | 34.942 | 34.942 | Glass | 758623 | SYGH51 | OHARA | 7.58 |
| | | | S33 | Sph. | All | 0.589 | 34.085 | 34.085 | Air | | | | 7.32 |
| L17 | G2 | | S34 | Sph. | All | 1.800 | 36.878 | 36.878 | Glass | 726285 | STEH16 | OHARA | 7.18 |
| | | | S35 | Sph. | All | 47.876 | 18.525 | 18.525 | Air | | | | 6.68 |
| Image Surface | | | S36 | X & Y Cyl. | FD1 | | −744.936 | −398.695 | | | | | |
| | | | | X & Y Cyl. | FD2 | | −243.166 | −318.708 | | | | | |
| | | | | X & Y Cyl. | FD3 | | −286.000 | −212.707 | | | | | |

Notes:
[1]In the Surface Shape column the image surface is not flat to simulate equivalent curved object surfaces through focus distance position FD1, FD2 and FD3.
[2]In the Material Name column the trade name of the less material used is given.
[3]In the Material Supplier column a manufacturer name is given although there may be alternative manufacturers.
[4]The data given is the Aperture Half Diameter column is for circular aperture.

Example 2—Table 2

TABLE 2

Optical Prescription

| Item | Group | Sub Group | Surface No. | Surface Shape[1] | Focus Position | Separation (nm) | X Radius of Curvature (nm) | Y Radius of Curvature (nm) | Material Type | Material Code | Material Name[2] | Material Supplier[3] | Aperture[4] Half Diameter (nm) |
|---|---|---|---|---|---|---|---|---|---|---|---|---|---|
| Object Plane | | | S0 | Plano | FD1 | 100002.00 | Flat | Flat | Air | | | | |
| | | | | | FD2 | 1843.000 | | | | | | | |
| | | | | | FD3 | 868.000 | | | | | | | |
| L1 | G1 | G1a | S1 | Sph. | All | 4.429 | 700.562 | 700.002 | Glass | 847238 | STH53 | OHARA | 32.82 |
| | | | S2 | Sph. | All | 5.519 | −1525.00 | −1525.000 | Air | | | | 31.92 |
| L2 | G1 | G1a | S3 | X Cyl. | All | 4.000 | −101.063 | Flat | Glass | 497816 | SFPL51 | OHARA | 29.72 |
| | | | S4 | X Cyl. | FD1 | 15.511 | 76.335 | Flat | Air | | | | 27.33 |
| | | | | | FD2 | 12.336 | | | | | | | |
| | | | | | FD3 | 8.320 | | | | | | | |
| L3 | G1 | G1b | S5 | Sph. | All | 3.000 | −422.684 | −422.634 | Glass | 497816 | SFP51 | OHARA | 23.75 |
| | | | S6 | Sph. | All | 5.416 | 106.119 | 106.119 | Air | | | | 22.52 |
| L4 | G1 | G1b | S7 | Y Cyl. | All | 3.200 | Flat | −139.348 | Glass | 58486 | SLAH65 | OHARA | 22.09 |
| | | | S8 | Y Cyl. | FD1 | 2.286 | Flat | 258.236 | Air | | | | 21.77 |
| | | | | | FD2 | 5.488 | | | | | | | |
| | | | | | FD3 | 5.677 | | | | | | | |
| L5 | G1 | G1c | S9 | Y Cyl. | All | 10.640 | Flat | 243.348 | Glass | 638634 | SFH52 | OHARA | 21.17 |
| | | | S10 | Y Cyl. | All | 0.853 | Flat | −41.527 | Air | | | | 21.86 |
| L6 | G1 | G1c | S11 | Y Cyl. | All | 7.066 | Flat | −49.911 | Glass | 547238 | STH53 | OHARA | 28.85 |
| | | | S12 | Y Cyl. | All | 10.492 | Flat | −73.368 | Air | | | | 21.31 |
| L7 | G1 | G1c | S13 | Sph. | All | 3.000 | Flat | Flat | Glass | 606457 | STH53 | OHARA | 19.57 |
| | | | S14 | X Cyl. | All | 2.000 | 79.058 | Flat | Air | | | | 19.48 |
| L8 | G1 | G1c | S15 | Sph. | All | 18.758 | 70.533 | 70.533 | Glass | 806254 | STH56 | OHARA | 19.14 |
| | | | S16 | Sph. | All | 7.528 | 67.370 | 67.370 | Air | | | | 16.36 |
| L9 | G1 | G1c | S17 | X Cyl. | All | 8.543 | 87.531 | Flat | Glass | 497816 | SFPL51 | OHARA | 16.01 |
| | | | S18 | X Cyl. | All | 2.000 | −68.533 | Flat | Air | | | | 15.71 |
| L10 | G1 | G1c | S19 | Sph. | All | 4.582 | 50.729 | 50.719 | Glass | 535427 | SLAH55V | OHARA | 14.97 |
| | | | S20 | Sph. | All | 0.976 | 337.165 | 337.165 | Air | | | | 14.41 |
| L11 | G1 | G1c | S21 | Sph. | All | 2.458 | 4393.823 | 4393.823 | Glass | 686437 | SBAM4 | OHARA | 14.16 |
| | | | S22 | Sph. | All | 4.786 | 43.481 | 43.481 | Air | | | | 13.17 |
| L12 | G2 | | S23 | Sph. | All | 2.744 | 38.152 | 38.182 | Glass | 768523 | SYGH31 | OHARA | 9.36 |
| | | | S24 | Sph. | All | 6.801 | 198.850 | 198.850 | Air | | | | 9.88 |
| L13 | G2 | | S25 | Sph. | All | 1.500 | 18.392 | 18.392 | Glass | 615634 | SPH3152 | OHARA | 8.71 |
| | | | S26 | Sph. | All | 2.794 | 97.246 | 97.246 | Air | | | | 8.12 |
| L14 | G2 | | S27 | Sph. | All | 3.116 | 74.374 | 74.374 | Glass | 596392 | STIM8 | OHARA | 7.72 |
| | | | S28 | Sph. | All | 2.268 | 14.668 | 14.668 | Air | | | | 8.93 |
| Stop | | | S29 | Sph. | All | 3.844 | Flat | Flat | Air | | | | 6.02 |
| L15 | G2 | | S30 | Sph. | All | 7.600 | −59.736 | 84.567 | Glass | 689311 | STIM28 | OHARA | 6.31 |
| | | | S31 | Sph. | All | 0.500 | 29.358 | −18.917 | Air | | | | 6.21 |
| L16 | G2 | | S32 | Sph. | All | 2.686 | 48.904 | 34.942 | Glass | 838427 | SLAB35V | OHARA | 6.44 |
| | | | S33 | Sph. | All | 0.589 | −46.998 | 34.085 | Air | | | | 6.28 |
| Image Surface | | | S34 | X & Y Cyl. | FD1 | | −328.990 | −398.695 | | | | | |
| | | | | X & Y Cyl. | FD2 | | −291.162 | −318.708 | | | | | |
| | | | | X & Y Cyl. | FD3 | | −200.000 | −200.000 | | | | | |

Notes:

[1] In the Surface Shape column the image surface is not flat to simulate equivalent curved object surfaces through focus distance position FD1, FD2 and FD3.

[2] In the Material Name column the trade name of the less material used is given.

[3] In the Material Supplier column a manufacturer name is given although there may be alternative manufacturers.

[4] The data given is the Aperture Half Diameter column is for circular aperture.

Example 3—Table 3

TABLE 3

Optical Prescription

| Item | Group | Sub Group | Surface No. | Surface Shape[1] | Focus Position | Separation (nm) | X Radius of Curvature (nm) | Y Radius of Curvature (nm) | Material Type | Material Code | Material Name[2] | Supplier[3] | Aperture[4] Half Diameter (nm) |
|---|---|---|---|---|---|---|---|---|---|---|---|---|---|
| Object Plane | | | S0 | Plano | FD1 | 100002.00 | Flat | Flat | Air | | | | |
| | | | | | FD2 | 1843.000 | | | | | | | |
| | | | | | FD3 | 868.000 | | | | | | | |
| L1 | G1 | G1a | S1 | Sph. | All | 4.429 | 700.562 | 700.002 | Glass | 847238 | STIH53 | OHARA | 32.82 |
| | | | S2 | Sph. | All | 5.519 | −1525.00 | −1525.000 | Air | | | | 31.92 |
| L2 | G1 | G1a | S3 | X Cyl. | All | 4.000 | −101.063 | Flat | Glass | 497816 | SFPL51 | OHARA | 29.72 |
| | | | S4 | X Cyl. | FD1 | 15.511 | 76.335 | Flat | Air | | | | 27.33 |
| | | | | | FD2 | 12.336 | | | | | | | |
| | | | | | FD3 | 8.320 | | | | | | | |
| L3 | G1 | G1b | S5 | Sph. | All | 3.000 | −422.684 | −422.634 | Glass | 497816 | SFPL51 | OHARA | 23.75 |
| | | | S6 | Sph. | All | 5.416 | 106.119 | 106.119 | Air | | | | 22.52 |
| L4 | G1 | G1b | S7 | Y Cyl. | All | 3.200 | Flat | −139.348 | Glass | 803466 | SLAH65 | OHARA | 22.09 |
| | | | S8 | Y Cyl. | FD1 | 2.286 | Flat | 258.236 | Air | | | | 21.77 |
| | | | | | FD2 | 5.488 | | | | | | | |
| | | | | | FD3 | 5.677 | | | | | | | |
| L5 | G1 | G1c | S9 | Y Cyl. | All | 10.640 | Flat | 243.348 | Glass | 618634 | SFHM52 | OHARA | 21.17 |
| | | | S10 | Y Cyl. | All | 0.853 | Flat | −41.527 | Air | | | | 21.86 |
| L6 | G1 | G1c | S11 | Y Cyl. | All | 7.066 | Flat | −49.911 | Glass | 847238 | STIH53 | OHARA | 28.88 |
| | | | S12 | Y Cyl. | All | 10.492 | Flat | −73.368 | Air | | | | 21.11 |
| L7 | G1 | G1c | S13 | Sph. | All | 3.000 | Flat | Flat | Glass | 606457 | SBAM4 | OHARA | 19.57 |
| | | | S14 | X Cyl. | All | 2.000 | 79.058 | Flat | Air | | | | 19.48 |
| L8 | G1 | G1c | S15 | Sph. | All | 18.758 | 70.533 | 70.533 | Glass | 806254 | STIH6 | OHARA | 19.14 |
| | | | S16 | Sph. | All | 7.528 | 67.370 | 67.370 | Air | | | | 16.36 |
| L9 | G1 | G1c | S17 | X Cyl. | All | 8.543 | 87.531 | Flat | Glass | 497816 | SFPL51 | OHARA | 16.01 |
| | | | S18 | X Cyl. | All | 2.000 | −68.533 | Flat | Air | | | | 15.71 |
| L10 | G1 | G1c | S19 | Sph. | All | 4.582 | 50.729 | 50.719 | Glass | 835427 | SLAH55V | OHARA | 14.97 |
| | | | S20 | Sph. | All | 0.976 | 337.165 | 337.165 | Air | | | | 14.41 |
| L11 | G1 | G1c | S21 | Sph. | All | 2.458 | 4393.823 | 4393.823 | Glass | 608437 | SHAM4 | OHARA | 14.16 |
| | | | S22 | Sph. | All | 4.720 | 43.481 | 43.481 | Air | | | | 13.17 |
| L12 | G2 | | S23 | Sph. | All | 6.511 | 21.900 | 21.900 | Glass | 497536 | SPFL51 | OHARA | 12.13 |
| | | | S24 | Sph. | All | 0.490 | 501.664 | 501.664 | Air | | | | 11.71 |
| L13 | G2 | | S25 | Sph. | All | 3.889 | 20.222 | 20.222 | Glass | 497536 | SPFL51 | OHARA | 10.65 |
| | | | S26 | Sph. | All | 2.091 | 42.462 | 42.462 | Air | | | | 9.87 |
| L14 | G2 | | S27 | Sph. | All | 1.600 | 600.375 | 600.375 | Glass | 848451 | STIL1 | OHARA | 9.37 |
| | | | S28 | Sph. | All | 4.723 | 14.606 | 14.606 | Air | | | | 8.13 |
| Stop | | | S29 | Sph. | All | 16.316 | Flat | Flat | Air | | | | 7.84 |
| L15 | G2 | | S30 | Sph. | All | 1.598 | −15.323 | 84.567 | Glass | 786276 | STIH4 | OHARA | 8.59 |
| | | | S31 | Sph. | All | 2.235 | −24.929 | −18.917 | Air | | | | 6.11 |
| L16 | G2 | | S32 | Sph. | All | 2.317 | −191.227 | 34.942 | Glass | 786363 | SLAM7 | OHARA | 6.17 |
| | | | S33 | Sph. | All | 42.000 | −28.256 | 34.085 | Air | | | | 6.30 |
| Image Surface | | | S34 | X & Y Cyl. | FD1 | | −732.441 | −398.695 | | | | | |
| | | | | X & Y Cyl. | FD2 | | −291.913 | −318.708 | | | | | |
| | | | | X & Y Cyl. | FD3 | | −200.000 | −200.000 | | | | | |

Notes:

[1]In the Surface Shape column the image surface is not flat to simulate equivalent curved object surfaces through focus distance position FD1, FD2 and FD3.

[2]In the Material Name column the trade name of the less material used is given.

[3]In the Material Supplier column a manufacturer name is given although there may be alternative manufacturers.

[4]The data given is the Aperture Half Diameter column is for circular aperture.

Although the present disclosure has been fully described in connection with embodiments thereof with reference to the accompanying drawings and tables, it is to be noted that various changes and modifications can be made including smaller and larger focal lengths, smaller and larger squeeze ratios, smaller and larger image sizes, smaller and larger wavebands (e.g., 435 nm to 656 nm), smaller and larger apertures, etc., as will be apparent to those skilled in the art. As such, the examples and embodiments presented herein are not to be construed as limiting and changes and modifications such as noted above are to be understood as being included within the scope of the present disclosure as defined by the appended claims.

What is claimed is:

1. An anamorphic objective lens system having orthogonal vertical and horizontal directions and, comprising along an optical axis and in order from an object space to an image space:
   a front anamorphic section having a back end and an anamorphic lens group with axially stationary first and third lens sub-groups that are respectively most object-space-wise and most image-space-wise, and a second lens sub-group between said first and third lens sub-groups that is axially movable for focusing, wherein the front anamorphic lens group comprises at least two anamorphic lens elements; and
   a set of two or more non-anamorphic sections each having a front end and a non-anamorphic lens group that is axially stationary and optically matched to the anamorphic lens group of the front anamorphic section, wherein the front end is configured to be removably connected to the back end of the front anamorphic section to define one of a set of two or more anamorphic objective lens assemblies having different vertical focal lengths.

2. The anamorphic objective lens system according to claim 1, wherein the front anamorphic section comprises a focus scale having a calibration, and wherein the two or more anamorphic objective lens assemblies have respective first and second axial lengths that are the same to within an axial length tolerance that maintains the calibration of the focus scale.

3. The anamorphic objective lens system according to claim 1, wherein:
   the third lens sub-group defines a backmost lens surface of the front anamorphic section, wherein the backmost lens surface has a clear aperture diameter CA; and
   wherein a first one of two or more anamorphic objective lens assemblies has a first image-space F-number and a shortest-focal-length clear aperture $CA=CA_S$ and a second one of the two or more anamorphic objective lens assemblies has a second image-space F-number and a longest-focal-length clear aperture $CA=CA_L$, and wherein $CA_S \leq CA_L$ when the first and second image-space F-numbers are the same.

4. The anamorphic objective lens system according to claim 3, wherein $CA_S < CA_L$.

5. The anamorphic objective lens system according to claim 1, wherein a first one of two or more anamorphic objective lens assemblies has a first vertical focal length that is a shortest vertical focal length FLY1, a second one of two or more anamorphic objective lens assemblies has second vertical focal length that is a longest vertical focal length FLY2, and wherein the shortest and longest vertical focal lengths FLY1 and FLY2 define a vertical focal length ratio RYFL=1.25<FLY2/FLY1<100.

6. The anamorphic objective lens system according to claim 1, wherein the back end of the front anamorphic section and the front ends of the two or more non-anamorphic sections comprise respective lens mounting fixtures configured to operably engage and disengage.

7. The anamorphic objective lens system according to claim 1, wherein the non-anamorphic lens group comprises lens elements and wherein all of said lens elements are spherical lens elements.

8. The anamorphic objective lens system according to claim 1, wherein the at least two anamorphic lens elements in the anamorphic lens group comprises at least one cylindrical lens element.

9. The anamorphic objective lens system according to claim 1, wherein the at least two anamorphic lens elements consist of:
   in the first lens sub-group, a single cylindrical lens element having optical power in a first (X) direction;
   in the second lens sub-group, a single cylindrical lens element having optical power in a second (Y) direction orthogonal to the first direction;
   in the third lens sub-group, four cylindrical lens elements, with two of the front-most of the four cylindrical lens elements having optical power in the second (Y) direction and the remaining two rear-most cylindrical lens elements having optical power in the first (X) direction.

10. The anamorphic objective lens system according to claim 1, wherein each of the non-anamorphic lens groups of the non-anamorphic sections comprises an aperture stop that defines an F-number for each of the anamorphic objective lens assemblies.

11. The anamorphic objective lens system according to claim 1, wherein the front anamorphic section comprises a focus dial having focus scale that remains calibrated when different ones of the two or more non-anamorphic sections are operably attached to the front anamorphic section one at a time.

12. The anamorphic objective lens system according to claim 1, wherein one of the at least two anamorphic lens elements comprises a most object-space-wise anamorphic lens element, and wherein the first lens group comprises, between the object space and the most object-space-wise anamorphic lens element, one or more non-anamorphic lens elements collectively having either zero optical power or positive optical power.

13. The anamorphic objective lens system according to claim 12, wherein the at least one non-anamorphic lens element comprises at least one spherical lens element.

14. A camera system, comprising:
   the anamorphic objective lens system of claim 1, wherein the front anamorphic section comprises a first lens barrel and the first and second non-anamorphic sections each comprises respective second lens barrels each having a back end;
   a camera housing having an interior and a front end that supports a lens mounting fixture to which the back ends of the second lens barrels are operably attachable and detachable one at a time;
   an image sensor operably disposed within the camera housing interior and at an image surface in the image space of the anamorphic objective lens system when the lens barrel is attached to the camera housing; and
   camera electronics electrically connected to the image sensor.

15. A camera system, comprising:
the set of anamorphic objective lens assemblies of the anamorphic objective lens system of claim 1;
a camera housing having an interior and a front end that supports a lens mounting fixture to which each of the anamorphic objective lens assemblies in the set of anamorphic objective lens assemblies are operably attachable and detachable one at a time;
an image sensor operably disposed within the camera housing interior and disposed at an image surface common to each of the anamorphic objective lens assemblies in the set of anamorphic objective lens assemblies; and
camera electronics electrically connected to the image sensor.

16. A method of performing anamorphic imaging for an imaging application at different vertical focal lengths using a camera, comprising:
providing a front anamorphic section having a back end and comprising an anamorphic lens group that includes an axially movable lens sub-group;
attaching to the back end of the front anamorphic section a first non-anamorphic section comprising a first non-anamorphic lens group that is optically matched to the anamorphic lens group and having only stationary first non-anamorphic lens elements and a first aperture stop to form a first anamorphic objective lens assembly having a first vertical focal length FLY1 and a first axial lens length;
performing a first imaging process with the first anamorphic objective lens assembly to form a first suitable image for the imaging application;
removing the first non-anamorphic section from the back end of the front anamorphic section and attaching to the back end a second non-anamorphic section comprising a second non-anamorphic lens group having only stationary second non-anamorphic lens elements and a second aperture stop to form a second anamorphic objective lens assembly having a second vertical focal length FLY2; and
performing a second imaging process with the second anamorphic objective lens assembly to form a second suitable image for the imaging application.

17. The method according to claim 16 wherein:
performing the first imaging process includes operably attaching the first anamorphic objective lens to a camera having an image sensor and capturing a first image with the image sensor; and
performing the second imaging process includes removing the first anamorphic objective lens from the camera and operably attaching the second anamorphic objective lens to the camera and capturing a second image with the image sensor.

18. The method according to claim 16, wherein:
providing the set of two or more non-anamorphic sections compromises providing at least three non-anamorphic sections respectively having a shortest focal length, a longest focal length and a medium focal length between the shortest and longest focal lengths;
the shortest focal length non-anamorphic section forms the vertical focal length FLY1 of the first anamorphic objective lens assembly as a shortest vertical focal length and the longest focal length non-anamorphic section forms the second vertical focal length FLY2 of the first anamorphic objective lens assembly as the longest vertical focal length, so that FLY2>FLY1; and
the first (shortest) and second (longest) vertical focal lengths FLY1 and FLY2 define a ratio RYFL=FLY2/FLY1, wherein 1.25<RYFL<100.

19. The method according to claim 16, wherein:
the axially movable second lens sub-group for focusing has at least one non-rotationally symmetric surface;
the focusing is carried out using a focus scale having a calibration on the front anamorphic section; and the first and second anamorphic objective lens assemblies respectively have first and second axial lengths that are the same to within an axial length tolerance that maintains the calibration of the focus scale.

20. An anamorphic objective lens system, comprising along an optical axis and in order from an object space to an image space:
a front anamorphic section having a back end and comprising an anamorphic lens group comprising at least two non-rotationally symmetric surfaces and comprising a most object-space-wise axially stationary first lens sub-group and a most image-space-wise axially stationary third lens sub-group and a second lens sub-group between said first and third lens sub-groups, wherein the second lens sub-groups is axially movable for focusing, and wherein the third lens sub-group defines a backmost optical surface closest to the back end of said front anamorphic section, wherein one of the at least two non-rotationally symmetric surfaces resides in one of the first and second lens sub-groups and the other of the two non-rotationally symmetric surfaces resides in the third lens sub-group; and
multiple rear non-anamorphic sections each removably attachable to the back end of the front anamorphic section to form multiple anamorphic objective lens assemblies that define a set of anamorphic object lens assemblies, with each of the multiple rear non-anamorphic sections comprising a vertical direction and multiple non-anamorphic lens groups that are axially stationary and non-anamorphic, wherein the non-anamorphic lens groups are optically matched to the front anamorphic section to define for each of the anamorphic objective lens assemblies different vertical focal lengths comprising a shortest vertical focal length that defines a first image-space F-number and a first clear aperture diameter $CA_S$ for said backmost optical surface and a longest vertical focal length that defines a second image-space F-number and a second clear aperture diameter $CA_L$ for said last optical surface, and wherein $CA_S \leq CA_L$ when the first and second image-space F-numbers are the same.

* * * * *